United States Patent
Aoyama et al.

(10) Patent No.: US 8,340,454 B2
(45) Date of Patent: Dec. 25, 2012

(54) IMAGE PROCESSING DEVICE AND METHOD AND PROGRAM

(75) Inventors: Koji Aoyama, Saitama (JP); Hideki Watanabe, Saitama (JP); Hiroaki Yamajo, Tokyo (JP)

(73) Assignee: Sony Corporation, Tokyo (JP)

( * ) Notice: Subject to any disclaimer, the term of this patent is extended or adjusted under 35 U.S.C. 154(b) by 573 days.

(21) Appl. No.: 12/409,605

(22) Filed: Mar. 24, 2009

(65) Prior Publication Data

US 2009/0245675 A1    Oct. 1, 2009

(30) Foreign Application Priority Data

Mar. 25, 2008  (JP) ................ P2008-077788

(51) Int. Cl.
*G06K 9/40*    (2006.01)

(52) U.S. Cl. .......................................... 382/254

(58) Field of Classification Search ............... 348/420.1, 348/222.1; 375/240.12, 240.24; 382/191, 382/232, 254, 268, 173, 199, 205, 224, 233, 382/275

See application file for complete search history.

(56) References Cited

U.S. PATENT DOCUMENTS

| | | | |
|---|---|---|---|
| 5,337,088 A * | 8/1994 | Honjo ....................... | 375/240.24 |
| 6,738,528 B1 * | 5/2004 | Nio et al. ..................... | 382/268 |
| 6,823,089 B1 * | 11/2004 | Yu et al. ...................... | 382/268 |
| 7,751,482 B1 * | 7/2010 | Srinivasan et al. ....... | 375/240.16 |
| 2005/0141619 A1 * | 6/2005 | Kondo et al. .............. | 375/240.24 |
| 2007/0140590 A1 * | 6/2007 | Kimura ........................ | 382/275 |
| 2007/0223835 A1 * | 9/2007 | Yamada et al. .............. | 382/268 |
| 2008/0037893 A1 * | 2/2008 | Okumichi et al. ............ | 382/268 |
| 2008/0199102 A1 * | 8/2008 | Namiki et al. ................ | 382/268 |
| 2009/0103812 A1 * | 4/2009 | Diggins ........................ | 382/191 |
| 2009/0148062 A1 * | 6/2009 | Gabso et al. ................. | 382/266 |
| 2010/0060749 A1 * | 3/2010 | Srinivasan et al. ......... | 348/222.1 |

FOREIGN PATENT DOCUMENTS

| | | |
|---|---|---|
| JP | 2000-050275 | 2/2000 |
| JP | 2002-232889 | 8/2002 |
| JP | 2005-12641 | 1/2005 |
| JP | 2007-28460 | 2/2007 |
| JP | 2007-266684 | 10/2007 |
| JP | 2007-312370 | 11/2007 |

OTHER PUBLICATIONS

Notification of Reasons for Rejection, issued by Japanese Patent Office, dated Mar. 6, 2012, in Japanese Patent Application No. 2008-077788 (5 pages).

* cited by examiner

*Primary Examiner* — Tung Vo
*Assistant Examiner* — Stephen Smith
(74) *Attorney, Agent, or Firm* — Finnegan, Henderson, Farabow, Garrett & Dunner LLP

(57) ABSTRACT

An information processing device includes: a block level information obtaining unit to detect a block level from the difference in pixel values between each pixel of an image and nearby pixels and to obtain distribution information wherein the block levels are accumulated for each position in a predetermined direction; a short cycle measuring unit to measure short cycle information which is the distribution information for each phase in a plurality of predetermined short cycles corresponding to a plurality of block sizes from the distribution information; and a determining unit to determine the block size corresponding to the short cycle information wherein the phase distribution takes a maximum value, of the short cycle information of the plurality of predetermined short cycles corresponding to the plurality of block sizes, as the block size in the image.

13 Claims, 39 Drawing Sheets

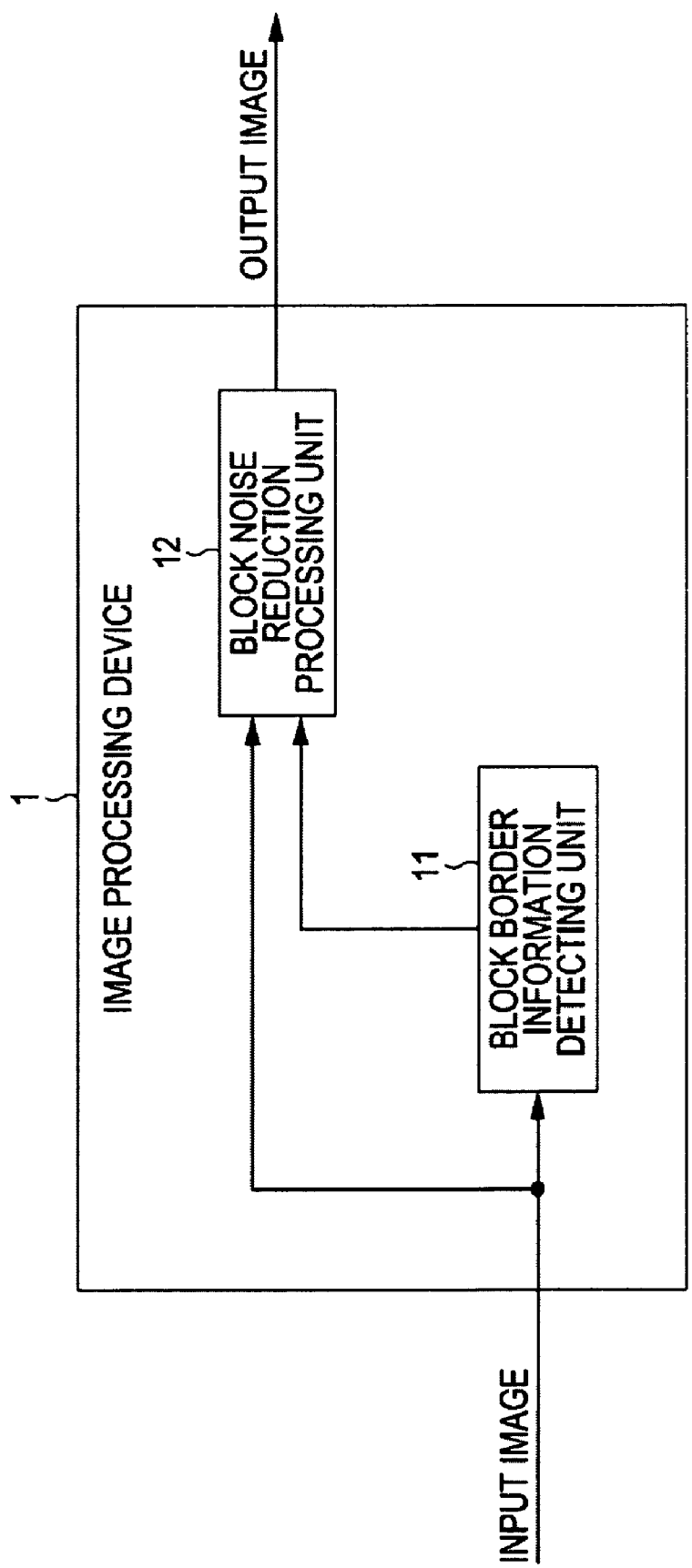

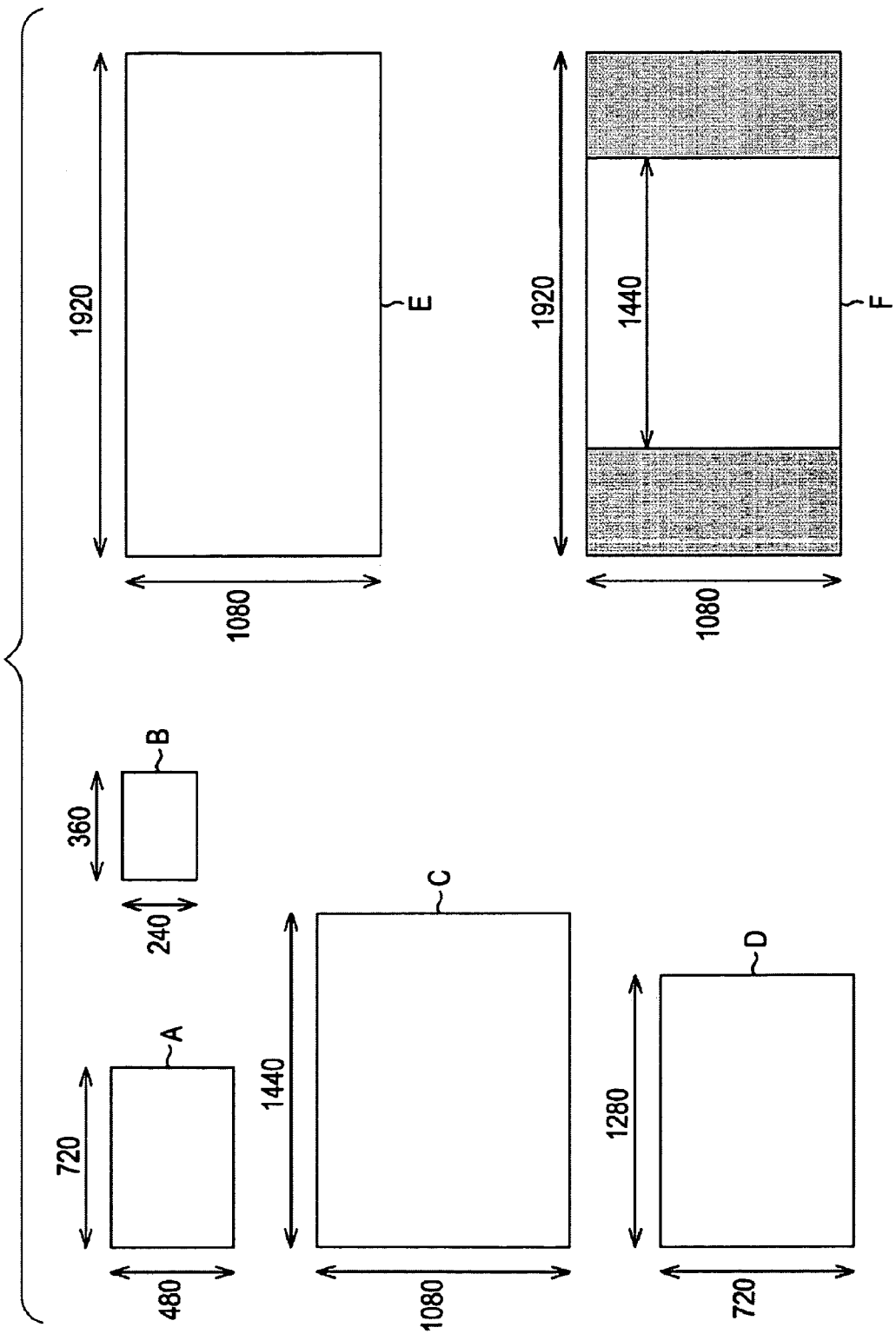

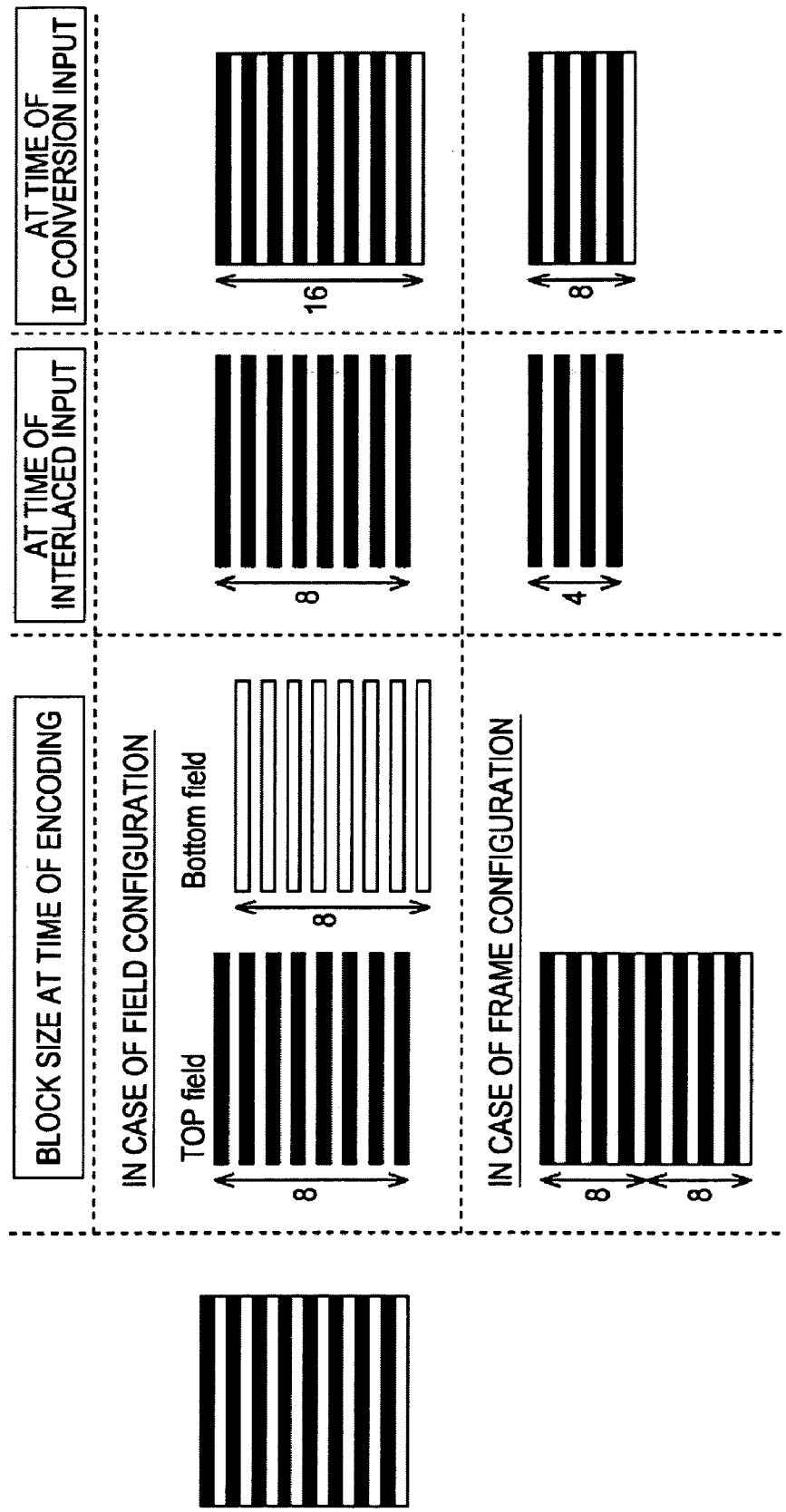

| ORIGINAL IMAGE | INPUT IMAGE | | |
|---|---|---|---|
| SIZE | ANY SIDE PANEL? | HORIZONTAL SCALING RATE | HORIZONTAL BLOCK SIZE |
| 360 (352) × 240 | YES | 4.00 | 32.00 |
| | NO | 5.33 | 42.67 |
| 720 (704) × 480 | YES | 2.00 | 16.00 |
| | NO | 2.67 | 21.33 |
| 1280 × 720 | NO | 1.50 | 12.00 |
| 1440 × 1080 | YES | 1.00 | 8.00 |
| | NO | 1.33 | 10.67 |
| 1920 × 1080 | NO | 1.00 | 8.00 |

L2

| ORIGINAL IMAGE | INPUT IMAGE | | |
|---|---|---|---|
| SIZE | FIELD CONFIGURATION OR FRAME CONFIGURATION | VERTICAL SCALING RATE | VERTICAL BLOCK SIZE |
| 360 (352) × 240 | FRAME CONFIGURATION | 2.25 | 18.00 |
| 720 (704) × 480 | FIELD CONFIGURATION | 2.25 | 18.00 |
| | FRAME CONFIGURATION | 1.13 | 9.00 |
| 1280 × 720 | FRAME CONFIGURATION | 0.75 | 6.00 |
| (1440 OR 1920) × 1080 | FIELD CONFIGURATION | 1.00 | 8.00 |
| | FRAME CONFIGURATION | 0.50 | 4.00 |

L3

| ORIGINAL IMAGE | INPUT IMAGE | | |
|---|---|---|---|
| SIZE | FIELD CONFIGURATION OR FRAME CONFIGURATION | HORIZONTAL SCALING RATE | HORIZONTAL BLOCK SIZE |
| 360 (352) × 240 | FRAME CONFIGURATION | 4.50 | 36.00 |
| 720 (704) × 480 | FIELD CONFIGURATION | 4.50 | 36.00 |
| | FRAME CONFIGURATION | 2.25 | 18.00 |
| 1280 × 720 | FRAME CONFIGURATION | 1.50 | 12.00 |
| (1440 OR 1920) × 1080 | FIELD CONFIGURATION | 2.00 | 16.00 |
| | FRAME CONFIGURATION | 1.00 | 8.00 |

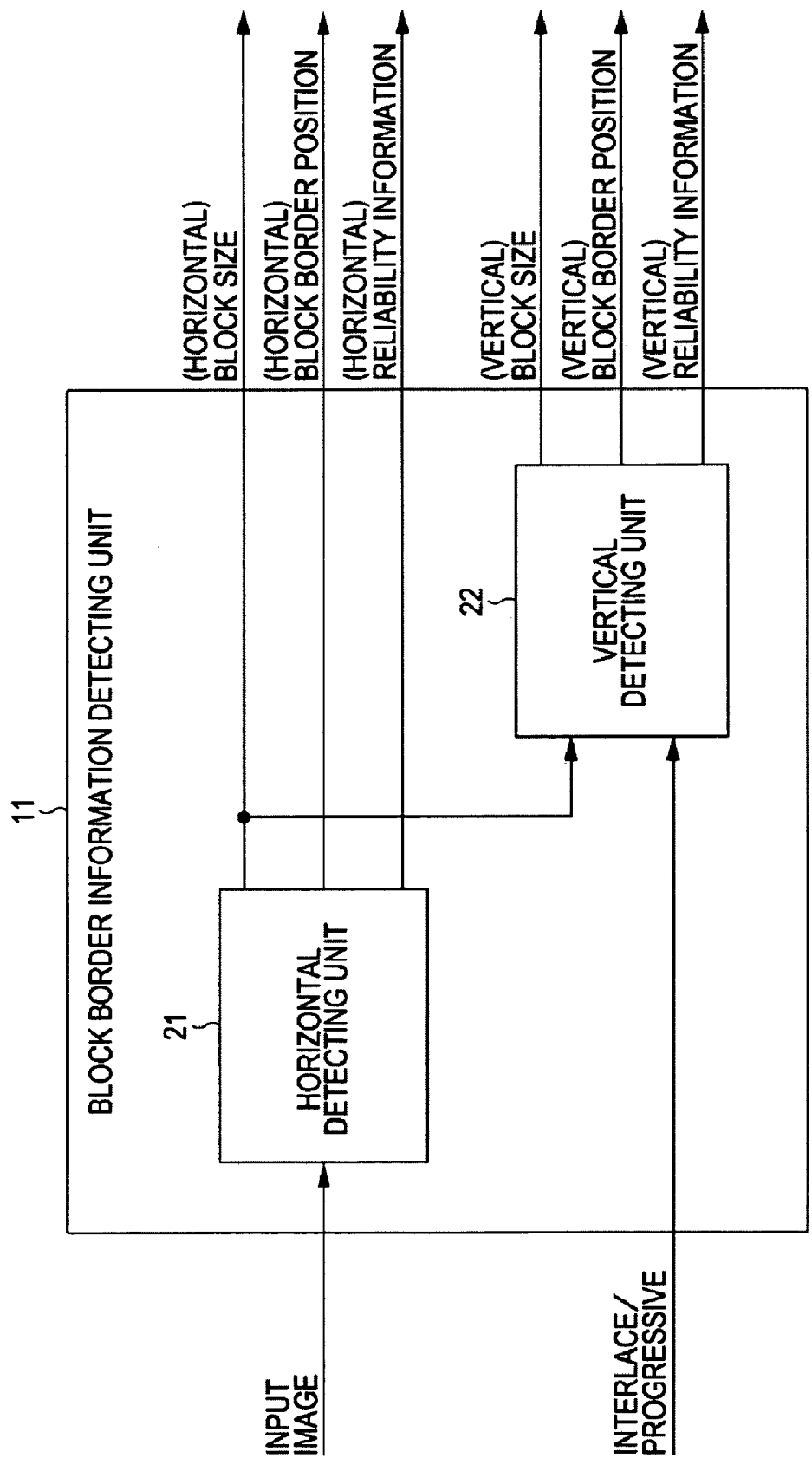

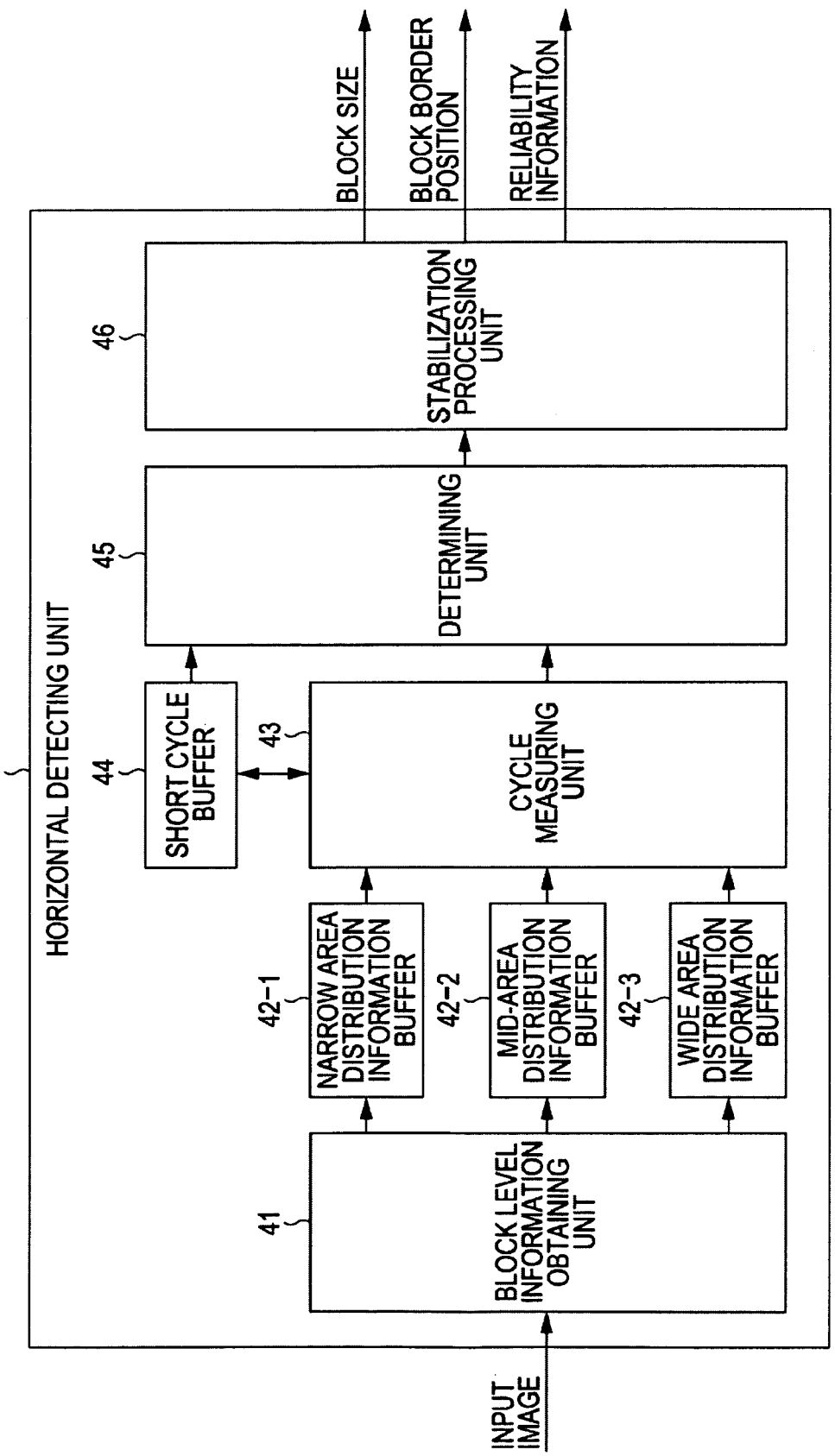

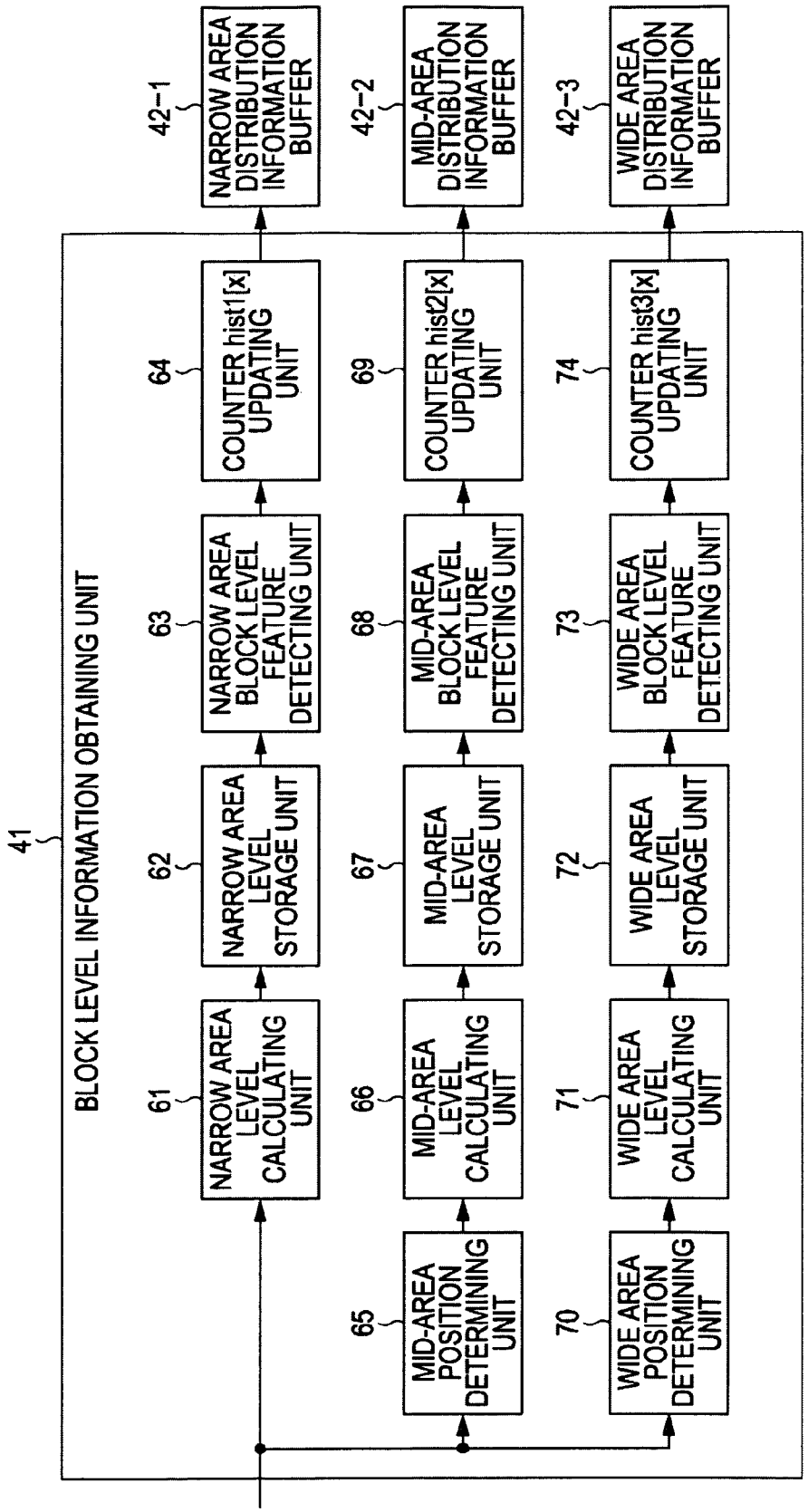

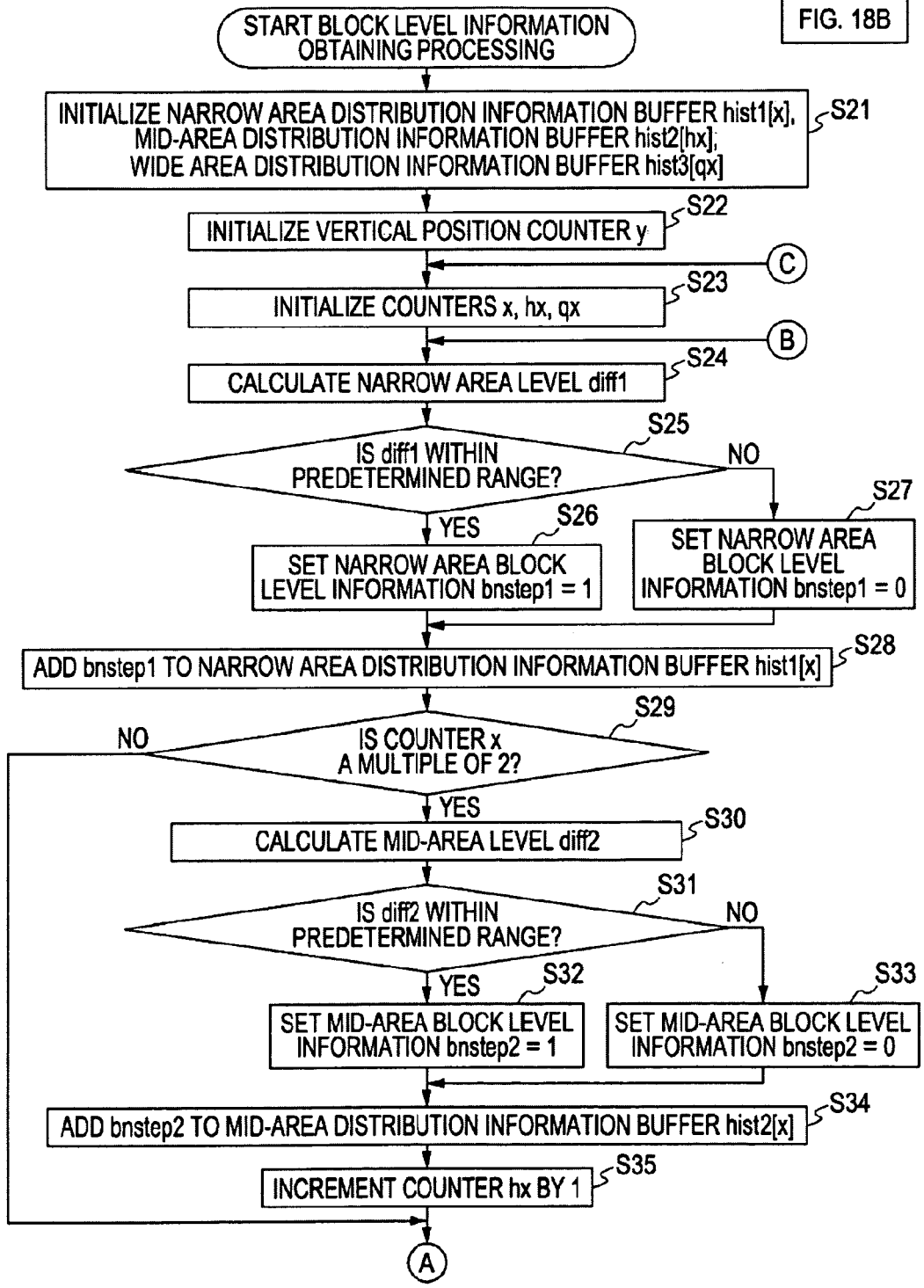

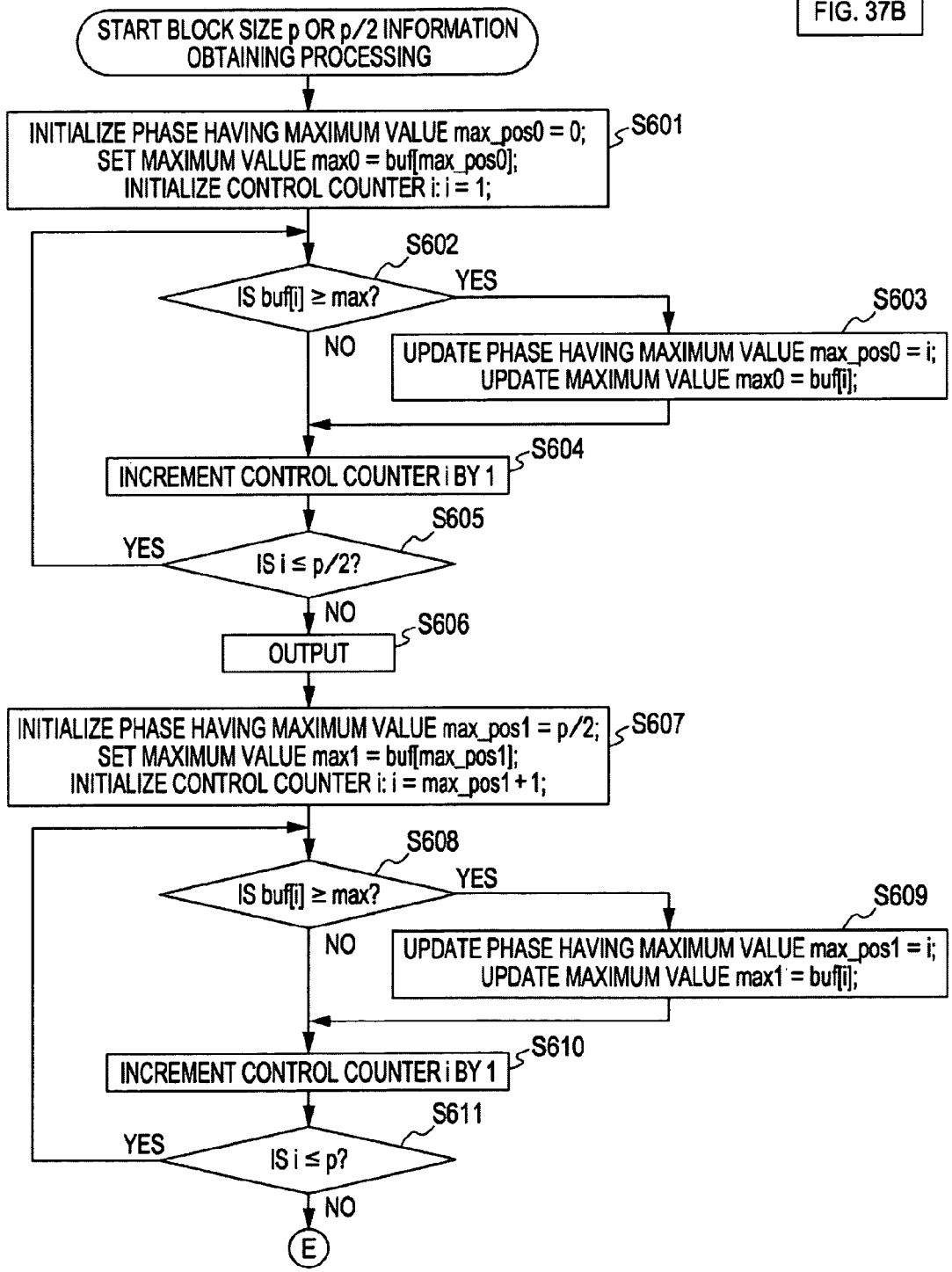

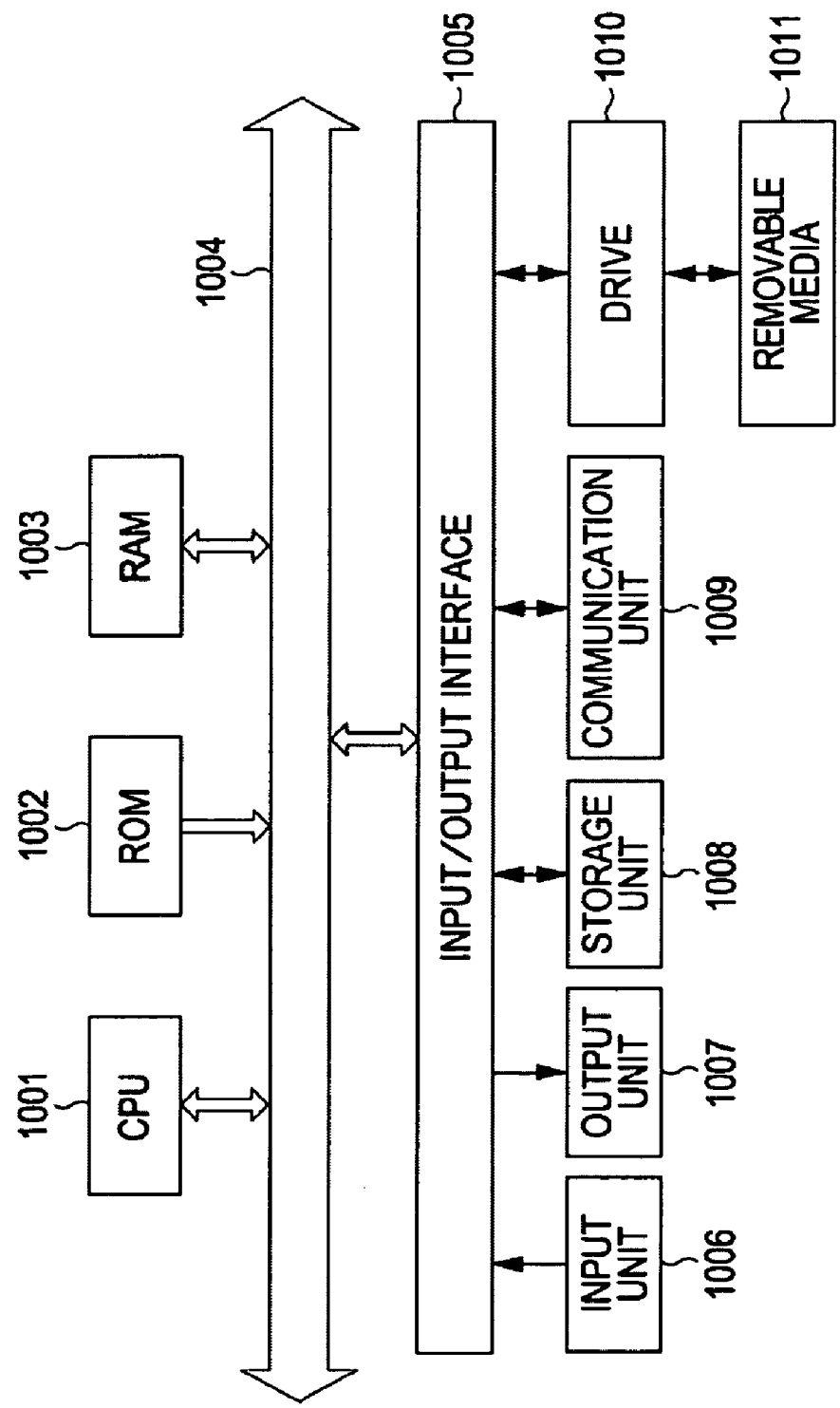

IMAGE PROCESSING DEVICE AND METHOD AND PROGRAM

CROSS REFERENCES TO RELATED APPLICATIONS

The present invention contains subject matter related to Japanese Patent Application JP 2008-077788 filed in the Japanese Patent Office on Mar. 25, 2008, the entire contents of which are incorporated herein by reference.

BACKGROUND OF THE INVENTION

1. Field of the Invention

The present invention relates to an image processing device and method and program, and particularly relates to an image processing device and method and program wherein block size and block border position can be accurately measured.

2. Description of the Related Art

In the event of decoding encoded image data, noise may occur in the decoded image. For example, in the event of compressing image data with a compression method such as MPEG (Moving Picture Experts Group), an encoder divides image data into square blocks made up of multiple pixels, and subjects each divided block to DCT (Discrete Cosine Transform) processing. Therefore, when a decoder decodes the image data encoded with the MPEG method, in principle with the decoded image data, pixel value levels between pixels can differ at border portions of each block can arise, whereby block noise can readily occur.

A device to reduce or remove such block noise generally does so by applying an LPF (Low Pass Filter) over a known block size (e.g. 8 pixels×8 pixels if MPEG2) and at block border positions, and smoothing. However, for such smoothing, information of the input image data such as block size and block border position has to be available beforehand.

Accordingly, a technique has been proposed wherein cyclic nature is used in order to realize such processing to obtain the block sizes and block border positions in the input image (Japanese Unexamined Patent Application Publication No. 2007-028460).

Also, a method has been proposed wherein cyclic nature is not used, but block noise feature is used to cumulatively process weighted results in a spatial direction and hold the detection results at each pixel position (Japanese Unexamined Patent Application Publication No. 2005-012641).

SUMMARY OF THE INVENTION

However, with the technique described in Japanese Unexamined Patent Application Publication No. 2007-028460, for example in the case that an interlaced image, wherein an image compressed with an MPEG format is decoded, is input, the image may have a field configuration and the image may have a frame configuration.

Also, a portion of players which read and decode a signal recorded in a storage medium such as a DVD (Digital Versatile Disc) or HDD (Hard Disc Drive) or the like to output as a picture signal on display device or the like have a scaler built therein, and for example even if the recorded signal is a signal with SD resolution such as 720×480, there may be cases wherein this is converted to an HD (High Definition) resolution having 1920 pixels×1080 pixels which is the output resolution, and is output.

Further, even in a case that the recording signal is an HD signal, there is a signal with the resolution of 1440 pixels× 1080 pixels, and there are cases wherein such a signal is converted to the HD resolution of 1920 pixels×1080 pixels.

Thus, in a case wherein picture data that is referenced with an 8 pixel×8 pixel block size and decoded is subjected to scaling, and displayed on a liquid crystal television with an HD resolution of 1920 pixels×1080 pixels, for example, in the case that the originally recorded signal resolution is 720 pixels×480 pixels, the block size becomes 21 and ⅓ pixels (=21.333 pixels)×18 pixels, and in the case that the originally recorded signal resolution is 1280 pixels×720 pixels, the block size becomes 12 pixels×12 pixels, and in the case the originally recorded signal resolution is 1440 pixels×1080 pixels, the block size becomes 10 and ⅓ pixels (=10.333 pixels)×8 pixels.

Also, in the case of 720 pixels×480 pixels, in the case of a display mode maintaining a screen aspect ratio of 4:3, a frame in the pixel width of 240 pixels may be attached on the left and right of the 1920 pixels and displayed. In such a case, the effective resolution of the image is 1440 pixels×1080 pixels, and the block size is 16 pixels×18 pixels.

Further, in the case that the above-described vertical block size is an interlaced input subjected to MPEG2 decoding, a field configuration is shown, but with MPEG2 a frame configuration may be taken, and also there are cases of being subjected to IP (interlace/progressive conversion) conversion and input, so handling of various types of block sizes has to be considered.

That is to say, in the case that the original image has an interlaced configuration, when the configuration at the time of encoding is a field configuration, the block size is 8, but when a frame configuration, the block size is 4. Also, in the case that the original image is an interlace configuration but input through an interlace/progressive converter, each block size is input as double the size thereof.

Thus, there are cases wherein a signal from external input is subjected to scaling and input, whereby fixing the block size as 8 pixels×8 pixels or the like and detecting the block border position results in the block size and block border position not being detectable depending on the input image.

Also, with the method described in Japanese Unexamined Patent Application Publication No. 2005-012641, cyclicity is not considered, whereby erroneous detection readily occurs from the design in the image. Also, in order to make a determination from the accumulated values, even within the same image, variances between positions wherein block noise is occurring and positions wherein block noise is not occurring is of concern.

Further, in the case that a lower-resolution image is subjected to scaling, and for example 720 pixels are expanded to 1920 pixels, the block size also is expanded as with the 21.333 pixels whereby the signal becomes dull, thereby determining the block border position with one adjacent pixel difference is difficult. In particular, the image data input externally has an unknown image size and so forth, so distinguishing the block size is difficult.

Also, there are cases wherein the image subjected to MPEG compressing is high quality depending on bit rate, design, and so forth, and may not detect block distortion.

There has been realized demand for enabling measuring the block size and block border position with high accuracy from the entire decoded image.

According to an embodiment of the present invention, a image processing device includes a block level information obtaining unit to detect a block level from the difference in pixel values between each pixel of an image and nearby pixels and to obtain distribution information wherein the block levels are accumulated for each position in a predetermined direction; a short cycle measuring unit to measure short cycle information which is the distribution information for each phase in multiple predetermined short cycles corresponding to multiple block sizes from the distribution information; and a determining unit to determine the block size corresponding to the short cycle information wherein the phase distribution takes a maximum value, of the short cycle information of the multiple predetermined short cycles corresponding to the multiple block sizes, as the block size in the image.

In the case that the image is a moving image, a stabilization processing unit to stabilize the block size and block border position information for the current image determined by the determining unit may be included, with the block size and block border position of an image that is temporally nearby.

The block level information obtaining unit may calculate the difference between difference absolute value information of the pixel values between a pixel of interest and pixels nearby the pixel of interest, and the average of the difference absolute value information of the pixel values between the nearby pixels, as the levels; and in the case that the level which is a calculation result is within a range of predetermined values, the level is detected as a block level.

The cycle measuring unit may determine the phase wherein the phase distribution takes the maximum value of the short cycle information of the multiple predetermined short cycles corresponding to the multiple block sizes, as block border position.

The multiple block sizes may include an integer pixel count.

The determining unit may divide the short cycle information corresponding to the block sizes of the integer pixel count into multiple segments; obtains the position for the maximum value to take for each segment; and determines the block border position corresponding to the block size below the decimal, based on the positional relation of the multiple maximum values.

The short cycle may include at least 12 cycles, 8 cycles, and 32 cycles.

The determining unit may divide the maximum value and short cycle information of the 32 cycles into 3 segments; obtains the position for the maximum value to take in each segment; identifies the position in increments of ⅓ cycle below the decimal, based on the relation of the maximum values of the 3 segments; and determines the position to take the maximum value with the 32/3 cycles as the block border position.

The short cycle restricting unit may further obtain the distribution for each interval between peak values from the distribution information, as occurrence frequency; and wherein the determining unit determines the block size wherein the distribution count is the maximum count of the short cycle information, and corresponds to a cycle having a high occurrence frequency, as the image block size; and determines the phase to take the maximum value in the short cycle information as the block border position, based on the distribution count of the short cycle information, and occurrence frequency corresponding to the interval between peak values.

The distribution count may be the reliability of the block size and the block border position.

The determining unit may determine the block size subjected to scaling and block border position, based on the short cycle information distribution count and the occurrence frequency.

The determining unit may determine the block size in the vertical direction and border position, based on the block size in the horizontal direction and block border position information of the image.

The determining unit may determine the block size in the horizontal direction and border position, based on the block size in the vertical direction and block border position information of the image.

According to an embodiment of the present invention, an information processing method includes the steps of: obtaining block level information to detect a block level from the difference in pixel values between each pixel of an image and nearby pixels and to obtain distribution information wherein the block levels are accumulated for each position in a predetermined direction; short cycle measuring to measure short cycle information which is the distribution information for each phase in multiple predetermined short cycles corresponding to multiple block sizes from the distribution information; and determining to determine the block size corresponding to the short cycle information wherein the phase distribution takes a maximum value, of the short cycle information of the multiple predetermined short cycles corresponding to the multiple block sizes, as the block size in the image.

According to an embodiment of the present invention, a program to cause a computer to execute processing includes the steps of: obtaining block level information to detect a block level from the difference in pixel values between each pixel of an image and nearby pixels and to obtain distribution information wherein the block levels are accumulated for each position in a predetermined direction; short cycle measuring to measure short cycle information which is the distribution information for each phase in a multiple predetermined short cycles corresponding to a multiple block sizes from the distribution information; and determining to determine the block size corresponding to the short cycle information wherein the phase distribution takes a maximum value, of the short cycle information of the multiple predetermined short cycles corresponding to the multiple block sizes, as the block size in the image.

A recording medium according to an embodiment of the present invention records the program.

According to the above-described configurations, a block level is detected from the difference in pixel values between each pixel of an image and nearby pixels, distribution information is obtained wherein the block levels are accumulated for each position in a predetermined direction; short cycle information is measured which is the distribution information for each phase in multiple predetermined short cycles corresponding to multiple block sizes from the distribution information; and the block size corresponding to the short cycle information is determined wherein the phase distribution takes a maximum value, of the short cycle information of the multiple predetermined short cycles corresponding to the multiple block sizes, as the block size in the image. Thus, block size and block border position can be measured with high accuracy.

BRIEF DESCRIPTION OF THE DRAWINGS

FIG. 1 is a diagram illustrating a configuration example according to an embodiment of an image processing device to which the present invention is applied;

FIG. 2 is a diagram illustrating an input image;

FIG. 3 is a diagram illustrating an input image;

FIG. 4 is a diagram illustrating the relation between the scaling rate and block size of the input image;

FIG. 5 is a diagram illustrating a configuration example of an embodiment of a block border information detecting unit;

FIG. 6 is a diagram illustrating a configuration example of the horizontal detecting unit in FIG. 5;

FIG. 7 is a diagram illustrating a configuration example of the block level information obtaining unit in FIG. 6;

FIG. 38 is a diagram illustrating a configuration example of a general-use personal computer.

DESCRIPTION OF THE PREFERRED EMBODIMENTS

Figure 8:
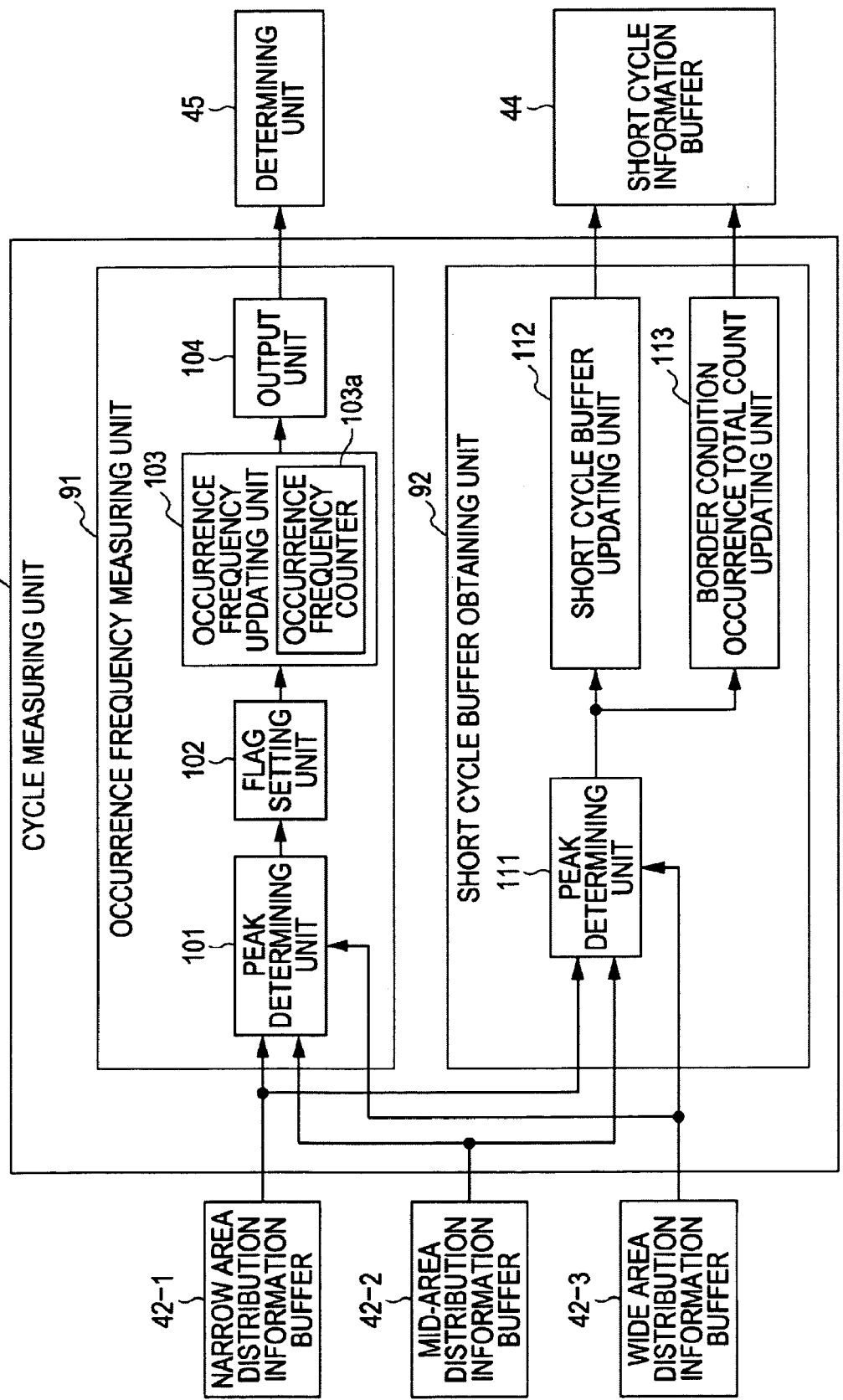
FIG. 8 is a diagram illustrating a configuration example of the cycle measuring unit in FIG. 6.

FIG. 1 is a diagram illustrating a configuration example according to an embodiment of an image processing device to which the present invention is applied. An image processing device 1 in FIG. 1 is made up of a block border information detecting unit 11 and a block noise reduction processing unit 12, and controls the strength of processing to reduce the block noise of the input image in increments of blocks, and outputs the block noise reduction processing image with reduced block noise as an output image.

An image input in the image processing device 1 includes images read and decoded from a storage medium such as a DVD (Digital Versatile Disc) or HDD (Hard Disc Drive) with a player or the like. Of such players, a portion of players have an image enlarging function, and for example, as shown in FIG. 2, even if the recorded image data is image data A with a SD (Standard Definition) resolution such as 720 pixels×480 pixels, this can be converted to image D having a resolution of 1280 pixels×720 pixels, image B having a resolution of 360 pixels×240 pixels, or image E having an HD (Hi Definition) resolution of 1920 pixels×1080 pixels, which is the output resolution, and output. Also, in the case that the resolution signal is an HD signal, there is a resolution signal of 1440 pixels×1080 pixels such as shown in image C, whereby with a portion of players, the image data of such an image C can be converted into image E having HD resolution of 1920 pixels×1080 pixels and output. Further, with another portion of players, the image data A having SD (Standard Definition) resolution such as 720 pixels×480 pixels is displayed as an image of image E having HD resolution of 1920 pixels×1080 pixels, the image data A can be output in the image E having HD resolution of 1920 pixels×1080 pixels as an image F as a signal having resolution of 1440 pixels×1080 pixels.

Accordingly, the image input in the image processing device 1 may be image data wherein an analog signal is subjected to analog-digital conversion, image data made up of digital signals, or an image subjected to resolution conversion (scaling) as to the original image data with an analog signal or any of the above-described resolutions.

The block border information detecting unit 11 detects the block size which is the DCT (Discrete Cosine Transform) processing increment in the state of being encoded before decoding from the input image, the block size wherein the block border position is changed with scaling and so forth, and block border positions, and supplies the various information to the block noise reduction processing unit 12 as block size information and block border position information.

More specifically, as described above, images having various resolutions are input, whereby the block size differs by resolution before being input. Further, the block size in the vertical direction also changes depending on conditions at time of encoding or IP conversion. For example, as shown in the far left portion of FIG. 3, in the case that an interlaced image is the original image, if the image is a field configuration when the block size is 8 pixels in the vertical direction, as shown in the second column from the left of the upper row in FIG. 3 at time of encoding, the block size of the interlaced image at time of decoding maintains the 8 pixel block size without change, as shown with the third column from the left of the upper row in FIG. 3, but if subjected to IP conversion (interlace-progressive conversion) at time of decoding, the image block size becomes 16 pixels as shown in the fourth column from the left in the upper row in FIG. 3.

Also, when the block size is 8 pixels in the vertical direction, as shown with the second column from the left in the bottom row in FIG. 3, if the image is a frame configuration, the block size becomes 16 pixels, and if an interlaced image at the time of decoding, the block size becomes a block size of 4 pixels, as shown in the third column from the left of the lower row in FIG. 3, but when subjected to IP conversion (interlace-progressive conversion) at time of decoding, the image block size is maintained as 8 pixels, as shown in the fourth column from the left on the lower row in FIG. 3.

To summarize these, the relations therein are such as shown in FIG. 4, and for example, in the case that the resolution of the original image of the input image is 1920 pixels×1080 pixels and the horizontal block size is 8 pixels, the scaling in the horizontal direction has a relation such as shown in list L1 in FIG. 4. That is to say, when the resolution of the original image is 360 (352) pixels×240 pixels and there is a side panel, the horizontal scaling rate is 4.00 and the horizontal block size is 32.00 pixels, and when there is no side panel, the horizontal scaling rate is 5.33 and the horizontal block size is 42.67 pixels. Also, when the resolution of the original image is 720 (704) pixels×480 pixels and there is a side panel, the horizontal scaling rate is 2.00 and the horizontal block size is 16.00 pixels, and when there is no side panel, the horizontal scaling rate is 2.67 and the horizontal block size is 21.33 pixels. Further, the resolution of the original image is 1280 pixels×720 pixels with no side panel, so the horizontal scaling rate is 1.50 and the horizontal block size is 12.00 pixels. Also, when the resolution of the original image is 1440 pixels×1080 pixels and there is a side panel, the horizontal scaling rate is 1.00 and the horizontal block size is 8.00, and when no side panel, the horizontal scaling rate is 1.33 and the horizontal block size is 10.67. Further, the resolution of the original image is 1920 pixels×1080 pixels and there is no side panel, so the horizontal scaling rate is 1.00 and the horizontal block size is 8.00 pixels.

Also, in the case that the resolution of the input image is an interlaced image of 1920 pixels×1080 pixels and the block size in the vertical direction is 8 pixels, the scaling in the vertical direction has a relation such as shown in the list L2 in FIG. 4. That is to say, when the resolution of the original image is 360 (352) pixels×240 pixels, the image has a frame configuration, so the vertical scaling rate is 2.25 and the vertical block size is 18.00 pixels. Also, when the resolution of the original image is 720 (704) pixels×480 pixels and the image has a field configuration, the vertical scaling rate is 2.25 and the vertical block size is 18.00 pixels, and when a frame configuration the vertical scaling rate is 1.13 and the vertical block size is 9.00 pixels. Further, when the resolution of the original image is 1280 pixels×720 pixels, the image has a frame configuration so the vertical scaling rate is 0.75 and the vertical block size is 6.00 pixels. Also, with a resolution of the original image of 1440 pixels×1080 pixels or 1920 pixels×1080 pixels, when in field configuration the vertical scaling rate is 1.00 and the vertical block size is 8.00 pixels, and when in frame configuration the vertical scaling rate is 0.50 and the vertical block size is 4.00 pixels.

Further, in the case that the resolution of the input image is a progressive image of 1920 pixels×1080 pixels and the block size in the vertical direction is 8 pixels, the scaling in the vertical direction has a relation such as shown in list L3 in FIG. 4. That is to say, when the resolution of the original image is 360 (352) pixels×240 pixels, the image has a frame configuration, so the vertical scaling rate is 4.50 and the vertical block size is 36.00 pixels. Also, when the resolution of the original image is 720 (704) pixels×480 pixels and the image is in field configuration, the vertical scaling rate is 4.50 and the vertical block size is 36.00 pixels, and when in frame configuration the vertical scaling rate is 2.25 and the vertical block size is 18.00 pixels. Further, with a resolution of the original image of 1280 pixels×720 pixels, the image has a frame configuration, so the vertical scaling rate is 1.50 and the vertical block size is 12.00 pixels. Also, with a resolution of the original image is 1440 pixels×1080 pixels or 1920 pixels× 1080 pixels, when in field configuration the vertical scaling rate is 2.00 and the vertical block size is 16.00 pixels, and when in frame configuration the vertical scaling rate is 1.00 and the vertical block size is 8.00 pixels.

The input image has the block size thus changed into various forms. Thus, the block border information detecting unit 11 detects an appropriate block size and block border position with consideration for scaling and IP conversion and the like.

The block noise reduction processing unit 12 changes the strength of the block noise reduction processing appropriately based on the block size and block border position information supplied from the block border information detecting unit 11, whereby block noise of the input image is reduced, and a block noise reduction processed image with reduced block noise is output as the output image.

Next, a configuration example of an embodiment of the block border information detecting unit 11 will be described with reference to the block diagram in FIG. 5.

A horizontal detecting unit 21 detects the horizontal block size, block border position, and horizontal detecting reliability of the input image, and outputs this, while supplying the information of the horizontal direction block size to a vertical detecting unit 22.

The vertical detecting unit 22 outputs the vertical block size which is the block size in the vertical direction, the vertical block border position, and the vertical detecting reliability information for the input image, based on the horizontal block size information and interlace progressive information supplied from the horizontal detecting unit 21.

Next, a configuration example of the horizontal detecting unit 21 will be described with reference to FIG. 6. A block level information obtaining unit 41 obtains block level information with three types of reference pixels which are narrow area, mid-area, and wide area as to a pixel of interest, in pixel increments of the input image, and outputs this information to a narrow area distribution information buffer 42-1, mid-area distribution information buffer 42-2, and wide area distribution information buffer 42-3, respectively.

The narrow area distribution information buffer 42-1, mid-area distribution information buffer 42-2, and wide area distribution information buffer 42-3 store the pixel count wherein block levels are detected, in pixel position increments in the horizontal direction, as respective arrays expressed as a narrow area distribution information buffer hist1[x], mid-area distribution information buffer hist2[hx], and wide area distribution information buffer hist3[qx]. Note that x, hx, qx here are, respectively, a position counter x in the horizontal direction, position counter hx in multiples of 2 of the position counter x, and position counter qx in multiples of 4 of the position counter x. Also, in the case the pixel positions do not have to be distinguished in particular, these may be simply called narrow area distribution information buffer hist1, mid-area distribution information buffer hist2, and wide area distribution information buffer hist3.

A cycle measuring unit 43 finds short cycle information based on array information of the narrow area distribution information buffer hist1[x], mid-area distribution information buffer hist2[hx], and wide area distribution information buffer hist3[qx] stored in the narrow area distribution information buffer 42-1, mid-area distribution information buffer 42-2, and wide area distribution information buffer 42-3, and stores this in a short cycle buffer 44. Short cycle information is obtained as arrays made up of short cycle buffers buf1_p, buf2_p, buf3_p, and stored in the short cycle buffer 44.

Now, a short cycle indicates a pixel count p expressed with block size p, and short cycle information is information indicating detection count for each phase indicating which number in order is the block size p making up the short cycle.

Note that the short cycle buffer buf1_p stores the short cycle information of the block size p pixels obtained based on the narrow area distribution information buffer hist1, the short cycle buffer buf2_p stores the short cycle information of the block size p pixels obtained based on the mid-area distribution information buffer hist2, and the short cycle buffer buf3_p stores the short cycle information of the block size p pixels obtained based on the wide area distribution information buffer hist3.

Also, the cycle measuring unit 43 obtains the occurrence frequencies interval1[n], interval2[n], interval3[n] by cycles for the 3 types of narrow area, mid-area, and wide area, and supplies this to a determining unit 4. An occurrence frequency interval1[n] expresses the occurrence frequency of a pixel count n indicating the spatial size of the occurrence spacing of the peak values obtained based on the narrow area distribution information buffer hist1[x], an occurrence frequency interval2[n] expresses the occurrence frequency of a pixel count n indicating the spatial size of the occurrence spacing of the peak values obtained based on the mid-area distribution information buffer hist2[x], and an occurrence frequency interval3[n] expresses the occurrence frequency of a pixel count n indicating the spatial size of the occurrence spacing of the peak values obtained based on the wide area distribution information buffer hist3[x].

The determining unit 45 determines the block size and block border position information of the currently input image, based on the short cycle buffer buf1_p, buf2_p, buf3_p stored in the short cycle buffer 44 and the occurrence frequency interval1[n], interval2[n], interval3[n] measured with the cycle measuring unit 43, and supplies this to a stabilization processing unit 46.

The stabilization processing unit 46 stabilizes the output block size and block border position information based on the block size and block border position information of the currently input image supplied from the determining unit 45 and the block size and block border position information of the immediately previously input image.

Next, a configuration example of an embodiment of the block level information obtaining unit 41 will be described with reference to FIG. 7. A narrow area level calculating unit 61 calculates the narrow area levels of the pixel of interest, based on multiple pixels that are continuously adjacent as to the pixel of interest, and stores this in the narrow area level storage unit 62 made up of memory.

A narrow area block level feature detecting unit 63 reads the narrow area levels stored in the narrow area level storage unit 62, detects whether or not there are block level features therein, and supplies the detection results to a buffer hist1[x] updating unit 64.

The buffer hist1[x] updating unit 64 updates the narrow area distribution information buffer hist1[x] of the narrow area distribution information buffer 42-1, based on the detection results of the block level features supplied from the narrow area block level feature detecting unit 63.

A mid-area position determining unit 65 determines whether or not the current coordinate position is a multiple of 2, and in the case of being a multiple of 2, supplies the input image to a mid-area level calculating unit 66.

The mid-area level calculating unit 66 calculates the mid-area levels of the pixel of interest, based on multiple pixels that are adjacent one pixel apart as to the pixel of interest, and stores this in a mid-area level storage unit 67 made up of memory.

A mid-area block level feature detecting unit 68 reads the mid-area levels stored in the mid-area level storage unit 67, detects whether or not there are any block level features, and supplies the detection results to a buffer hist2[x] updating unit 69.

The buffer hist2[x] updating unit 69 updates the narrow area distribution information buffer hist2[hx] of the mid-area distribution information buffer 42-2, based on the block level feature detection results supplied from the mid-area block level feature detecting unit 68.

A wide area position determining unit 70 determines whether or not the current coordinate position is a multiple of 4, and in the case of being a multiple of 4, supplies the input image to a wide area level calculating unit 71.

The wide area level calculating unit 71 calculates the wide area levels of the pixel of interest, based on multiple pixels that are adjacent 2 pixels apart from the pixel of interest, and stores this in a wide area level storage unit 72 made up of memory.

A wide area block level feature detecting unit 73 reads the wide area levels stored in the wide area level storage unit 72, detects whether or not there are any block level features, and supplies the detection results to a buffer hist3[x] updating unit 74.

The buffer hist3[x] updating unit 74 updates the narrow area distribution information buffer hist3[qx] of the wide area distribution information buffer 42-3, based on the detection results of the block level features supplied from the wide area block level feature detecting unit 73.

Next, a configuration example of an embodiment of the cycle measuring unit 43 will be described with reference to FIG. 8. A peak determining unit 101 of the occurrence frequency measuring unit 91 detects positions to be the peak for each of the narrow area distribution information buffer hist1 stored in the narrow area distribution information buffer 42-1, the mid-area distribution information buffer hist2 stored in the mid-area distribution information buffer 42-2, and the wide area distribution information buffer hist3 stored in the wide area distribution information buffer 42-3.

A flag setting unit 102 is a flag to confirm the state until the time that the peak is first detected by the peak determining unit 101.

An occurrence frequency updating unit 103 updates the occurrence frequency counters interval1[n], interval2[n], and interval3[n] stored in an occurrence frequency counter 103a, in spacing of the number of pixels wherein the peak is detected, for each of the narrow area, mid-area, and wide area, and outputs the results thereof from an output unit 104 to the determining unit 45.

A peak determining unit 111 of the short cycle buffer obtaining unit 92 is similar to that of the peak determining unit 101, and detects the positions to be the peak for each of the narrow area distribution information buffer hist1 stored in the narrow area distribution information buffer 42-1, the mid-area distribution-information buffer hist2 stored in the mid-area distribution information buffer 42-2, and the wide area distribution information buffer hist3 stored in the wide area distribution information buffer 42-3.

A short cycle buffer updating unit 112 updates each of the short cycle buffers buf1[n], buf2[n], and buf3[n] stored in the short cycle buffer 44 which indicates occurrence frequency for each phase in a predetermined short cycle, for each of the narrow area, mid-area, and wide area.

In the case that a peak is detected by the peak determining unit 111 for each of the narrow area, mid-area, and wide area, a border condition occurrence total updating unit 113 updates border condition occurrence total counters btotal1, btotal2, and btotal3, which are stored in the short cycle buffer 44, as if all border conditions have occurred.

Figure 9:
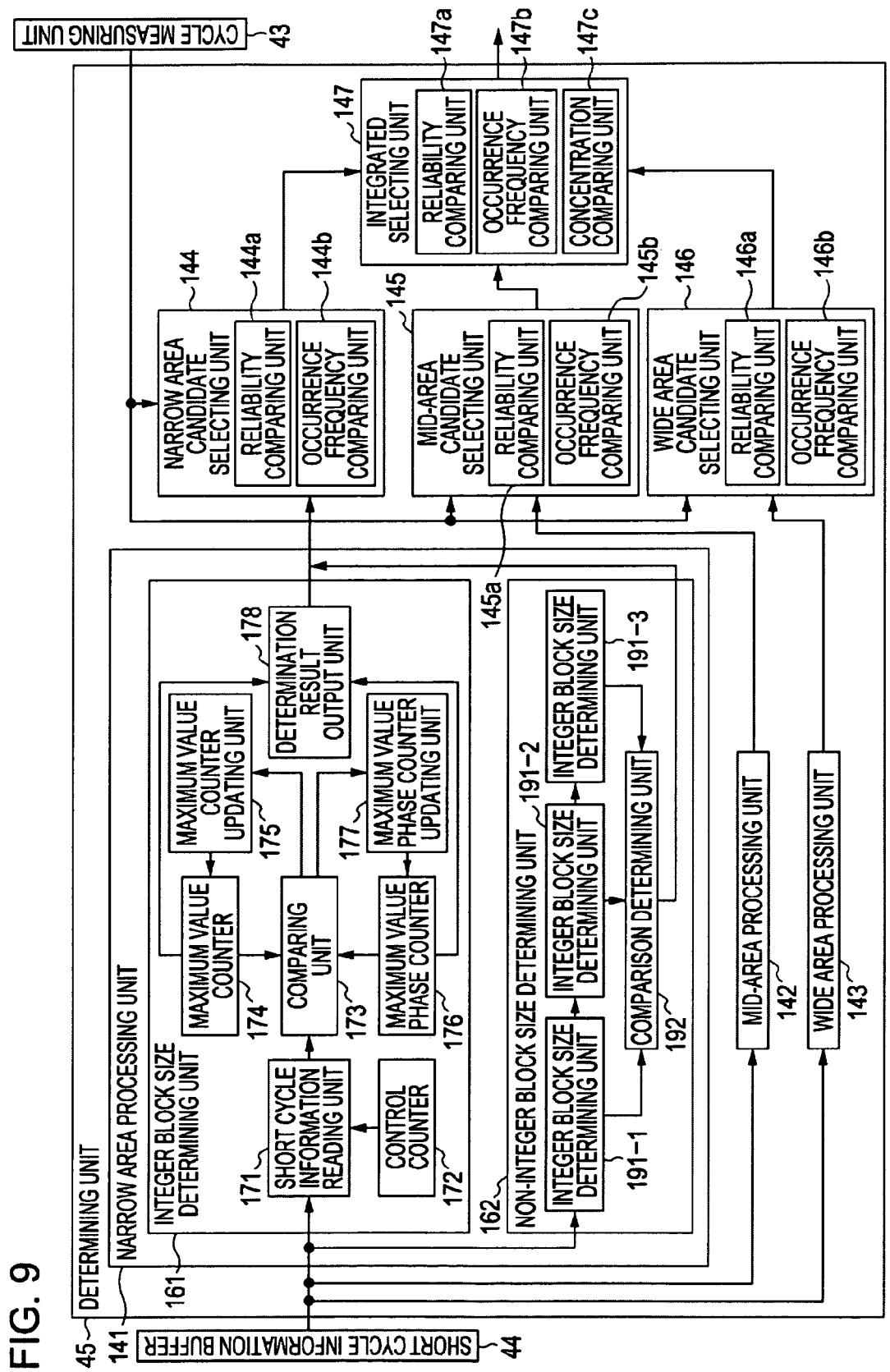
FIG. 9 is a diagram illustrating a configuration example of the determining unit in FIG. 6.

Next, a configuration example of an embodiment of the determining unit 45 will be described with reference to FIG. 9. The determining unit 45 has a narrow area processing unit 141, mid-area processing unit 142, wide area processing unit 143, narrow area candidate selecting unit 144, mid-area candidate selecting unit 145, wide area candidate selecting unit 146, and integrated selecting unit 147.

The narrow area processing unit 141, mid-area processing unit 142, and wide area processing unit 143 obtain predetermined block size, block border position, and reliability information based on the short cycle information stored in the narrow area distribution information buffer hist1, the mid-area distribution information buffer hist2, and the wide area distribution information buffer hist3 respectively, and supplies this to the narrow area candidate selecting unit 144, mid-area candidate selecting unit 145, and wide area candidate selecting unit 146 respectively.

The narrow area candidate selecting unit 144, mid-area candidate selecting unit 145, wide area candidate selecting unit 146 select candidates for the block size, block border position, and reliability information for each of the narrow area, mid-area, and wide area, based on the block size, block border position, and reliability information supplied from each of the narrow area processing unit 141, mid-area processing unit 142, and wide area processing unit 143, and supplies this to the integrated selecting unit 147.

The integrated selecting unit 147 compares the candidate information including block size, block border position, and reliability information supplied from the narrow area candidate selecting unit 144, mid-area candidate selecting unit 145, wide area candidate selecting unit 146, and determines the block sizes and block border positions in the input image.

The narrow area processing unit 141 has an integer block size determining unit 161 and non-integer block size determining unit 162, and generates information including each block size and block border position regarding the block sizes made up of pixel counts for each integer, and block sizes made up of pixel counts for each non-integer.

A short cycle buffer reading unit 171 of the integer block size determining unit 161 reads the short cycle buffer buf1 based on the narrow area distribution information buffer hist1 from the short cycle buffer 44, based on a control counter i supplied by the control counter 172, and supplies this to a comparing unit 173.

The comparing unit 173 sequentially compares the short cycle buffer buf1 and a maximum value counter max stored in maximum value counter 174, and in the case that the short cycle buffer buf1 is a greater value than the maximum value counter max, the comparing unit 173 controls a maximum value counter updating unit 175 to update the maximum value counter max with the short cycle buffer buf1 value. Also, at this time, the comparing unit 173 controls a maximum value phase counter updating unit 177 to update the phase of a maximum value phase counter max_pos stored in the maximum value phase counter 176 as a phase taking the maximum value. That is to say, according to such processing, the comparing unit 173 stores the maximum value serving as the peak value when the short cycle buffer buf1 takes the peak as the maximum value counter max in the maximum value counter 174, and also stores the phase within the short cycle in the maximum value phase counter max_pos.

A determination result output unit 178 generates block size p information for each block size p, based on the maximum value counter max stored in the maximum value counter 174 finally and the maximum value phase counter max_pos stored in the maximum value phase counter 176, and supplies this to the narrow area candidate selecting unit 144.

The non-integer block size determining unit 162 has integer block size determining units 191-1 through 191-3 and comparison determining unit 192. The integer block size determining units 191-1 through 191-3 each have the same configuration as the integer block size determining unit 161. However, the integer block size determining units 191-1 through 191-3 generate block size information for regions having different phases within the short cycle, and supplied each of these to the comparison determining unit 192.

The comparison determining unit 192 generates information including block size, block border position, and reliability information of the non-integer block sizes, based on the block size information from the integer block size determining units 191-1 through 191-3, and supplies this to the narrow candidate selecting unit 144.

Note that the mid-area processing unit 142 and wide area processing unit 143 are similar to the narrow area processing unit 141 except that the mid-area distribution information buffer hist2[x] and wide area distribution information buffer hist3[x] are subjected to processing instead of the narrow area distribution information buffer hist[1], so the description thereof will be omitted.

Figure 10:
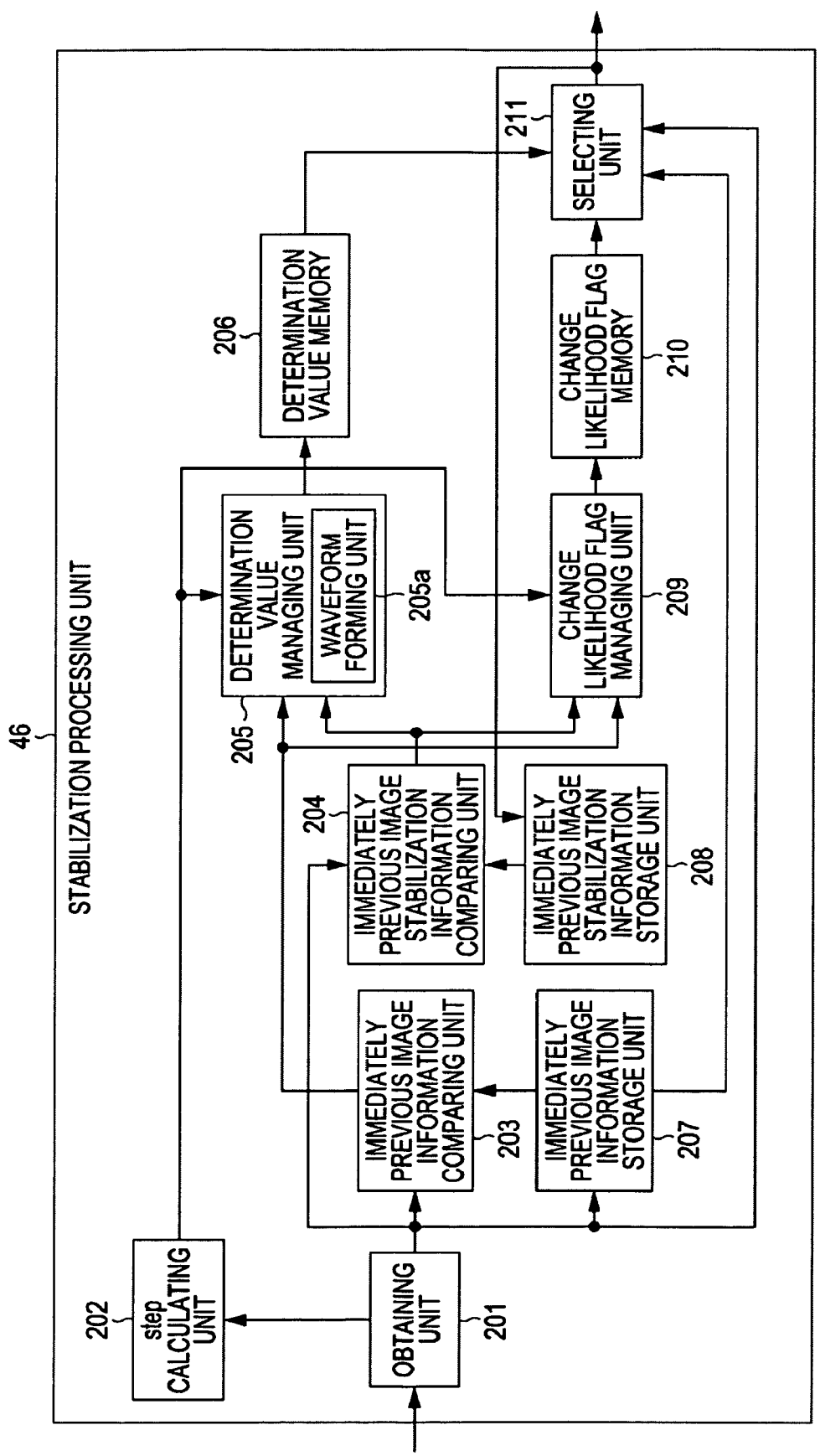
FIG. 10 is a diagram illustrating a configuration example of the stabilization processing unit in FIG. 6.

Next, a configuration example of an embodiment of the stabilization processing unit 46 will be described with reference to FIG. 10. An obtaining unit 201 obtains the block size information supplied from the determining unit 45, and supplies this to a step calculating unit 202, immediately previous image information comparing unit 203, immediately previous image information storage unit 207, and selecting unit 211.

The step calculating unit 202 calculates the control coefficient step based on the reliability information included in the block size information, and supplies this to a determination value managing unit 205 and change likelihood flag managing unit 209.

The immediately previous image information comparing unit 203 compares the block size and block border information before stabilization with the image immediately previous stored in the immediately previous image information storage unit 207 and the block size and block border information of the current image with the obtaining unit 201, and supplies the comparison results to the determination value managing unit 205 and change likelihood flag managing unit 209.

An immediately previous image stabilization information comparing unit 204 compares the block size and block border information after stabilization with the image immediately previous stored in an immediately previous image stabilization information storage unit 208 and the block size and block border information of the current image with the obtaining unit 201, and supplies the comparison results to the determination value managing unit 205 and change likelihood flag managing unit 209.

The determination value managing unit 205 controls a waveform shaping unit 205a to manage the determination values, based on the determination results from the immediately previous image information comparing unit 203 and the immediately previous image stabilization information comparing unit 204, and the control coefficient step, and stores this in determination value memory 206.

The change likelihood flag managing unit 209 manages a change likelihood flag based on the determination results from the immediately previous image information comparing unit 203 and the immediately previous image stabilization information comparing unit 204, and the control coefficient step, and stores this in change likelihood flag memory 210.

Based on the change likelihood flag of the change likelihood flag memory 210 and the determination value of the determination value memory, the selecting unit 211 outputs whether the information is of the block size and block border position of the input image or the block size and block border position of the immediately previous image.

Figure 11:
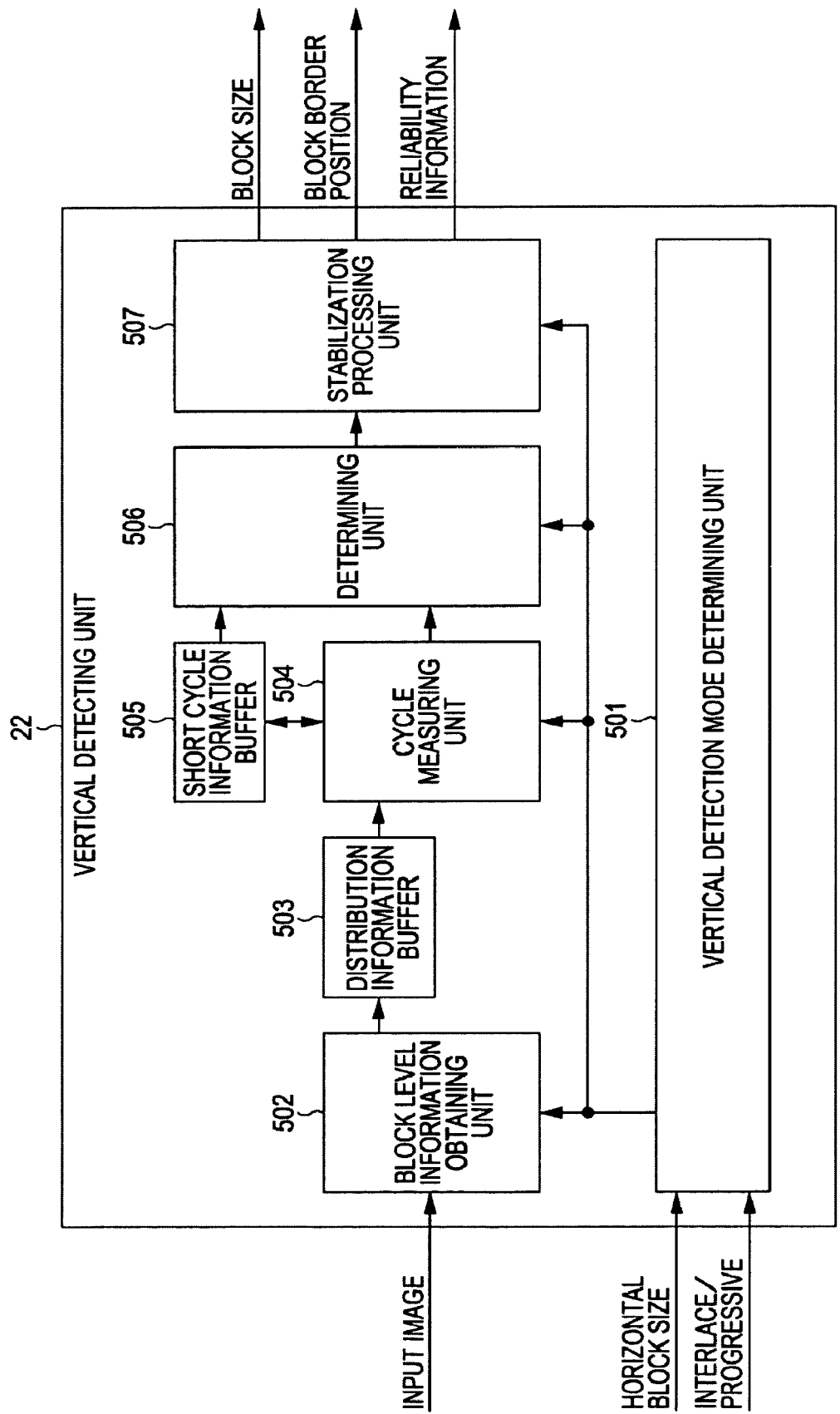
FIG. 11 is a diagram illustrating a configuration example of the vertical detecting unit in FIG. 5.

Next, a configuration example of an embodiment of the vertical detecting unit 22 will be described with reference to FIG. 11. A vertical detection mode determining unit 501 determines a vertical detection mode v_mode corresponding to the horizontal block size, based on information indicating the horizontal block size supplied from the horizontal detection unit 21 and whether the information is interlaced or progressive, and supplies this to the block level information obtaining unit 502, cycle measuring unit 504, determining unit 506, and stabilization processing unit 507.

The block level information obtaining unit 502 obtains block level information from a reference pixel corresponding to the vertical detection mode as to the pixel of interest, in pixel increments of the input image, and outputs this as distribution information to a distribution information buffer 503.

The cycle measuring unit 504 obtains short cycle information indicating detection numbers for each cycle, based on distribution information buffer hist[x] array information stored as distribution information in the distribution information buffer 503, and stores this as an array made up of a short cycle buffer buf_p in a short cycle buffer 505.

The determining unit 506 determines block size and block border position information of the currently input image, based on the short cycle buffer buf_p stored in the short cycle buffer 505, and supplies this to the stabilization processing unit 507.

The stabilization processing unit 507 stabilizes the output block size and block border position information, based on the block size and block border position information currently input that is supplied from the determining unit 506, and the block size and block border position information of the image immediately previously input.

Figure 12:
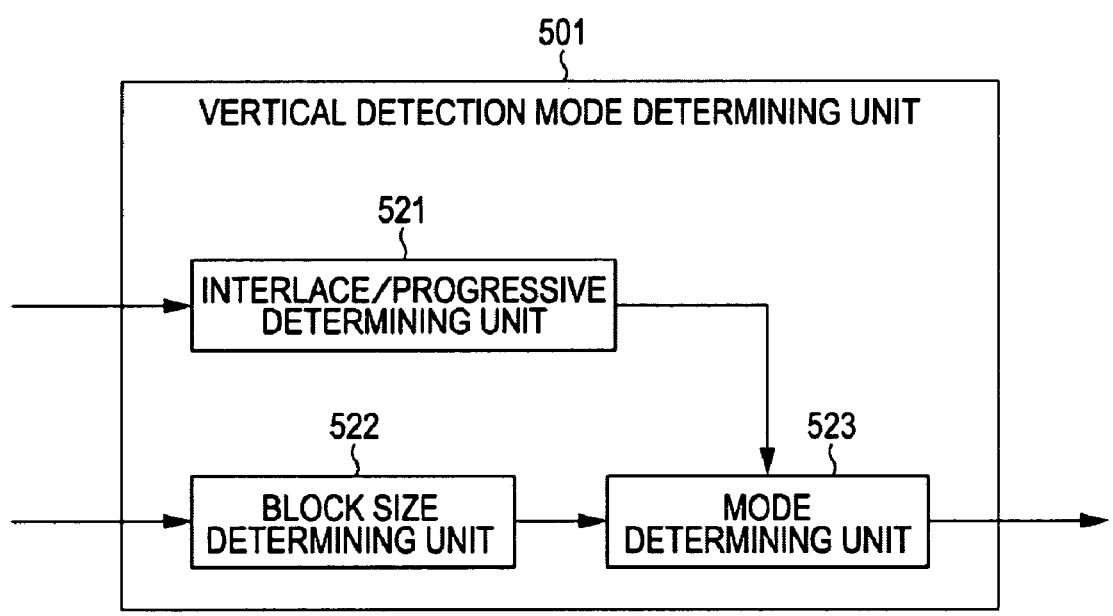
FIG. 12 is a diagram illustrating a configuration example of the vertical detecting mode determining unit in FIG. 11.

Next, a configuration example of an embodiment of the vertical detection mode determining unit 501 will be described with reference to FIG. 12. The vertical detection mode determining unit 501 has an interlace/progressive determining unit 521, block size determining unit 522, and mode determining unit 523.

The interlace/progressive determining unit 521 determines whether the input image is an interlace image or a progressive image, based on a signal indicating whether the image format is an interlace image or a progressive image, and supplies the determination results to the mode determining unit 523.

The block size determining unit 522 determines a horizontal block size supplied from the horizontal processing unit 21, and supplies the determination results to the mode determining unit 523.

The mode determining unit 523 determines the vertical detection mode v_mode, based on determination results of whether the input image is an interlace image or progressive image, and the horizontal block size, and supplies this to the block level information obtaining unit 502, cycle measuring unit 504, determining unit 506, and stabilization processing unit 507.

Figure 13:
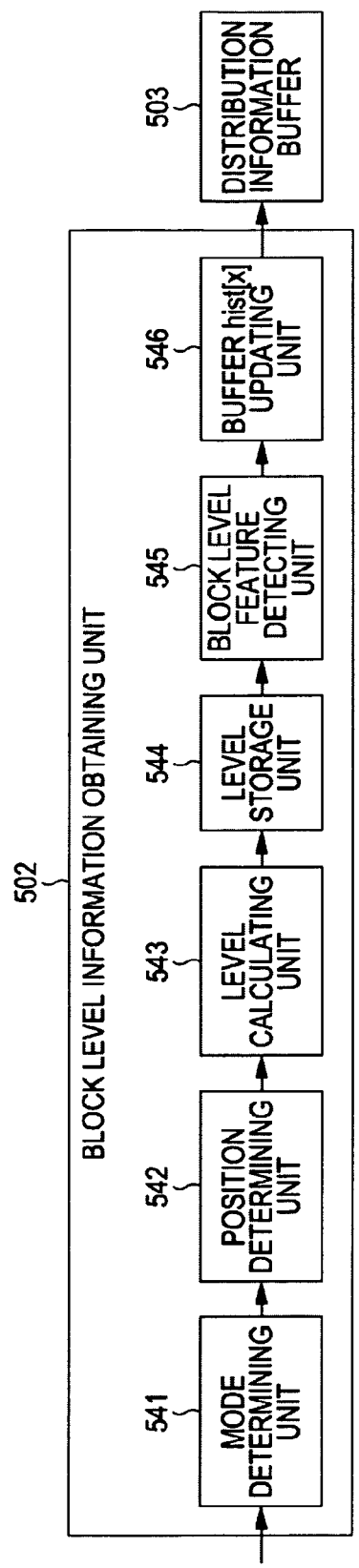
FIG. 13 is a diagram illustrating a configuration example of the block level information obtaining unit in FIG. 11.

Next, a configuration example of an embodiment of the block level information obtaining unit 502 will be described with reference to the block diagram in FIG. 13. A mode determining unit 541 obtains the vertical detection mode v_mode, determines which mode the vertical detection mode v_mode is, and supplies the determination results to a position determining unit 542.

The position determining unit 542 determines whether or not the level is calculated with the current position counter y in the vertical direction, based on the vertical detection mode v_mode, and based on the detection results, causes a level calculating unit 543 to execute level calculations.

A level calculation unit 543 calculates the level difference from the pixel of interest, based on multiple pixels which are continuously adjacent to the pixel of interest or are adjacent one pixel apart, based on the determination results of the position determining unit 542, and stores this in a level storage unit 544 made up of memory.

A block level feature detecting unit 545 reads the levels stored in the level storage unit 544, detects whether there are any block level features, and supplies the detection results in a buffer hist[x] updating unit 546.

The buffer hist1[x] updating unit 546 updates the distribution information buffer hist1[x] of the distribution information buffer 503, based on detection results of the block level features supplied from the block level feature detecting unit 545.

Figure 14:
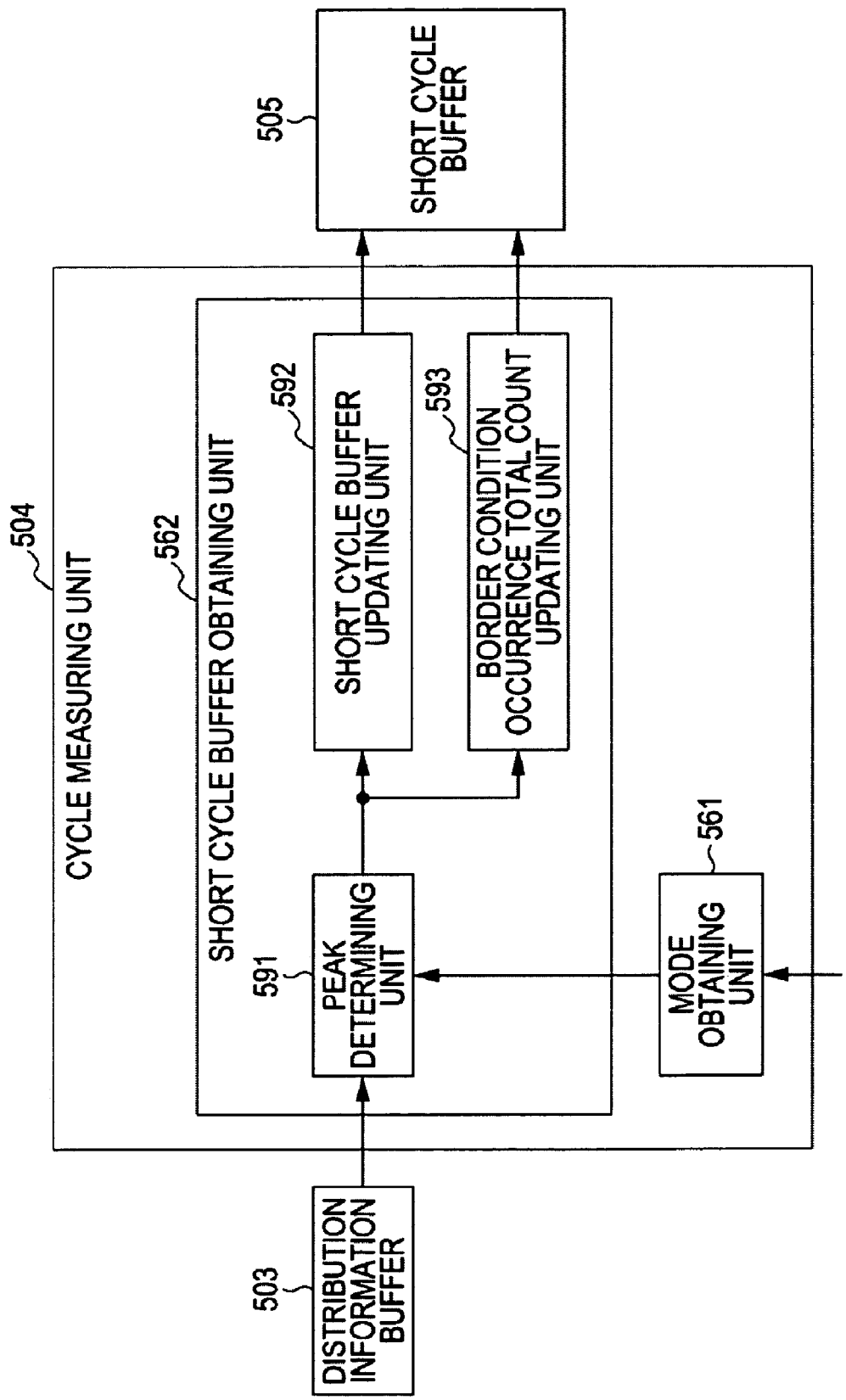
FIG. 14 is a diagram illustrating a configuration example of the cycle measuring unit in FIG. 11.

Next, a configuration example of an embodiment of the cycle measuring unit 504 will be described with reference to the block diagram in FIG. 14. A mode obtaining unit 561 obtains the vertical detection mode v_mode supplied from the vertical detection mode determining unit 501, and supplies the vertical detection mode v_mode to a peak determining unit 591.

The peak determining unit 591 of a short cycle buffer 562 detects positions to be peaks for each phase of the short cycle corresponding to the vertical detection mode v_mode supplied from the mode determining unit 561, for the distribution information buffer hist stored in the distribution information buffer 503.

A short cycle buffer updating unit 592 updates the short cycle buffer buf[n] stored in the short cycle buffer 505 which expresses the occurrence frequency for each phase in a predetermined short cycle.

A border condition occurrence total updating unit 593 updates a border condition occurrence total counter btotal which is stored in the short cycle buffer 44 as all border conditions having occurred, in the case that a peak is detected by the peak determining unit 591.

Figure 15:
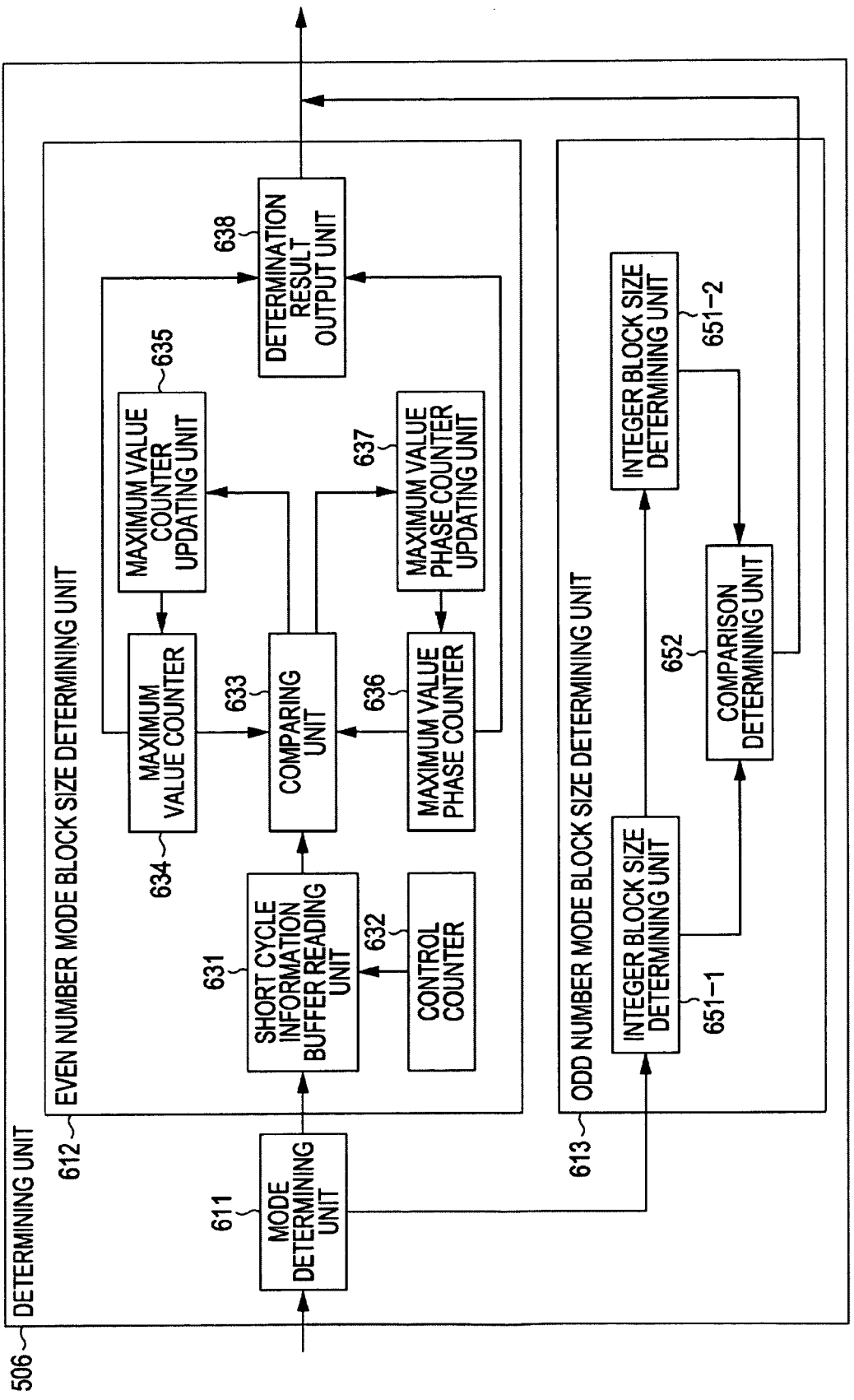
FIG. 15 is a diagram describing a configuration example of the determining unit in FIG. 11.

Next, a configuration example of an embodiment of the determining unit 506 will be described with reference to the block diagram in FIG. 15. A mode determining unit 611 determines whether the vertical detection mode v_mode is an odd number mode or an even number mode, and when an even number mode, the short cycle buffer 505 is connected to an even number mode block size determining unit 612, and when an odd number mode, the short cycle buffer 505 is connected to an odd number mode block size determining unit 613.

A short cycle information buffer reading unit 631 of the odd number mode block size determining unit 612 reads the short cycle buffer buf[i] from the short cycle buffer 505, based on the control counter i supplied from a control counter 632, and supplies this to a comparing unit 633.

The comparing unit 633 sequentially compares the short cycle buffer buf and the maximum value counter max that is stored in a maximum value counter 634, and in the case that the short cycle buffer buf is a value greater than the maximum value counter max, a maximum value counter updating unit 635 is controlled to update the maximum value counter max with the value of the short cycle buffer buf. Also, at this time, the comparing unit 633 controls a maximum value phase counter updating unit 637 to update the phase of the maximum value phase counter max_pos stored in a maximum value phase counter 636.

A determination result output unit 638 generates and outputs block size p information for each block size p, based on the final maximum value counter max that is stored in the maximum value counter 634 and the final maximum value phase counter max_pos stored in the maximum value phase counter 636.

The off number mode block size determining unit 613 has even number mode block size determining units 651-1 and 651-2, and a comparison determining unit 652. The even number mode block size determining units 651-1 and 651-2 each have the same configuration as the even number mode block size determining unit 612.

The comparison determining unit 652 generates and outputs block size information of the odd number mode block size, based on the block size information from the even number mode block size determining units 651-1 and 651-2.

Next, block border information detection processing with the block border information detecting unit 11 in FIG. 5 will be described with reference to the flowchart in FIG. 16. Note that hereafter, an example is described wherein the block size in the horizontal direction of 8 pixels, 10.67 pixels, and 12 pixels only are detected, but an arrangement may be made wherein other block sizes using a similar method are detected.

In step S1, the block border information detecting unit 11 sets a detection range for detecting the block border information in the input image. The detection range can be freely set, but if to obtain the block noise strength in image increments, near the center where there is less distortion as to the edges has the greatest likelihood of an appropriate image being read, so in the case that the input image size is hsize (pixels)× vsize (pixels) as to the horizontal direction and vertical direction, a detection range made up of a range near the center pixel as to the horizontal direction (coordinates near (hsize/2)) and a range near the center pixel as to the vertical direction (coordinates near (hsize/2)) is set. Note that an arrangement may be made wherein multiple detection ranges are set, and the block border information is detected with each detection range.

In step S2, the immediately previous image information storage unit 207 and the immediately previous image stabilization information storage unit 208 in the stabilization processing unit 46 of the horizontal detecting unit 21 are reset. At this time, the vertical detecting unit 22 is also subjected to similar reset processing.

In step S3, the horizontal detecting unit 21 executes horizontal detecting processing, and detects the block size and block border information in the horizontal direction.

Now, horizontal detection processing will be described with reference to the flowchart in FIG. 17.

In step S11, the block level information obtaining unit 41 executes block level obtaining processing, and obtains block level information.

Figure 18B:
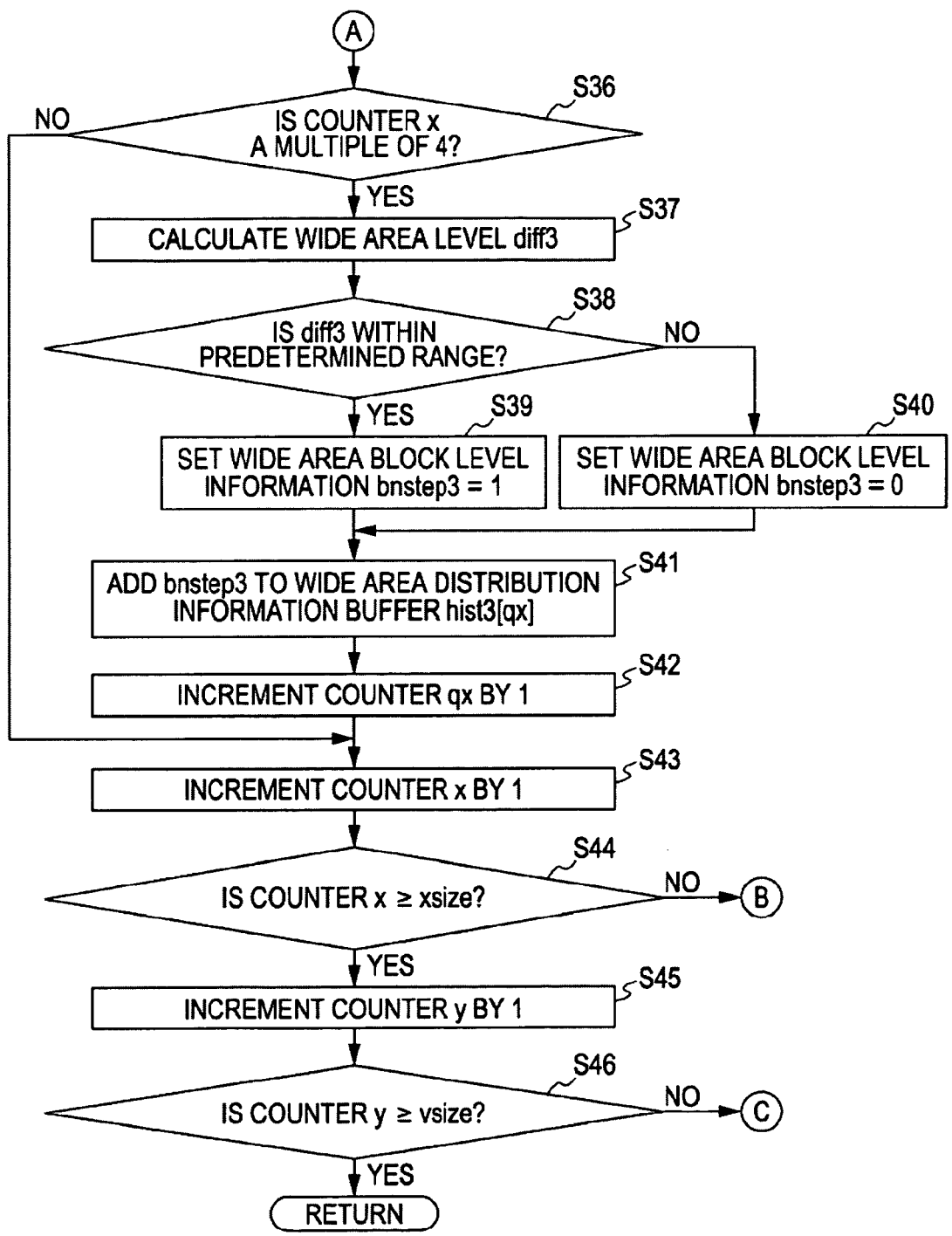
FIG. 18 is a flowchart describing the block level information obtaining processing FIG. 17.

Now, block level information obtaining processing will be described with reference to the flowchart in FIG. 18.

In step S21, the block level information obtaining unit 41 initializes to 0 the narrow area distribution information buffer hist1[$x$] that accumulates the distribution number of block levels in a narrow area range as to the pixel of interest, the mid-area distribution information buffer hist2[$hx$] that accumulates the distribution number of block levels in a mid-area range as to the pixel of interest, and the wide area distribution information buffer hist3[$qx$] that accumulates the distribution number of block levels in a wide area range as to the pixel of interest, which are stored in the narrow area distribution information buffer 42-1, mid-area distribution information buffer 42-2, and wide area distribution buffer 42-3 respectively.

In step S22, the block level information obtaining unit 41 initializes the vertical position counter y indicating the vertical position of an unshown input image to 0.

In step S23, the block level information obtaining unit 41 initializes the horizontal position counters x, hx, qx showing a horizontal position as to each of the narrow area, mid-area, and wide area as to the unshown input image to 0.

In step S24, the narrow area level calculating unit 61 sets the pixels shown in the coordinates (x, y) of the pixels in the input image as a pixel of interest, calculates the narrow range level diff1 with the pixel of interest and the nearby reference pixel set corresponding to the pixel of interest, and stores the calculation results in the narrow area level storage unit 62.

Figure 19:
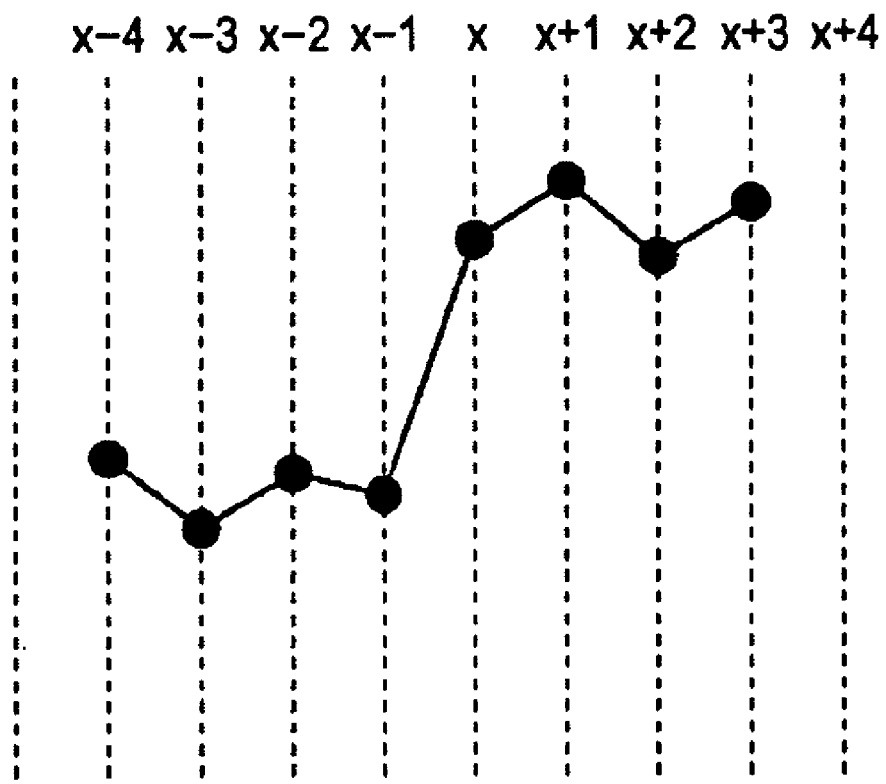
FIG. 19 is a diagram illustrating the block level information obtaining processing FIG. 17.

For example, with the nearby pixels in the narrow area, in the case that 8 pixels, made up of 3 pixels adjacent in the right direction and 4 pixels adjacent in the left direction, are used, with the pixel of interest as the center, if the pixel of interest is expressed as pixel P[x] wherein the coordinate position of the pixel of interest is x, as shown in FIG. 19, the 2 pixels adjacent in the right direction are expressed as pixels P[x+1], P[x+2], P[x+3] from the nearest pixel to the pixel of interest, and the pixels adjacent in the left direction are expressed as pixels P[x−1], P[x−2], P[x−3], and P[x−4] respectively, from the pixels nearest the pixel of interest. At this time, the narrow area level calculating unit 61 calculates the Expression (1) below, thereby calculating the level diff1 of the pixel of interest. Note that in FIG. 19, the horizontal axis is the coordinate of the pixels in the horizontal direction, and the vertical axis shows the pixel value of the corresponding pixels. Also, processing as to the horizontal direction is described here, but it goes without say that processing may be made as to the vertical direction.

$$\text{diff1}[x]=|P[x]-P[-1]|-(|P[x-3]-P[x-4]|+|P[x-2]-P[x-3]|+|P[x-1]-P[x-2]|+|P[x+1]-P[x]|+|P[x+2]-P[x+1]|+|P[x+3]-P[x+2]|)/6 \quad (1)$$

Here, diff1[$x$] indicates the level of the narrow area of the pixel of interest P[x], and P[x+1], P[x+2], P[x+3], P[x], P[x−1], P[x−2], P[x−3], P[x−4] each indicate a pixel value of P[x+1], P[x+2], P[x+3], P[x], P[x−1], P[x−2], P[x−3], P[x−4].

That is to say, with the Expression (1), the narrow area level diff1 is a value wherein the average value of the difference absolute value of the pixel values between pixels for each of between pixels P[x−4], P[x−3], between pixels P[x−3], P[x−2], between pixels P[x−2], P[x−1], between pixels P[x], P[x+1], between pixels P[x+1], P[x+2], and between pixels P[x+2], P[x+3], is subtracted from the difference absolute value of the pixel values between the pixel of interest P[x] and the pixel P[x−1] to the left side thereof.

In step S25, the narrow area block level feature detecting unit 63 determines whether or not the narrow area level diff1[$x$] stored in the narrow area level storage unit 62 is a value within a predetermined range. In step S25, for example, in the case that the narrow area level diff1[$x$] stored in the narrow area level storage unit 62 is a value within the predetermined range, in step S26 the narrow area block level feature detecting unit 63, having considered the narrow area level diff1[$x$] corresponding to the pixel of interest as having block level features, based on the determination results, sets a narrow area block level feature information bnstep1 to 1, and supplies this to the buffer hist1[$x$] updating unit 64.

On the other hand, in step S25, for example in the case that the narrow area level diff1[$x$] stored in the narrow area level storage unit 62 is not a value within the predetermined range, in step S27 the narrow area block level feature detecting unit 63 sets the narrow area block level feature information bnstep1 to 0, based on the determination results that the narrow area level diff1[$x$] is not a value within the predetermined range, and supplies this to the buffer hist1[$x$] updating unit 64.

In step S28, the buffer hist1[$x$] updating unit 64 adds and stores the narrow area block level feature information bnstep1 to the buffer hist1[$x$] stored in the narrow area distribution information buffer 42-1.

In step S29, the mid-area position determining unit 65 determines whether or not the counter x is a multiple of 2. In step S29, in the case that the counter x is a multiple of 2, for example, in step S30 the mid-area level calculating unit 66 sets the pixel shown with the coordinates (x, y) of the pixels in the input image as the pixel of interest, calculates a mid-area level diff2 with the pixel of interest and a reference pixel in a nearby mid-area that is set corresponding to the pixel of interest, and stores the calculation results in the mid-area level storage unit 67.

Figure 20:
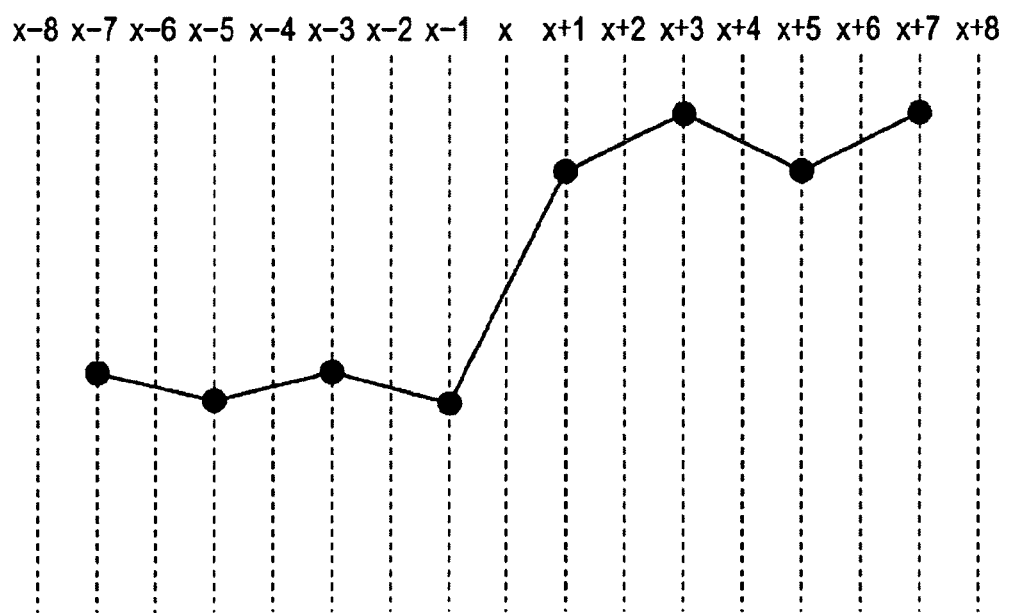
FIG. 20 is a diagram illustrating the block level information obtaining processing FIG. 17.

For example, in the case that 8 pixels made up of 3 pixels adjacent 1 pixel apart in the right direction and 4 pixels adjacent 1 pixel apart in the left direction, with the pixel of interest as the center are employed as reference pixels in a mid-area, if we say that the coordinate position of the pixel of interest is x and express the pixel of interest as pixel P[x], as shown in FIG. 20, the pixel positions are expressed wherein the 3 pixels adjacent 1 pixel apart in the right direction are pixels P[x+2], P[x+4], P[x+6] from the pixel nearest the pixel of interest, and the 4 pixels adjacent 1 pixel apart in the left direction are pixels P[x−2], P[x−4], P[x−6], P[x−8]. At this time, the mid-area level calculating unit 67 calculates the mid-area level diff2 of the pixel of interest by calculating the Expression (2) below. Note that in FIG. 20, the horizontal axis shows the pixel coordinate in the horizontal direction, and the vertical axis shows the pixel value of the corresponding pixel. Also, processing as to the horizontal direction is described here, but it goes without saying that an arrangement may be made wherein the processing as to the vertical direction may be made.

$$\text{diff2}[hx] = -|P[x]-P[x-2]|-(|P[x-8]-P[x-6]|+|P[x-6]-P[x-4]|+|P[x-4]-P[x-2]|+|P[x]-P[x+2]|+|P[x+2]-P[x+4]|+|P[x+4]-P[x+6]|)/6 \quad (2)$$

Here, diff2[$hx$] indicates the level of the mid-area level of the pixel of interest P[x] when the counter x is a multiple of 2, and P[x+2], P[x+4], P[x+6], P[x], P[x−2], P[x−4], P[x−6], P[x−8] each indicate a pixel value of P[x+2], P[x+4], P[x+6], P[x], P[x−2], P[x−4], P[x−6], P[x−8].

That is to say, with the Expression (2), the mid-area level diff2 is a value wherein the average value of the difference absolute value of the pixel values between pixels for each of between pixels P[x−8], P[x−6], between pixels P[x−6], P[x−4], between pixels P[x−4], P[x−2], between pixels P[x], P[x+2], between pixels P[x+2], P[x+4], and between pixels P[x+4], P[x+6], is subtracted from the difference absolute value of the pixel value of the pixel P[x−2] wherein the pixel of interest P[x] is the center.

In step S31, the mid-area block level feature detecting unit 68 determines whether or not the mid-area level diff2[$hx$] stored in the mid-area level storage unit 67 is a value within a predetermined range. In step S31, for example, in the case that the mid-area level diff2[$hx$] stored in the mid-area level storage unit 67 is a value within the predetermined range, in step S32 the mid-area block level feature detecting unit 68, having considered the mid-area level diff2[$hx$] corresponding to the pixel of interest as having block level features, based on the determination results, sets a mid-area block level feature information bnstep2 to 1, and supplies this to the buffer hist2[$hx$] updating unit 69.

On the other hand, in step S31, for example in the case that the mid-area level diff2[$hx$] stored in the mid-area level storage unit 67 is not a value within the predetermined range, in step S33 the mid-area block level feature detecting unit 68 sets the mid-area block level feature information bnstep2 to 0, based on the determination results that the mid-area level diff2[$hx$] is not a value within the predetermined range, and supplies this to the buffer hist2[$hx$] updating unit 69.

In step S34, the buffer hist2[$hx$] updating unit 69 adds and stores the mid-area block level feature information bnstep2 to the buffer hist2[$hx$] stored in the mid-area distribution information buffer 42-2.

In step S35, the mid-area position determining unit 65 increments the counter hx by 1.

In step S36, the wide area position determining unit 70 determines whether or not the counter x is a multiple of 4. In step S36, in the case that the counter x is a multiple of 4, for example, in step S37 the wide area level calculating unit 71 sets the pixel shown with the coordinates (x, y) of the pixels in the input image as the pixel of interest, calculates a wide area level diff3 with the pixel of interest and a reference pixel in a nearby wide area that is set corresponding to the pixel of interest, and stores the calculation results in the wide area level storage unit 72.

Figure 21:
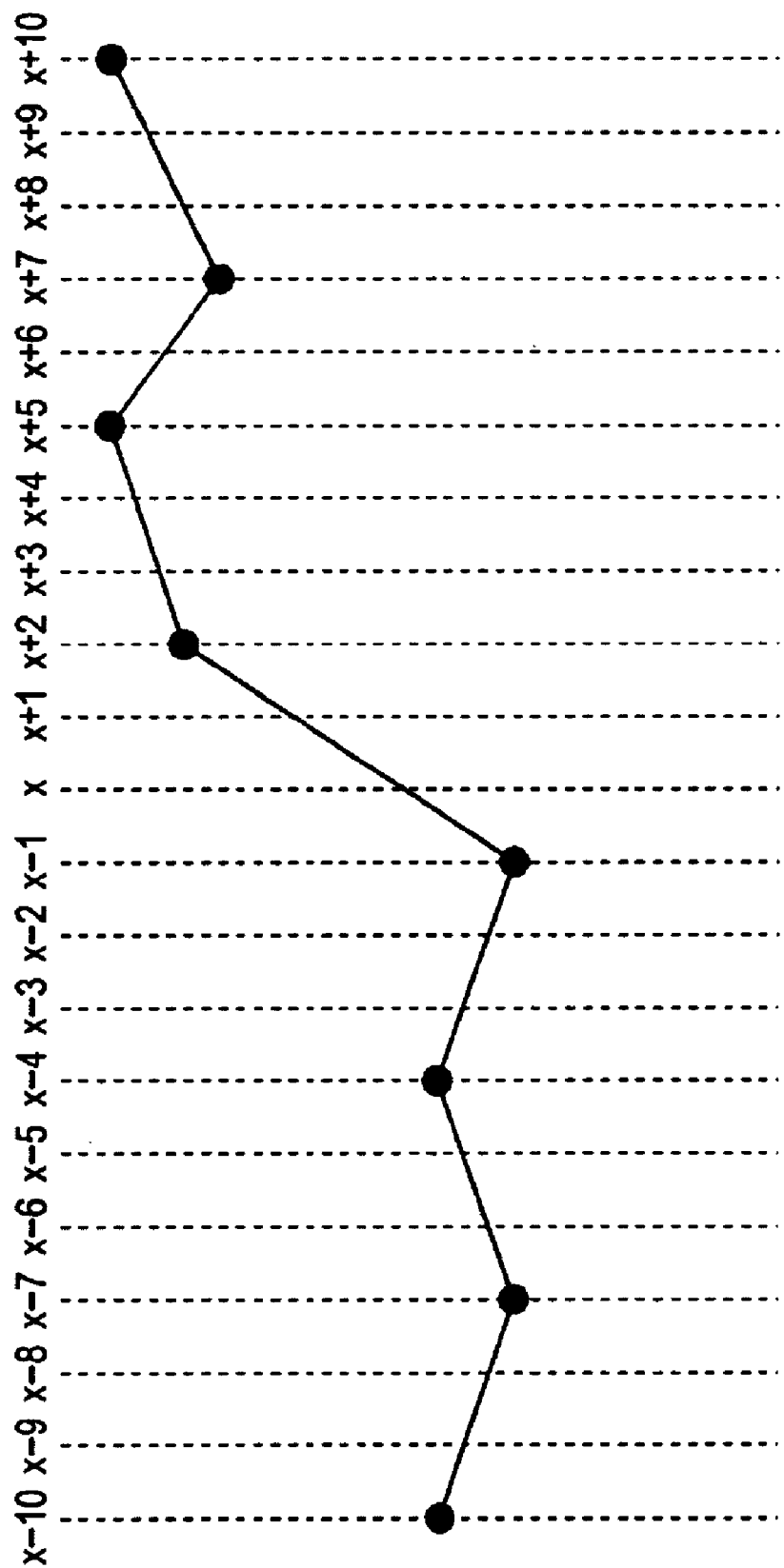
FIG. 21 is a diagram illustrating the block level information obtaining processing FIG. 17.

For example, in the case that 8 pixels made up of 3 pixels adjacent 2 pixels apart in the right direction and 4 pixels adjacent 2 pixels apart in the left direction, with the pixel of interest as the center are employed as reference pixels in a wide area, if we say that the coordinate position of the pixel of interest is x and express the pixel of interest as pixel P[x], as shown in FIG. 21, the pixel positions are expressed wherein the 3 pixels adjacent 2 pixels apart in the right direction are pixels P[x+3], P[x+6], P[x+9] from the pixel nearest the pixel of interest, and the 4 pixels adjacent 2 pixels apart in the left direction are pixels P[x−3], P[x−6], P[x−9], P[x−12] from the pixel nearest the pixel of interest. At this time, the wide area level calculating unit 71 calculates the wide area level diff3 of the pixel of interest by calculating the Expression (3) below. Note that in FIG. 21, the horizontal axis shows the pixel coordinate in the horizontal direction, and the vertical axis shows the pixel value of the corresponding pixel. Also, processing as to the horizontal direction is described here, but it goes without saying that an arrangement may be made wherein the processing as to the vertical direction may be made.

$$\text{diff3}[qx] = |P[x]-P[x-3]|-(|P[x-12]-P[x-9]|+|P[x-9]-P[x-6]|+|P[x-6]-P[x-3]|+|P[x]-P[x+3]|+|P[x+3]-P[x+6]|+|P[x+6]-P[x+9]|)/6 \quad (3)$$

Here, diff3[$qx$] indicates the level of the wide area level of the pixel of interest P[x] when the counter x is a multiple of 4, and P[x+3], P[x+6], P[x+9], P[x], P[x−3], P[x−6], P[x−9], P[x−12] each indicate a pixel value of P[x+3], P[x+6], P[x+9], P[x], P[x−3], P[x−6], P[x−9], P[x−12].

That is to say, with the Expression (3), the wide area level diff3 is a value wherein the average value of the difference absolute value of the pixel values between pixels for each of between pixels P[x−12], P[x−9], between pixels P[x−9], P[x−6], between pixels P[x−6], P[x−3], between pixels P[x], P[x+3], between pixels P[x+3], P[x+6], and between pixels P[x+6], P[x+9], is subtracted from the difference absolute value of the pixel values of the pixel P[x−3] wherein the pixel of interest P[x] is the center, and the pixel P[x] thereof.

In step S38, the wide area block level feature detecting unit 73 determines whether or not the wide area level diff3[$qx$] stored in the wide area level storage unit 72 is a value within a predetermined range. In step S38, for example, in the case that the wide area level diff3[$qx$] stored in the wide area level storage unit 72 is a value within the predetermined range, in step S39 the wide area block level feature detecting unit 73, having considered the wide area level diff3[$qx$] corresponding to the pixel of interest as having block level features, based on the determination results, sets a wide area block level feature information bnstep3 to 1, and supplies this to the buffer hist3[$qx$] updating unit 74.

On the other hand, in step S38, for example in the case that the wide area level diff3[$qx$] stored in the wide area level storage unit 72 is not a value within the predetermined range, in step S40 the wide area block level feature detecting unit 73 sets the wide area block level feature information bnstep3 to 0, based on the determination results that the wide area level diff3[$qx$] is not a value within the predetermined range, and supplies this to the buffer hist3[$qx$] updating unit 74.

In step S41, the buffer hist3[$qx$] updating unit 74 adds and stores the wide area block level feature information bnstep3 to the buffer hist3[$qx$] stored in the wide area distribution information buffer 42-3.

In step S42, the wide area position determining unit 70 increments the counter qx by 1.

In step S43, the block level information obtaining unit 41 increments the counter x by 1.

In step S44, the block level information obtaining unit 41 determines whether or not the counter x is greater than the detection range xsize in the horizontal direction, and in the case that the counter x is not greater, the processing is returned to step S24. That is to say, the processing in steps S24 through S44 is repeated. In step S44, in the case that the counter x is greater than the detection range xsize, in step S45 the block level information obtaining unit 41 increments the counter y by 1.

In step S46, the block level information obtaining unit 41 determines whether or not the counter y is greater than the detection range ysize in the vertical direction, and in the case that the counter y is not greater, the processing is returned to step S23. That is to say, the processing in steps S23 through S44 is repeated. In step S46, in the case that the counter y is greater than the detection range ysize, the processing is ended.

Also, in the case determination is made in step S29 that the counter x is not a multiple of 2, the processing in steps S30 through S35 is skipped. Further, in the case determination is made in step S36 that the counter x is not a multiple of 4, the processing in steps S37 through S42 is skipped.

With the above-described processing, the pixel count in the horizontal direction considered to be block levels by the nearby pixels adjacent to each pixel of interest are stored as block level information in the narrow area distribution information buffer hist1[$x$], mid-area distribution information buffer hist2[$hx$], and wide area distribution information buffer hist3[$qx$] respectively in the narrow area distribution information buffer 42-1, mid-area distribution information buffer 42-2, and wide area distribution information buffer 42-3. At this time, the mid-area distribution information buffer hist2[$hx$] is used only when the counter x is a multiple of 2, so the number of times of detection is half of the narrow area distribution information buffer hist1[$x$]. Also, the wide area distribution information buffer hist3[$qx$] is used only when the counter x is a multiple of 4, so the number of times of detection is ¼ of the narrow area distribution information buffer hist1[$x$].

Note that the distribution information should be in accordance with the block size, whereby narrow area distribution information corresponding to a relatively small block size, mid-area distribution information corresponding to a medium block size, and wide area distribution information corresponding to a relatively large block size, are used. Therefore, with the later-described vertical detection processing, distribution information to be used can be identified from the block size obtained from the horizontal detection processing to a certain extent, whereby only the narrow area distribution information, mid-area distribution information, or wide area distribution information have to be obtained.

Figure 17:
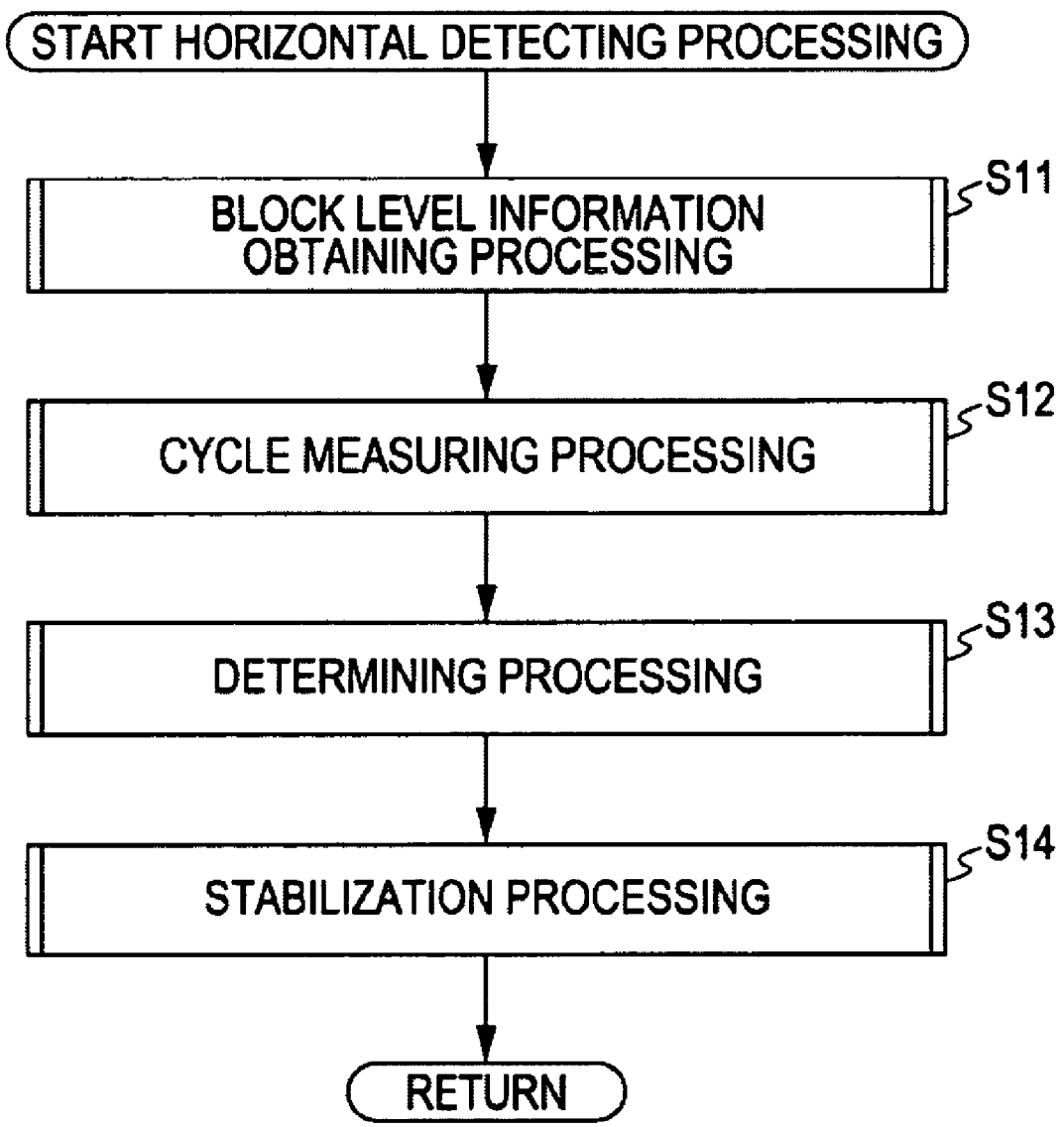
FIG. 17 is a flowchart describing the horizontal detecting processing in FIG. 15.

Let us now return to the flowchart in FIG. 17. Upon the block level information being obtained in step S11, the cycle measuring unit 43 executes cycle measuring processing in step S12 and measures occurrence frequency and short cycle information.

Cycle measuring processing with the cycle measuring unit 43 will be described now with reference to FIG. 22. In step S61, the cycle measuring unit 43 sets the distribution information buffer to be processed to the narrow area distribution information buffer hist1[$x$] stored in the narrow area distribution information buffer 42-1.

In step S62, the occurrence frequency measuring unit 91 executes occurrence frequency measuring processing as to the narrow area distribution information buffer hist1[$x$], and measures the occurrence frequency interval1[$n$].

Figure 23:
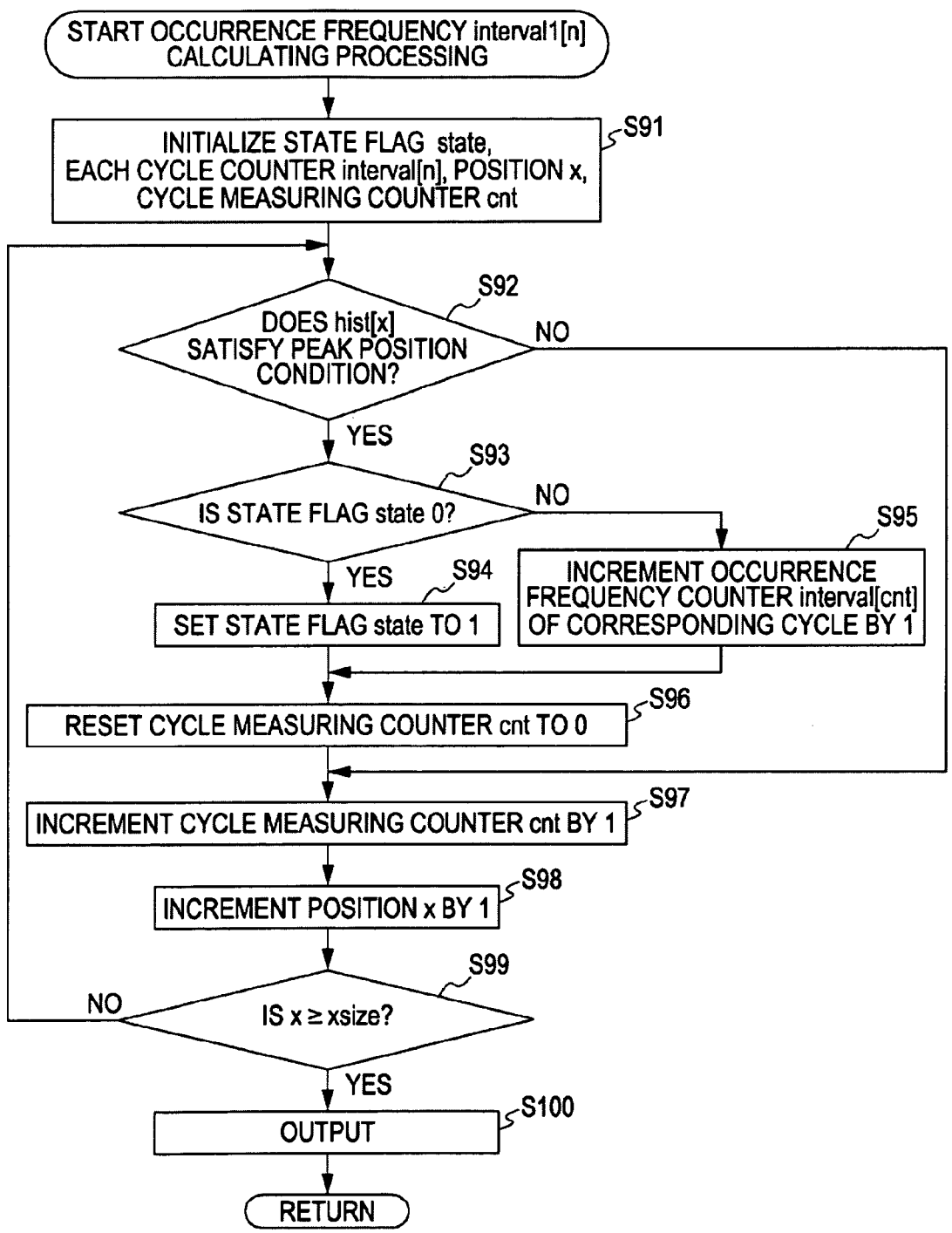
FIG. 23 is a flowchart describing the occurrence frequency interval1[n] calculation processing in FIG. 22.

The occurrence frequency measuring processing will be described now with reference to the flowchart in FIG. 23.

In step S91, the occurrence frequency measuring unit 91 initializes each of the unshown state flat state, cycle measuring counter cnt, cycle counter interval1[$cnt$] that shows occurrence frequency, and position counter x, to 0.

In step S92, the peak determining unit 101 reads the narrow area distribution information buffer hist1[$x$] from the narrow area distribution information buffer 42-1 and the nearby values, and determines whether or not the value of the narrow area distribution information buffer hist1[$x$] satisfies the peak conditions. More specifically, for example, the peak determining unit 101 reads the narrow area distribution information buffer hist1[$x$] from the narrow area distribution information buffer 42-1 and the narrow area distribution information buffers hist1[$x-n$] through hist1[$x+m$] as nearby values thereto, wherein the peak determining unit 101 determines whether or not the narrow area distribution information buffer hist1[$x$] takes the maximum value of the narrow area distribution information buffers hist1[$x-n$] through hist1[$x+m$] (where n and m are arbitrary integers), and whether or not this value is greater than the predetermined threshold value peak_th, thereby determining whether or not the peak conditions are satisfied.

In the case determination is made in step S92 that the peak conditions are satisfied, for example, in step S93 the flag setting unit 102 determines whether or not the state flag state is 0. In the case that the peak conditions are satisfied for the first time in step S93, the state flag is 0, so the processing is advanced to step S94.

In step S94, the flag setting unit 102 sets the state flag state to 1. With the processing in step S94, for example, in the case that the state such as satisfying the peak conditions in step S93 is the second time or thereafter, the state flag is 1, so the processing is advanced to step S95.

In step S95, the occurrence frequency updating unit 103 increments the occurrence frequency counter interval1[$cnt$] of the occurrence frequency counter 103a by 1.

In step S96, the occurrence frequency measuring unit 91 resets the cycle measuring counter cnt to 0.

In step S97, the occurrence frequency measuring unit 91 increments the cycle measuring counter cnt by 1.

In step S98, the occurrence frequency measuring unit 91 increments the counter x by 1.

In step S99, the occurrence frequency measuring unit 91 determines whether or not the counter x is greater than the xsize which is the horizontal size of the detection range. In the case that the counter x is not greater than the sxize which is the horizontal size of the detection range in step S99, the processing is returned to step S92.

In step S100, the output unit 104 reads the occurrence frequency counter interval1[n] from the occurrence frequency counter 103a of the occurrence frequency updating unit 103, and outputs this to the determining unit 105.

On the other hand, in the case that the peak position conditions are not satisfied in step S92, the processing in steps S93 through S96 is skipped.

Each time a peak of the narrow area distribution information buffer hist1[x] detected as a peak with the above processing is detected, this is counted with the occurrence frequency counter interval[n] in intervals of peak occurrences, the number of detections in intervals of peak occurrences is measured as the occurrence frequency, and this is output to the determining unit 45.

Accordingly, in a case wherein an image having a horizontal block size of 8 pixels or 12 pixels is input and noise occurs in block increments, the likelihood is high for the interval1[8] or interval1[12] to be sequentially counted every 8 pixels or every 12 pixels from the position first detected as a peak. Also, when an image having a horizontal block size of 10.67 pixels is input, the likelihood is high for the interval1[10] or interval1[11] to be sequentially counted at a predetermined ratio from the position first detected as a peak.

Figure 22:
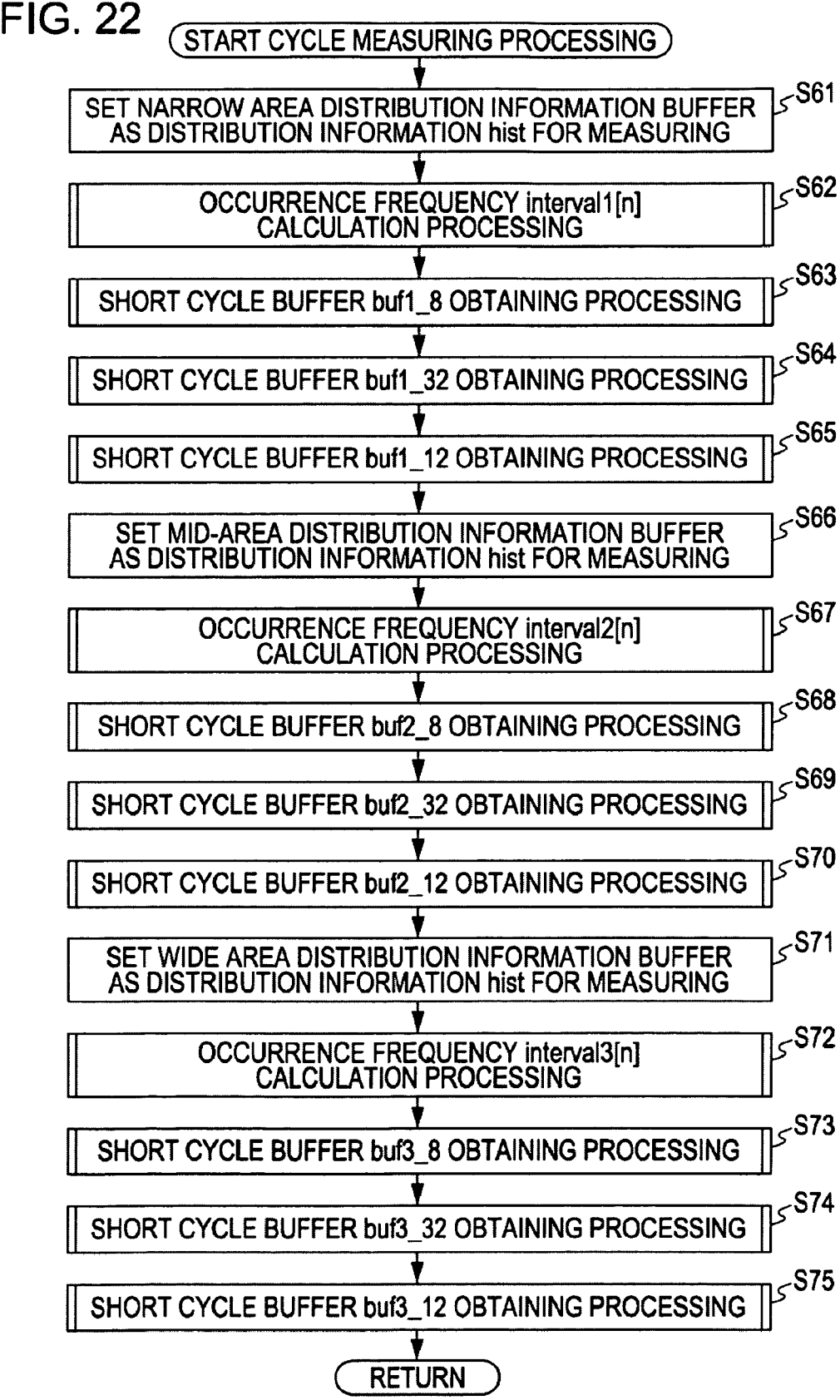
FIG. 22 is a flowchart describing the cycle measuring processing in FIG. 17.

Let us now return to the flowchart in FIG. 22. Upon the occurrence frequency measuring processing in step S62 ending, in step S63 the short cycle buffer obtaining unit 92 executes short cycle buffer obtaining processing, and obtains a short cycle buffer.

The short cycle buffer obtaining processing in the case that the block size in the horizontal direction is 8 pixels will be described with reference to the flowchart in FIG. 24.

In step S111, the short cycle buffer obtaining unit 92 initializes the short cycle buffer buf1_8[phase] stored in the short cycle buffer 44 and the border condition occurrence total btotal1_8 to 3, and initializes the position counter x and phase counter phase together as 0.

In step S112, the peak determining unit 111 reads the narrow area distribution information buffer hist1[x] and the nearby values thereof from the narrow area distribution information buffer 42-1, and determines whether or not the value of the narrow area distribution information buffer hist1[x] satisfies the peak conditions. Note that the determining processing with the peak determining unit 111 is the same as the processing with the above-described peak determining unit 101, so the description thereof will be omitted.

In the case determination is made in step S112 that the peak conditions are satisfied, for example, in step S113 the peak determining unit 111 supplies information indicating that the peak conditions are satisfied to the short cycle buffer updating unit 112 and the border condition occurrence total updating unit 113. The short cycle buffer updating unit 112 increments the short cycle buffer buf1_8[phase] stored in the short cycle buffer 44 by 1.

On the other hand, in the case determination is made in step S112 that the peak conditions are not satisfied, for example, the processing in step S113 is skipped.

In step S114, the border condition occurrence total updating unit 113 increments the short cycle buffer border condition occurrence total btotal1_8 stored in the short cycle buffer 44 by 1.

In step S115, the short cycle buffer obtaining unit 92 increments the phase counter phase by 1.

In step S116, the short cycle buffer obtaining unit 92 determines whether or not the phase counter phase is measuring cycle P≧8, i.e. whether or not the phase counter phase is greater than 8 which is the horizontal direction block size. In the case that the phase counter phase is measuring cycle P≧8 in step S116, for example, in step S117 the short cycle buffer obtaining unit 92 initializes the phase counter phase to 0.

Also, in the case that the phase counter phase is not measuring cycle P≧8 in step S116, for example, the processing in step S117 is skipped.

In step S118, the short cycle buffer obtaining unit 93 increments the position counter x by 1.

In step S119, the short cycle buffer obtaining unit 93 determines whether or not the position counter x is greater than xsize which is the horizontal size in the detection range. In the case that the position counter x is not greater than xsize which is the horizontal size in the detection range in step S119, the processing is returned to step S112.

In the case that the position counter x is greater than xsize which is the horizontal size in the detection range in step S119, the processing is ended.

That is to say, with the above-described processing, the coordinates in the horizontal direction have a cycle of 0 through 8 with the phase counter phase, and the short cycle information which is the number of times that a peak is detected for each phase counter phase is counted as a short cycle buffer buf1_8[phase] in the short cycle buffer 44. Also, each time a peak is detected, the border condition occurrence total btotal1_8 is incremented by 1, regardless of the phase counter phase.

Let us now return to the flowchart in FIG. 22. Upon the short cycle buffer buf1_8 obtaining processing of the horizontal block size 8 pixels in the narrow area distribution information in step S63 ending, in step S64 the short cycle buffer obtaining unit 92 executes short cycle buffer buf1_32 obtaining processing having a horizontal block size of 10.67 pixels in the narrow area distribution information, and obtains the border condition occurrence total btotal1_32 along with the short cycle buffer buf1_32. Note that the processing in step S64 is similar to the processing in step S63 other than the phase counter phase having a cycle of 0 through 32 instead of 0 through 8, so the description thereof will be omitted. Also, in the case that the horizontal block size is 10.67 pixels, the reason that the number of cycles becomes 32 is that this is the least common multiple for 10.67 to become an integer.

Also, in step S65, the short cycle buffer obtaining unit 92 executes short cycle buffer buf1_12 obtaining processing wherein the horizontal block size in the narrow distribution information is 12 pixels, and obtains the border condition occurrence total btotal1_12 along with the short cycle buffer buf1_12.

That is to say, with the processing in steps S61 through S65, the occurrence frequency counter interval1[n] for the narrow area distribution information is obtained from the occurrence frequency measuring unit 91 and output to the determining unit 45, and the short cycle buffers buf1_8, buf1_32, and buf1_12 and the border condition occurrence totals btotal1_8, btotal1_32, and btotal1_12 for the narrow area distribution information, are stored in the short cycle buffer 44.

Also, the processing in steps S66 through S70 are similar to the processing in steps S61 through S65, other than the mid-area distribution information buffer hist2 being subject to processing, so with the processing in steps S66 through S70, the occurrence frequency counter interval2[$n$] for the mid-area distribution information is obtained from the occurrence frequency measuring unit 91 and output to the determining unit 45, and the short cycle buffers buf2_8, buf2_32, and buf2_12 and the border condition occurrence total btotal2_8, btotal2_32, and btotal2_12 for the mid-area distribution information, are stored in the short cycle buffer 44.

Further, the processing in steps S71 through S75 are similar to the processing in steps S61 through S65, whereby with the processing in step S71 through S75, the occurrence frequency counter interval3[$n$] for the mid-area distribution information is obtained with the occurrence frequency measuring unit 91 and output to the determining unit 45, the short cycle buffer buf3_8, buf3_32, and buf3_12 and the border condition occurrence total btotal3_8, btotal3_32, and btotal3_12 of the wide area distribution information is stored in the short cycle buffer 44.

With the above processing, each of the narrow area distribution information buffer hist1, mid-area distribution information buffer hist2, and wide area distribution information buffer hist3 is obtained as the occurrence frequency counter interval 1[$n$] through 3[$n$] indicating the occurrence frequency for each interval that peak values occur, and supplied to the determining unit 45, and the short cycle information for each of the block sizes 8, 10.67, and 12 based on the narrow area, mid-area, and wide area distribution information respectively are obtained as short cycle buffers buf1_8, buf1_32, buf1_12, buf2_8, buf2_32, buf2_12, buf3_8, buf3_32, and buf3_12, and further the border condition occurrence totals btotal1_8, btotal1_32, btotal1_12, btotal2_8, btotal2_32, btotal2_12, btotal3_8, btotal3_32, and btotal3_12 indicating the number of times that peak values are detected are obtained, and stored in the short cycle buffer 44.

Figure 24:
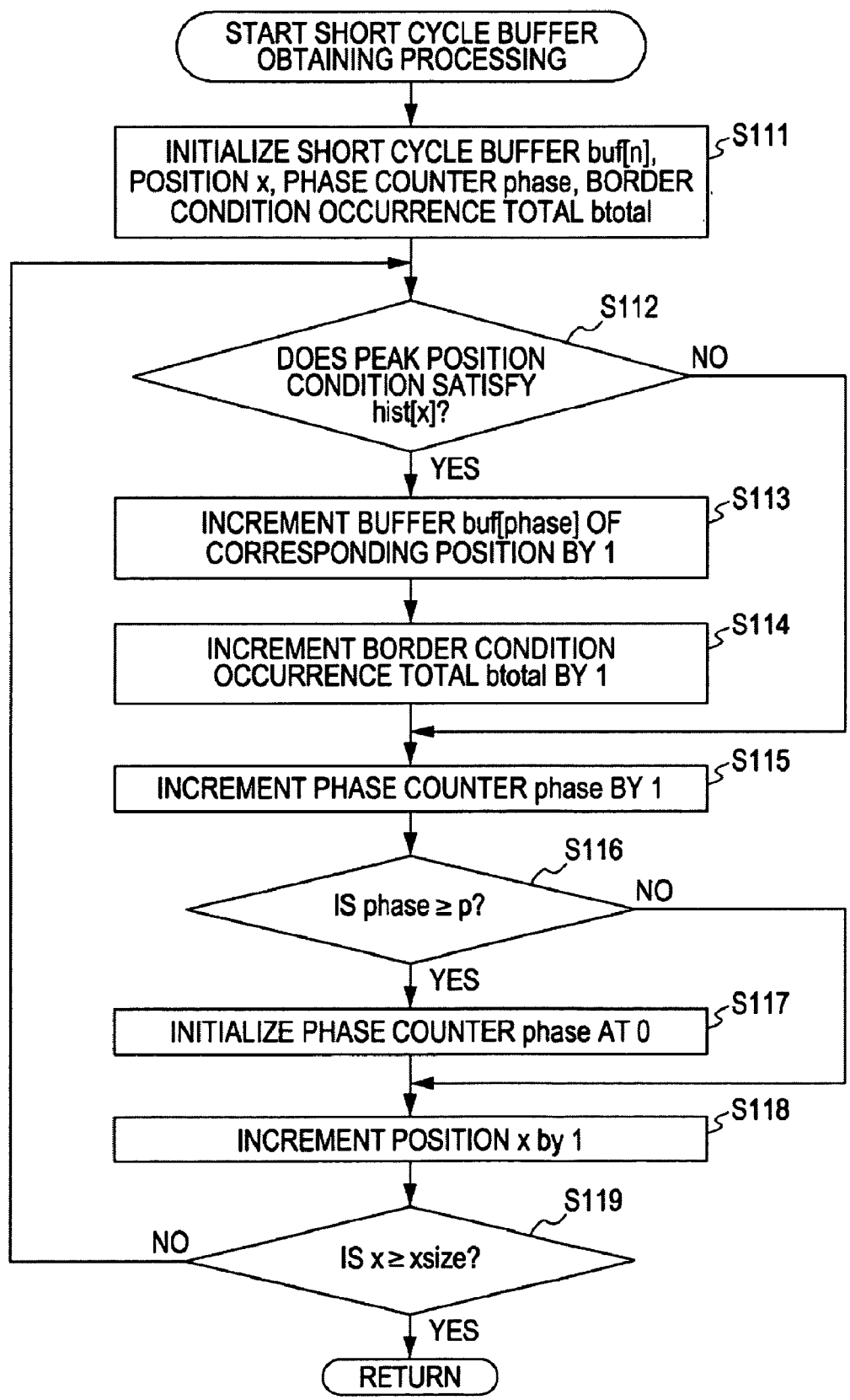
FIG. 24 is a flowchart describing the short cycle buffer obtaining processing in FIG. 22.

Note that with the present embodiment, as shown in the list L1 in FIG. 4, 24 and 48 pixels in the block size do not exist, whereby the short cycle buffer buf2_12 and border condition occurrence total btotal2_12 for the mid-area distribution information and the short cycle buffer buf3_12 and border condition occurrence total btotal3_12 for the wide area distribution information are not indispensable. Therefore, the processing in steps S70 and S75 in the flowchart in FIG. 22 may be omitted.

Let us now return to the flowchart in FIG. 17. Upon the cycle measuring processing being performed in step S12, the determining unit 45 executes determining processing in step S13, whereby the block size in the horizontal direction and block border position is determined, based on the occurrence frequency counter interval 1[$n$] through 3[$n$] showing occurrence frequency obtained with the cycle determining processing and the short cycle buffers buf1_8, buf1_32, buf1_12, buf2_8, buf2_32, buf2_12, buf3_8, buf3_32, and buf 3_12 and the border condition occurrence totals btotal1_8, btotal1_32, btotal1_12, btotal2_8, btotal2_32, btotal2_12, btotal3_8, btotal3_32, and btotal 3_12, which show short cycle information.

Determining processing with the determining unit 45 will be described with reference to the flowchart in FIG. 25. In step S141, the integer block size determining unit 161 executes block size 8 information obtaining processing based on the narrow area distribution information buffer hist1, and obtains the block size 8 information indicating conditions wherein the block size in the horizontal direction becomes 8 pixels.

Figure 26:
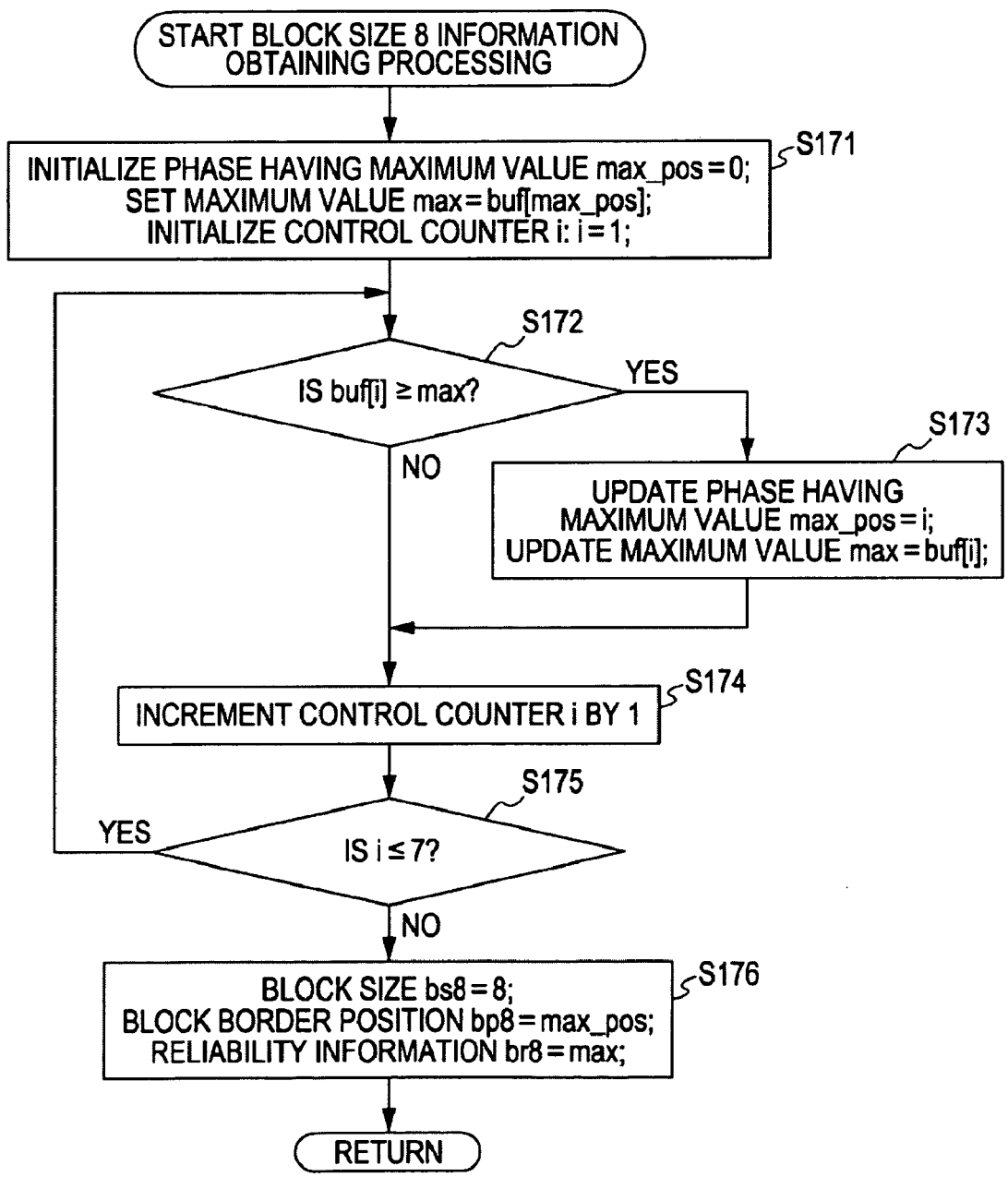
FIG. 26 is a flowchart describing the block size 8 information obtaining processing in FIG. 25.

Now, the block size 8 information obtaining processing based on the narrow area distribution information buffer hist1 will be described with reference to the flowchart in FIG. 26.

In step S171, the integer block size determining unit 161 of the narrow area processing unit 141 initializes each of the maximum value phase counter max_pos stored in the maximum value phase counter 176 and the maximum value counter max stored in the maximum value counter 174 to 0, and initializes the control counter i which is controlled by the control counter 172 to 1.

In step S172, the short cycle buffer reading unit 171 reads the short cycle buffer buf1_8[$i$] specified with the control counter i from the short cycle buffer 44, and supplies this to the comparing unit 173. The comparing unit 173 determines whether or not the short cycle buffer buf1_8[$i$] is greater than the maximum value counter max.

In step S172, for example in the case that the short cycle buffer buf1_8[$i$] is greater than the maximum value counter max, in step S173 the comparing unit 173 supplies the comparison results to the maximum value counter updating unit 175 and the maximum value phase counter updating unit 177. The maximum value counter updating unit 175 updates the maximum value counter max of the maximum value counter 174 with the short cycle buffer buf1_8[$i$], based on the comparison results. Also, the maximum value phase counter updating unit 177 updates the maximum value phase counter max_pos of the maximum value counter 176 with the control counter i.

In step S174, the control counter 172 increments the control counter i by 1.

In step S175, the short cycle buffer reading unit 171 determines whether or not the control counter i is smaller than 7 which is the final end of the number of cycles of the block size 8, and if smaller than 7, the processing is returned to step S172, and the processing in steps S172 through S175 is repeated.

In the case that the control counter i is not smaller than 7 in step S175, in step S176 the determination result output unit 178 reads the maximum value counter max stored in the maximum value counter 174 and the maximum value phase counter max_pos stored in the maximum value phase counter 176, and supplies this to the narrow area candidate selecting unit 144, with a block size bs8 indicating information that the block size in the horizontal direction is 8 pixels, the maximum value phase counter max_pos is block border position bp8, and the value of the maximum value counter max is reliability information br8 as to the block size 8.

Note that hereafter, the narrow area block size 8 information, mid-area block size 8 information, and wide area block size 8 information are distinguished, whereby, regarding the narrow area block size 8 information, block size is bs1_8, the maximum value phase counter max_pos is block border position bp1_8, and the value of the maximum value counter max is reliability information br1_8 as to the block size 8; regarding the mid-area block size 8 information, block size is bs2_8, the maximum value phase counter max_pos is block border position bp2_8, and the value of the maximum value counter max is reliability information br2_8 as to the block size 8; and regarding the wide area block size 8 information, block size is bs3_8, the maximum value phase counter max_pos is block border position bp3_8, and the value of the maximum value counter max is reliability information br3_8 as to the block size 8, but in the case that distinguishing does not have to be made in particular, these are simply called block size bs8, maximum value phase counter max_pos8 is block border position bp8, and the value of the maximum value counter max is reliability information br8 as to the block size 8, and other block sizes are also given similar references.

With the above-described processing, based on the short cycle information indicated with the short cycle buffer buf1_8 wherein the block size based on the narrow area distribution information shown with the narrow area distribution information buffer hist1 is 8 pixels, the block border position bp8 within the number of cycles in the case of block size 8 in the horizontal direction and the reliability information br8 showing the number of times of detection of the pixel count which is block border position bp8 are obtained as the narrow area block size 8 information.

Figure 25:
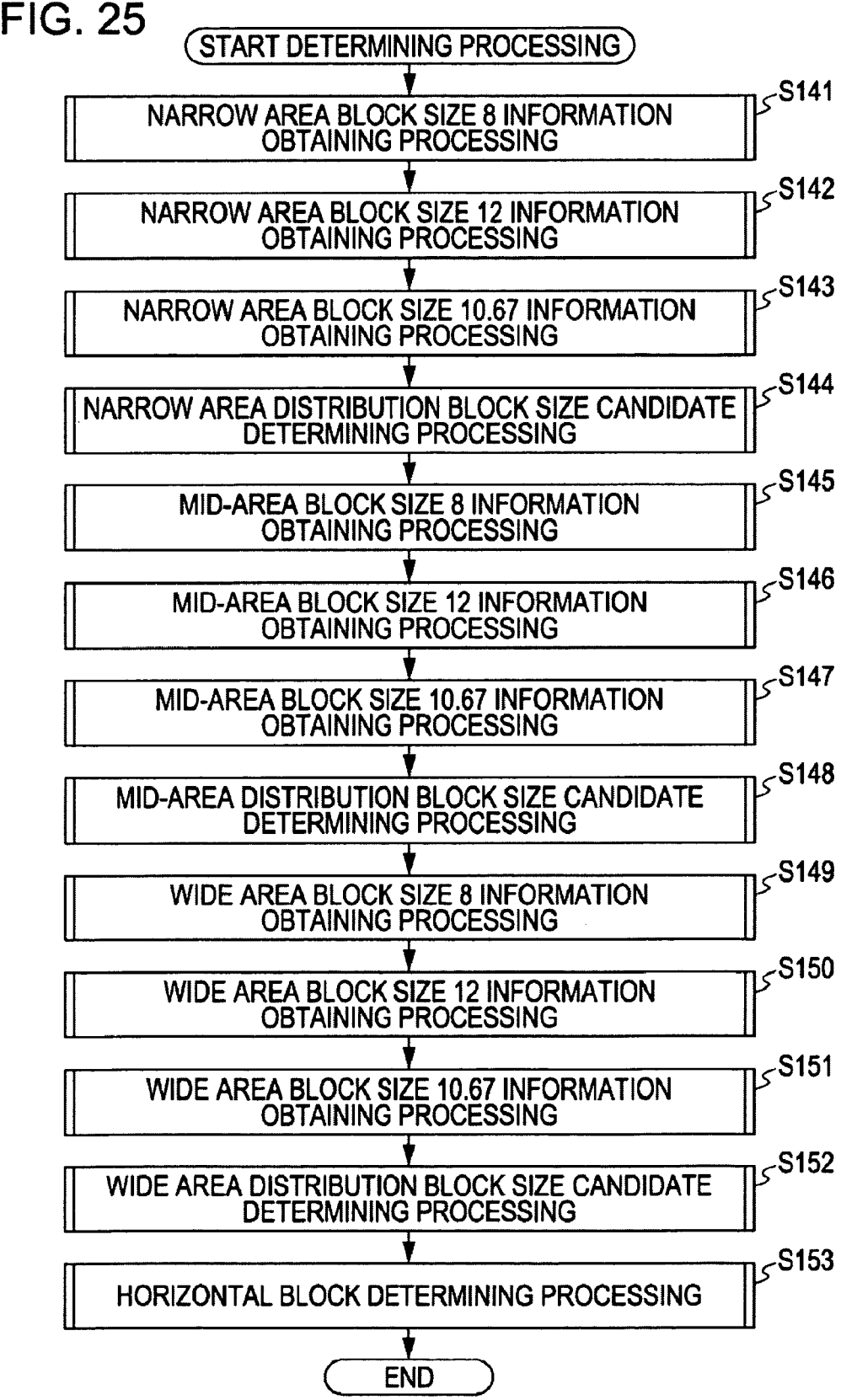
FIG. 25 is a flowchart describing the determining processing in FIG. 17.

Let us now return to the flowchart in FIG. 25. In step S142, the integer block size determining unit 161 executes the narrow area block size 12 information obtaining processing based on the narrow area distribution information buffer hist1, and obtains the block size 12 information indicating conditions for the block size in the horizontal direction to be 12 pixels. Note that the narrow area block size 12 information obtaining processing is processing similar to the narrow area block size 8 information obtaining processing, other than the short cycle buffer buf1_12 being processing, and the threshold value in step S175 being from 7 to 12, so description thereof will be omitted.

In step S143, the integer block size determining unit 161 executes block size 10.67 information obtaining processing based on the narrow area distribution information buffer hist1, and obtains the block size 10.67 information indicating conditions for the block size in the horizontal direction to be 10.67 pixels.

Figure 27:
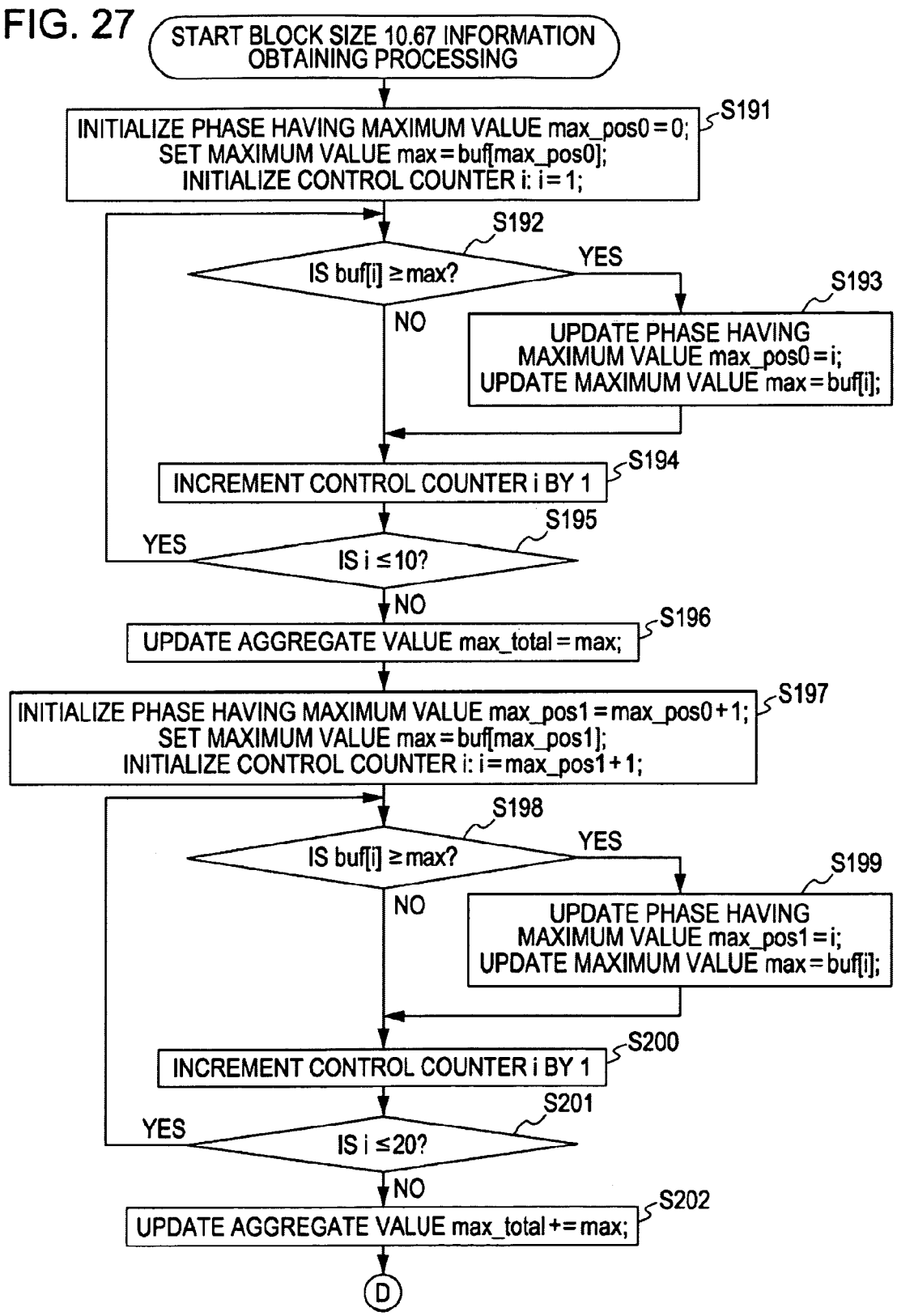
FIG. 27 is a flowchart describing the block size 10.67 information obtaining processing in FIG. 25.
Figure 28:
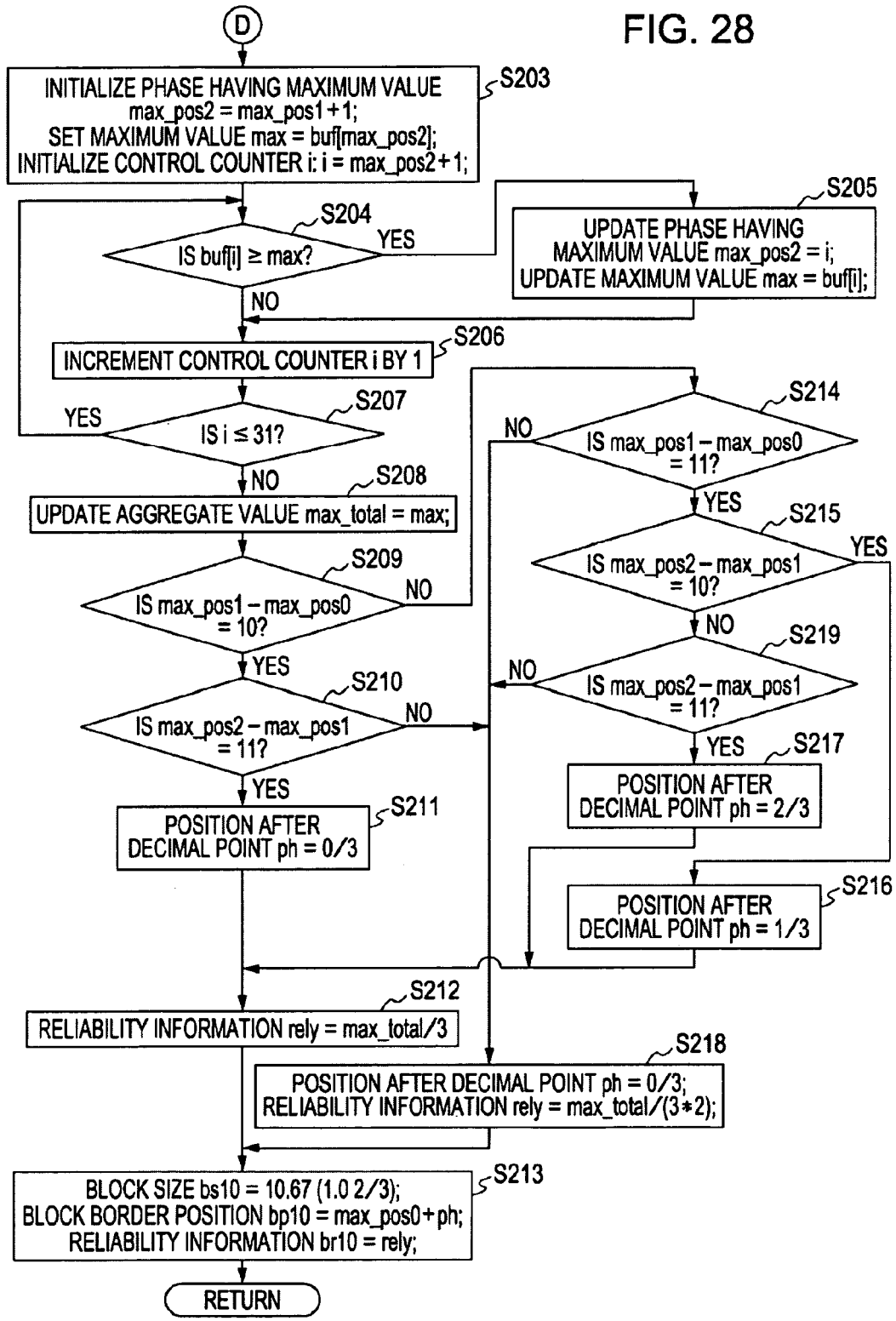
FIG. 28 is a flowchart describing the block size 10.67 information obtaining processing in FIG. 25.

Now, the block size 10.67 information obtaining processing based on the narrow area distribution information buffer hist1 will be described with reference to the flowchart in FIGS. 27 and 28. Note that the integer block size determining units 191-1 through 191-3 are each similar to the configuration with the integer block size determining unit 161, but the conditions for initializing and so forth are different. Thus, hereafter, the configuration for the integer block size determining units 191-1 through 191-3 will be described with "-1", "-2", "-3" as to each configuration with the integer block size determining unit 161.

In step S191, The integer block size determining unit 191-1 of the narrow area processing unit 141 sets the maximum value phase counter max_pos0 stored in the maximum value phase counter 176-1 to 0, and initializes the maximum value counter max stored in the maximum value counter 174-1 to the short cycle buffer buf1_32[max_pos0], while initializing the control counter i controlled by the control counter 172-1 to 1.

In step S192, the short cycle buffer reading unit 171-1 reads the short cycle buffer buf1_32[i] specified with the control counter i from the short cycle buffer 44, and supplies this to the comparing unit 173-1. The comparing unit 173-1 determines whether or not the short cycle buffer buf1_32[i] is greater than the maximum value counter max.

In the case that the short cycle buffer buf1_32[i] is greater than the maximum value counter max in step 3192, for example, in step S193 the comparing unit 173-1 supplies the comparison results to the maximum counter updating unit 175-1 and the maximum value phase counter updating unit 177-1. The maximum value counter updating unit 175-1 updates the maximum value counter max of the maximum value counter 174-1 with the short cycle buffer buf1_32[i], based on the comparison results. Also, the maximum value phase counter updating unit 177-1 updates the maximum value phase counter max_pos0 of the maximum value phase counter 176-1 with the control counter i.

In step S194, the control counter 172-1 increments the control counter i by 1.

In step 3195, the short cycle buffer reading unit 171-1 determines whether or not the control counter i, of the 32 cycles (0 through 31) of the block size 10.67, is smaller than 10, and in the case of being smaller than 10, the processing is returned to step S192, and the processing in step S192 through S195 is repeated.

In the case that the control counter i is not smaller than 10 in step S195, in step S196 the determination results output unit 178-1 reads the maximum value phase counter max_pos0 stored in the maximum value phase counter 176 and the maximum value counter max stored in the maximum value counter 174-1, and supplies these to the comparison determining unit 192. The comparison determining unit 192 adds the maximum value counter max to the aggregate value max_total, thereby updating the aggregate value max_total.

In step S197, the integer block size determining unit 191-2 of the narrow area processing unit 141 initializes the maximum value phase counter max_pos1 stored in the maximum value phase counter 176-2 to (max_pos0+1), and initializes the maximum value counter max stored in the maximum value counter 174-2 to the short cycle buffer 1_32 [max_pos1], while initializing the control counter i controlled by the control counter 172-2 to max_pos1+1.

In step S198, the short cycle buffer reading unit 171-2 reads the short cycle buffer buf1_32[i] specified with the control counter i from the short cycle buffer 44, and supplies this to the comparing unit 173-2. The comparing unit 173-2 determines whether or not the short cycle buffer buf1_32[i] is greater than the maximum value counter max.

In the case that the short cycle buffer buf1_32[i] is greater than the maximum value counter max in step S198, for example, in step S199 the comparing unit 173-2 supplies the comparison results to the maximum value counter updating unit 175-2 and the maximum value phase counter updating unit 177-2. The maximum value counter updating unit 175-2 updates the maximum value counter max of the maximum value counters 174-2 from the short cycle buffer buf1_32[i] based on the comparison results. Also, the maximum value phase counter updating unit 177-2 updates the maximum value phase counter max_pos1 of the maximum value phase counter 176-2 with the control counter i.

In step S200, the control counter 172-2 increments the control counter i.

In step S201, the short cycle buffer reading unit 171-2 determines whether or not the control counter i, of the 32 cycles (0 through 31) of the block size 10.67, is smaller than 20, and in the case of being smaller than 20, the processing is returned to step S198, and the processing in steps S198 through S201 is repeated.

In the case that the control counter i is not smaller than 20 in step S201, in step S202 the determination results output unit 178-2 reads the maximum value phase counter max_pos1 stored in the maximum value phase counter 176-2 and the maximum value counter max stored in the maximum value counter 174-2, and the comparison determining unit 192 adds the maximum value counter max to the aggregate value max_total, thereby updating the aggregate value max_total.

In step S203 (FIG. 28), the integer block size determining unit 191-3 of the narrow area processing unit 141 initializes the maximum value phase counter max_pos2 stored in the maximum value phase counter 176-3 to (max_pos1+1), and initializes the maximum value counter max stored in the maximum value counter 174-3 to the short cycle buffer 1_32 [max_pos2], while initializing the control counter i controlled by the control counter 172-3 to max_pos2+1.

In step S204, the short cycle buffer reading unit 171-3 reads the short cycle buffer buf1_32[i] specified with the control counter i from the short cycle buffer 44, and supplies this to the comparing unit 173-3. The comparing unit 173-3 determines whether or not the short cycle buffer buf1_32[i] is greater than the maximum value counter max.

In the case that the short cycle buffer buf1_32[i] is greater than the maximum value counter max in step S204, for example, in step S205 the comparing unit 173-3 supplies the comparison results to the maximum value counter updating unit 175-3 and the maximum value phase counter updating unit 177-3. The maximum value counter updating unit 175-3 updates the maximum value counter max of the maximum value counter 174-3 from the short cycle buffer buf1_32[i] based on the comparison results. Also, the maximum value phase counter updating unit 177-3 updates the maximum value phase counter max_pos2 of the maximum value phase counter 176-3 with the control counter i.

In step S206, the control counter 172-3 increments the control counter i by 1.

In step S207, the short cycle buffer reading unit 171-2 determines whether or not the control counter i is smaller than 31 which is the maximum value of the 32 cycles (0 through 31) of the block size 10.67, and in the case of being smaller than 31, the processing is returned to step S204, and the processing in steps S204 through S207 is repeated.

In the case that the control counter i is not smaller than 31 in step S207, in step S208 the determination results output unit 178-3 reads the maximum value counter max stored in the maximum value-counter 174-3 and the maximum value phase counter max_pos2 stored in the maximum value phase counter 176-3, and the comparison determining unit 192 adds the maximum value counter max to the aggregate value max_total, thereby updating the aggregate value max_total.

In step S209, the comparison determining unit 192 determines whether or not the value subtracting the maximum phase counter max_pos0 from the maximum phase counter max_pos1 becomes 10. In step S209, for example, in the case that the value subtracting the maximum phase counter max_pos0 from the maximum phase counter max_pos1 becomes 10, the processing is advanced to step S210.

In step S210, the comparison determining unit 192 determines whether or not the value subtracting the maximum phase counter max_pos1 from the maximum phase counter max_pos2 becomes 11. In step S210, for example, in the case that the value subtracting the maximum phase counter max_pos1 from the maximum phase counter max_pos2 becomes 11, in step S211, the comparison determining unit 192 determines the position ph below the decimal to be 0/3.

In step S212, the comparison determining unit 192 obtains the reliability information "rely" by dividing the max_total by 3, whereby in step S213, the block size bs10 which indicates information that the block size in the horizontal direction is 10.67 pixels, the block border position bp10 which is the position ph below the decimal added to the value of the maximum value phase counter max_pos0, and the reliability br10 which is the value of the reliability information "rely" as to the block size 10.67, are supplied to the narrow area candidate selecting unit 144.

Also, in the case the that value subtracting the maximum phase counter max_pos0 from the maximum phase counter max_pos1 does not become 10 in step S209, the processing is advanced to step S214.

In step S214, the comparison determining unit 192 determines whether or not the value subtracting the maximum phase counter max_pos0 from the maximum phase counter max_pos1 becomes 11. In the case that the value subtracting the maximum phase counter max_pos0 from the maximum phase counter max_pos1 becomes 11 in step S214, for example, the processing is advanced to step S215.

In step S215, the comparison determining unit 192 determines whether or not the value subtracting the maximum phase counter max_pos1 from the maximum phase counter max_pos2 becomes 10. In step S215, for example, in the case that the value subtracting the maximum phase counter max_pos1 from the maximum phase counter max_pos2 becomes 10, in step S216, the comparison determining unit 192 determines the position ph below the decimal to be ⅓.

Also, in step S215, for example if the value subtracting the maximum phase counter max_pos1 from the maximum phase counter max_pos2 does not become 10, in step S219 the comparison determining unit 192 determines whether or not the value subtracting the maximum phase counter max_pos1 from the maximum phase counter max_pos2 becomes 11. In step S219, in the case that the value subtracting the maximum phase counter max_pos1 from the maximum phase counter max_pos2 becomes 11, in step S217 the comparison determining unit 192 determines the position ph below the decimal to be ⅔.

In the case that the value subtracting the maximum phase counter max_pos1 from the maximum phase counter max_pos2 does not become 10 in step S210 for example, in the case that the value subtracting the maximum phase counter max_pos0 from the maximum phase counter max_pos1 does not become 11 in step S214 for example, or in the case that the value subtracting the maximum phase counter max_pos1 from the maximum phase counter max_pos2 does not become 11 in step S219 for example, in step S218 the comparison determining unit 192 considers this o not be the correct value, and determines the position ph below the decimal to be 0/3, but by dividing the reliability information "rely" by a value which is 3 greater than the max_total (shown in FIG. 28 as 3×2 but a value greater than this may be used), the reliability information "rely" is reduced.

That is to say, as described above, setting the number of cycles to 32 to correspond with the block size of 10.67 pixels is because 32 is the least common multiple for 10.67 to become an integer, and to divide the cycle segments into 3 segments to obtain the position below the decimal from a mutual relation with the block border position in each segment.

With the above-described processing, the block border position bp10 within the number of cycles in the case that the block size in the horizontal direction is 10.67 pixels (bs=10), and the reliability information br10 which is the number of pixels with the block border position bp10, are obtained based on the short cycle buffer buf1_32 wherein the block size is 10.67 pixels based on the narrow area distribution information buffer hist1.

Let us now return to the flowchart in FIG. 25. Upon the narrow area block size 10.67 information obtaining processing being executed in step S143, in step S144 the narrow area candidate selecting unit 144 executes narrow area distribution block size candidate determining processing, and selects a candidate for the block size and block border position based on the narrow area distribution information buffer hist1.

Figure 29:
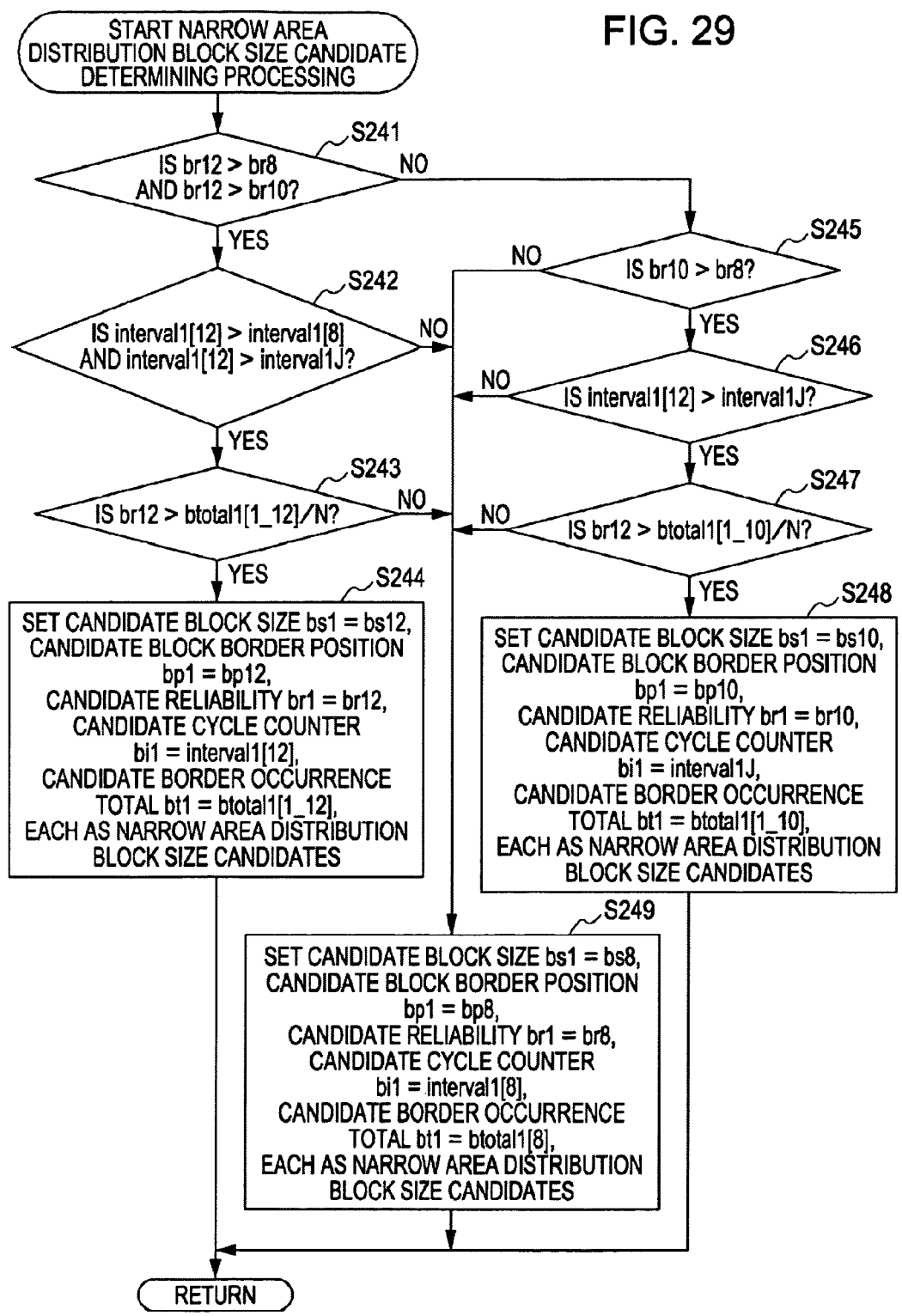
FIG. 29 is a flowchart describing the narrow area distribution block size candidate determining processing in FIG. 25.

The narrow area distribution block size candidate selecting processing will be described with reference to the flowchart in FIG. 29.

In step S241, the narrow area candidate selecting unit 194 controls the reliability comparing unit 144a, and determines whether or not the reliability information br12 is greater than the reliability information br10 and whether or not the reliability information br12 is greater than the reliability information br8. That is to say, determination is made as to whether or not the reliability is highest with the block size 12. In the case that, in step S241, for example the reliability information br12 is greater than the reliability information br10 and the reliability information br12 is greater than the reliability information br8, the processing is advanced to step S242.

In step S242, the narrow area candidate selecting unit 144 controls the occurrence frequency comparing unit 144b, and determines whether or not the occurrence frequency interval1 [12] is greater than the occurrence frequency interval1[8], and whether or not the occurrence frequency interval1[12] is greater than the occurrence frequency interval1J. Note that the occurrence frequency interval1J is the sum of the occurrence frequencies interval1[10] and inerval1[11], and indicate the occurrence frequency with the block size of 10.67 pixels. Accordingly, determination is made in step S242 as to whether or not the occurrence frequency with the block size 12 is highest. In the case that the occurrence frequency interval1[12] is greater than the occurrence frequency interval1[8] and the occurrence frequency interval1[12] is greater than the occurrence frequency interval1J in step 3242, the processing is advanced to step S243.

In step S243, the narrow area candidate selecting unit 144 determines whether or not the reliability information br12 is greater than the border condition occurrence total btotal1_12/ N. N is a predetermined constant. That is to say, in step S243, determination is made as to whether or not the reliability information br12 exists more than a predetermined ratio as to the border condition occurrence total btotal1_12/N. In the case determination is made in step S243 that for example the reliability information br12 is greater than the border condition occurrence total btotal1_12/N, the narrow area candidate selecting unit 144 selects the block size bs12 as the candidate block size bs1 of the narrow area distribution information hist1, while setting bp12, br12, interval1[12], and btotal1_12 as the candidate block border position bp1, candidate reliability information br1, candidate cycle counter bi1, and candidate border occurrence total bt1 respectively, to correspond thereto, and supplies this to the integrated selecting unit 147.

On the other hand, in the case that for example the reliability information br12 is greater than the reliability information br10 and the reliability information br12 is not greater than the reliability information br8 in step S241, the processing is advanced to step S245.

In step S245, the narrow area candidate selecting unit 144 controls the reliability comparing unit 144a to determine whether or not the reliability information br10 is greater than the reliability information br8. That is to say, determination is made as to whether or not the reliability is highest with the block size 10. In the case that for example the reliability information br10 is greater than the reliability information br8 in step S245, the processing is advanced to step S246.

In step S246, the narrow area candidate selecting unit 144 controls the occurrence frequency comparing unit 144b to determine whether or not the occurrence frequency interval1 [10] is greater than the occurrence frequency interval1[8]. In the case that the occurrence frequency interval1[10] is greater than the occurrence frequency interval1[8] in step S246, the processing is advanced to step 3247.

In step S247, the narrow area candidate selecting unit 144 determines whether or not the reliability information br10 is greater than the border condition occurrence total btotal1_10/ N. That is to say, in step S247, determination is made as to whether or not the reliability information br10 exists at or above a predetermined ratio as to the border condition occurrence total btotal1_10/N. In the case determination is made in step S247 that, for example the reliability information br10 is greater than the border condition occurrence total btotal1_10/ N, the narrow area candidate selecting unit 144 selects the block size bs10 as the candidate block size bs1 of the narrow area distribution information hist1, while setting bp10, br10, interval1[10], and btotal1_10 as the candidate block border position bp1, candidate reliability information br1, candidate cycle counter bi1, and candidate border occurrence total bt1 respectively, to correspond thereto, and supplies this to the integrated selecting unit 147.

In the case that, in step S242, the occurrence frequency interval1[12] is not greater than the occurrence frequency interval1[8] or the occurrence frequency interval1[12] is not greater than the occurrence frequency interval1J, in the case that for example the reliability information br12 is not greater than the border condition occurrence total btotal1_12/N in step S243, in the case that for example the reliability information br10 is not greater than the reliability information br8 in step S245, in the case that the occurrence frequency interval1[10] is not greater than the occurrence frequency interval1[8] in step S246, or in the case that for example the reliability information br10 is not greater than the border condition occurrence total btotal1_10/N in step S247, the narrow area candidate selecting unit 144 selects the block size bs8 as the candidate block size bs1 of the narrow area distribution information hist1, while setting bp8, br8, interval1[8], and btotal1_8 as the candidate block border position bp1, candidate reliability information br1, candidate cycle counter bi1, and candidate border occurrence total bt1 respectively, to correspond thereto, and supplies this to the integrated selecting unit 147.

That is to say, a block size wherein the reliability information is highest, the occurrence frequency is highest, and the block size being at or above a predetermined ratio as to the border condition occurrence total, is selected as a candidate based on the narrow area distribution information. Note that hereafter, the block size bs1, block border position bp1, reliability information br1, cycle counter bi1, and border occurrence total bt1 are summarized and called the block size information which is obtained based on the narrow area distribution information.

Based on the narrow area distribution information from the above-described processing, a block size wherein the reliability information is highest, the occurrence frequency is highest, and the block size being at or above a predetermined ratio as to the border condition occurrence total, can be selected as a candidate for the block size of the narrow area distribution information.

Let us now return to the flowchart in FIG. 25. That is to say, the narrow area block size 8, 12, and 10.67 information is obtained with the processing in steps S141 through S144, and from these the block size bs1, candidate block border position bp1, candidate reliability information br1, candidate cycle counter bi1, and candidate border occurrence total bt1 are obtained as narrow area distribution block size candidates.

Similarly, in steps S145 through S148, the mid-area block size 8, 12, and 10.67 information is obtained from the mid-area processing unit 142 with the processing in steps S145 through S147. In step S148, the mid-area candidate selecting unit 145 controls the reliability comparing unit 145a and occurrence frequency comparing unit 145b, thereby executing mid-area block size candidate determining processing. With this processing, the block size bs2, candidate block border position bp2, candidate reliability information br2, candidate cycle counter bi2, and candidate border occurrence total bt2 are obtained as mid-area distribution block size candidates, and supplied to the integrated selecting unit 147 as block size information based on the mid-area distribution information.

Further, in steps S149 through S152, the wide area block size 8, 12, and 10.67 information is obtained from the wide area processing unit 143 with the processing in steps S149 through S151. In step S152, the wide area candidate selecting unit 146 controls the reliability comparing unit 146$a$ and occurrence frequency comparing unit 146$b$, thereby executing wide area block size candidate determining processing. With this processing, the block size bs3, candidate block border position bp3, candidate reliability information br3, candidate cycle counter bi3, and candidate border occurrence total bt3 are obtained as wide area distribution block size candidates, and supplied to the integrated selecting unit 147 as block size information based on the wide area distribution information.

In step S153, the integrated selecting unit 147 executes horizontal block size determining processing and obtains the block size as measuring results.

Figure 30:
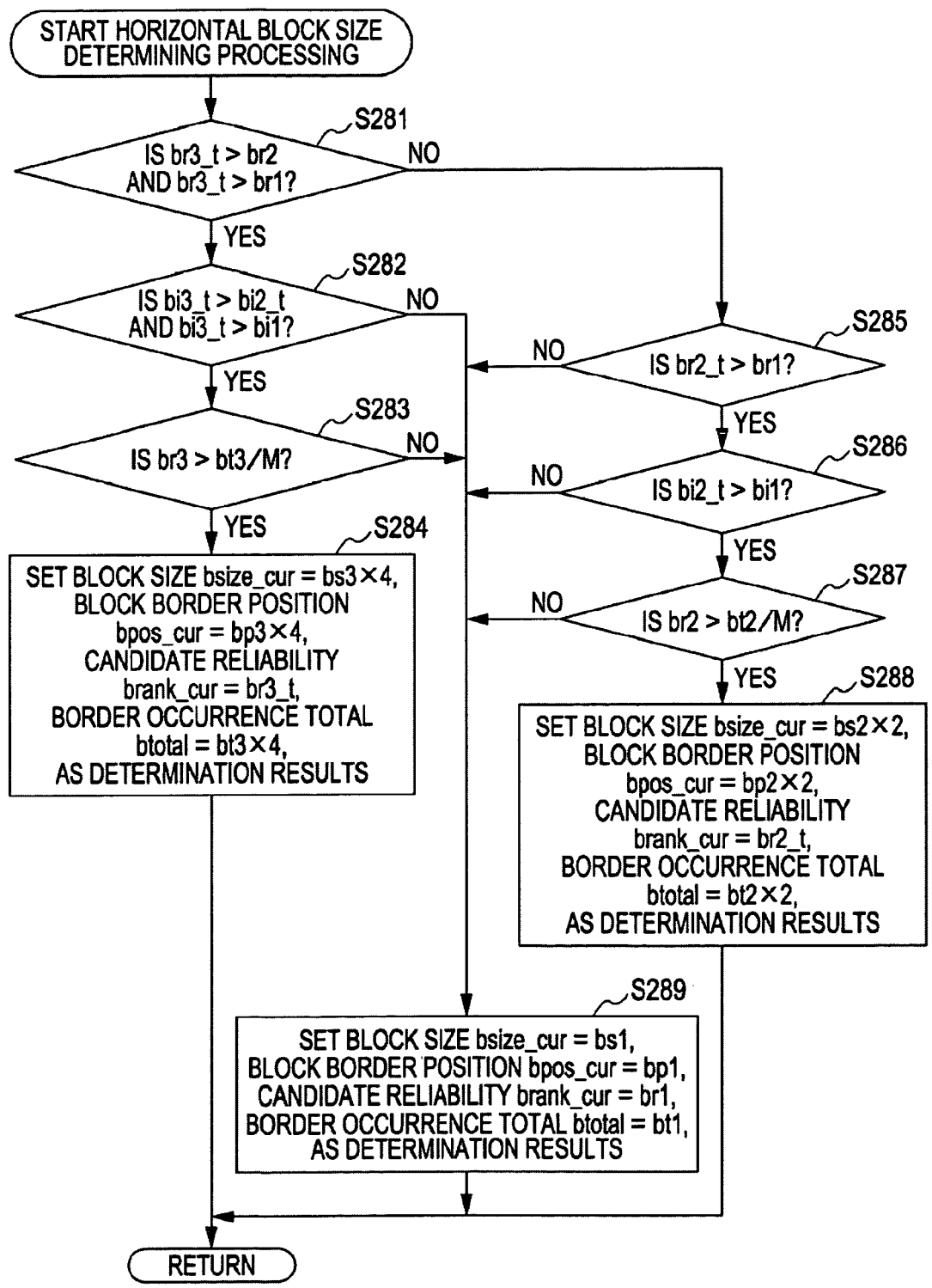
FIG. 30 is a flowchart describing the horizontal block size determining processing in FIG. 25.

Description will be given now regarding the horizontal block size determining processing, with reference to the flowchart in FIG. 30.

In step S281, the integrated selecting unit 147 controls the reliability comparing unit 147$a$ to determine whether or not the candidate reliability information br3_$t$ is greater than the candidate reliability information br2_$t$ and the candidate reliability information br3_$t$ is greater than the candidate reliability information br8. That is to say, determination is made as to whether or not the candidate reliability information br3_$t$ is at the maximum value.

Note that the mid-area distribution information buffer hist2 is data only in the case that the position counter x in the horizontal direction is an even number. Thus, the candidate reliability information br2_$t$ doubles the candidate reliability information br2, thereby showing a normalized value for the purpose of comparison with the candidate reliability information br1. Also, the wide area distribution information buffer hist3 is data only in the case that the position counter x in the horizontal direction is a multiple of 4. Thus, the candidate reliability information br3_$t$ multiplies the candidate reliability information br3 by 4, thereby showing a normalized value for the purpose of comparison with the candidate reliability information br1.

In the case that the candidate reliability information br3_$t$ is greater than the candidate reliability information br2_$t$ and the candidate reliability information br3_$t$ is greater than the candidate reliability information br1 in step S281, the processing is advanced to step S282.

In step S282, the integrated selecting unit 147 controls the occurrence frequency comparing unit 147$b$ to determine whether or not the candidate cycle counter bi3_$t$ is greater than the candidate cycle counter bi2_$t$ and the candidate cycle counter bi3_$t$ is greater than the candidate cycle counter bi1.

Note that the candidate cycle counters bi2_$t$ and bi3_$t$ are also similar to the candidate reliability information br2_$t$ and br2_$t$, and are each normalized value wherein the candidate cycle counter bi2 is doubled and bi3 is multiplied by 4, respectively.

In the case that for example the candidate cycle counter bi3_$t$ is greater than the candidate cycle counter bi2_$t$ and the candidate cycle counter bi3_$t$ is greater than the candidate cycle counter bi1 in step S282, in step S283 the integrated selecting unit 147 controls the concentration comparing unit 147$c$ to determine whether or not the candidate reliability information br3_$t$ is greater than a predetermined ratio 1/M of the candidate border occurrence total bt3, and determines the concentration of the candidate reliability information br3_$t$ obtained from the wide area distribution information.

In the case that the candidate reliability information br3_$t$ is determined to be greater than the predetermined ratio 1/M of the candidate border occurrence total bt3 in step S283, the processing is advanced to step S284.

In step S284, the integrated selecting unit 147 selects the wide area distribution block size candidate as the determination result, and as determination results, outputs the block size bsize_cur as 4 times the block size bs3, the block border position bpos_cur as 4 times the candidate block border position bp3, the reliability information brank_cur as the candidate reliability information br3_$t$, and the border occurrence total btotal as 4 times the candidate border occurrence total bt3.

Also, in the case that the candidate reliability information br3_$t$ is not greater than the candidate reliability information br2_$t$ or the candidate reliability information br3_$t$ is not greater than the candidate reliability information br8 in step S281, the processing is advanced to step S285.

In the case that the candidate reliability information br2_$t$ is greater than the candidate reliability information br1 in step 3285, the processing is advanced to step S286.

In step S286, the integrated selecting unit 147 controls the occurrence frequency comparing unit 147$b$ to determine whether or not the candidate cycle counter bi2_$t$ is greater than the candidate cycle counter bi1.

In the case that the candidate cycle counter bi2_$t$ is greater than the candidate cycle counter bi1 in step S286 for example, in step S287 the integrated selecting unit 147 controls the concentration comparing unit 147$c$ to determine whether or not the candidate reliability information br2_$t$ is greater than the predetermined ratio 1/M of the candidate border occurrence total bt2, and determines the concentration of the candidate reliability information br2_$t$ obtained from the mid-area distribution information.

In the case that the candidate reliability information br2_$t$ is determined to be greater than the predetermined ratio 1/M of the candidate border occurrence total bt2 in step S287, the processing is advanced to step S288.

In step S288, the integrated selecting unit 147 selects a mid-area distribution block size candidate as the determination result, and as determination results, outputs the block size bsize_cur as double the block size bs2, the block border position bpos_cur as double the candidate block border position bp2, the reliability information brank_cur as candidate reliability information br2_$t$, and the border occurrence total btotal as double the candidate border occurrence total bt2.

Further, in the case that, in step S282, for example the candidate cycle counter bi2_$t$ is not greater than the candidate cycle counter bi2_$t$ or the candidate cycle counter bi2_$t$ is not greater than the candidate cycle counter bi1, in the case that determination is made in step S283 that the candidate reliability information br3_$t$ is not greater than the predetermined ratio M of the candidate border occurrence total bt3, in the case that the candidate reliability information br2_$t$ is not greater than the candidate reliability information br1 in step S285, in the case that for example the candidate cycle counter bi2_$t$ is not greater than the candidate cycle counter bi1 in step 3286, or in the case that the candidate reliability information br2_$t$ is not greater than the predetermined ratio 1/M of the candidate border occurrence total bt2 in step S287, in step S289 the integrated selecting unit 147 selects a narrow area distribution block size candidate as determination results, and as the determination results, outputs the block size information with the block size bsize_cur as the block size bs1, the block border position bpos_cur as the candidate block border position bp1, the reliability information brank_cur as the candidate reliability information br1, and the border occurrence total btotal as the candidate border occurrence total bt1.

With the above-described processing, a block size candidate wherein the candidate reliability information is greatest and the candidate cycle counter is greatest and the candidate reliability information is greater than the predetermined ratio as to the candidate border occurrence total can be output as the block size information measured with the current image.

Let us now return to the flowchart in FIG. 17. With the determining processing in step S13, the block size information measured for the current image is obtained.

In step S14, the stabilization processing unit 46 executes stabilizing processing, and using the block size information with the current image and the block size information with a past image, stabilizes and outputs the block size information to be output.

Figure 31:
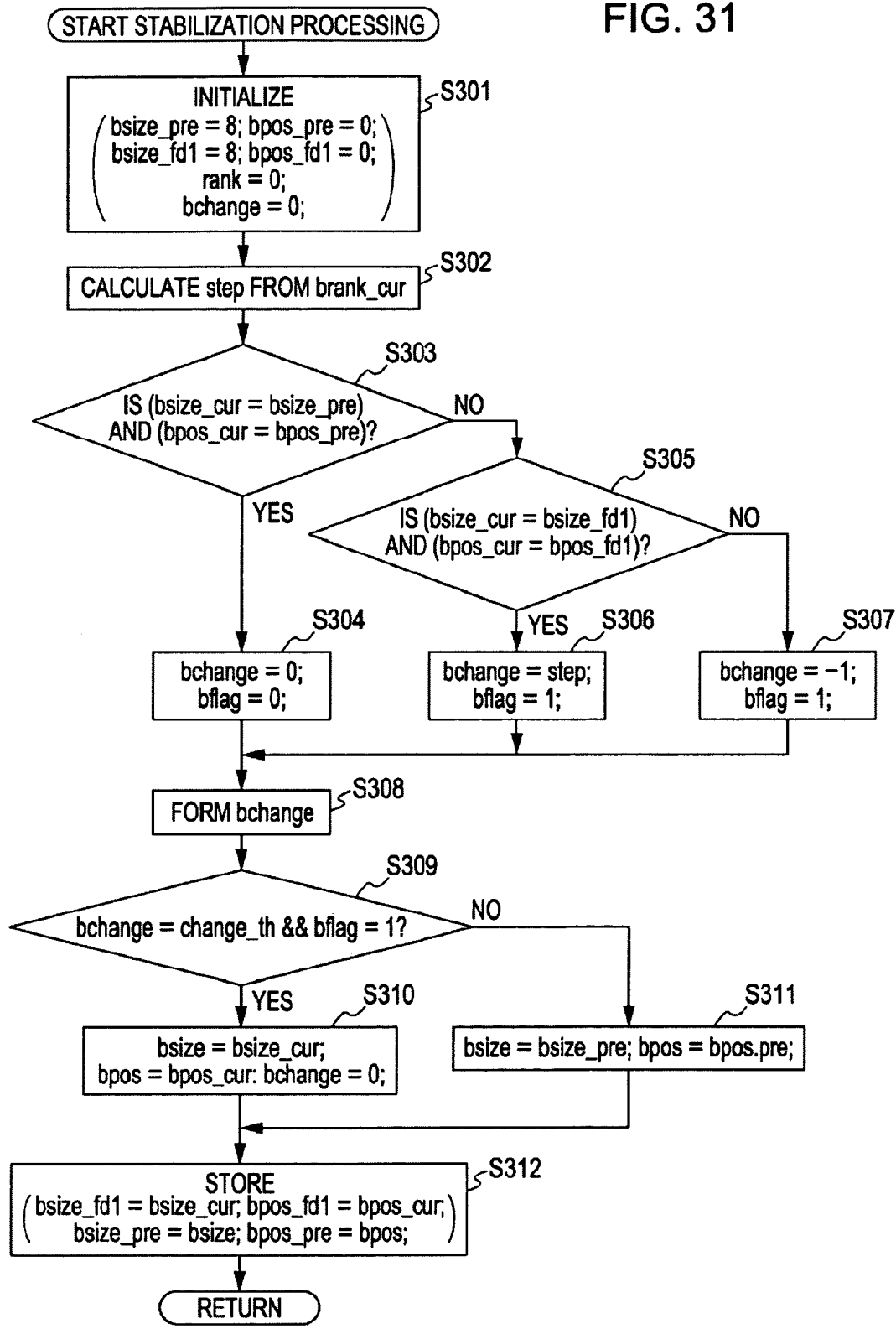
FIG. 31 is a flowchart describing the stabilization processing in FIG. 17.

The stabilizing processing with the stabilization processing unit 46 will be described now with reference to the flowchart in FIG. 31.

In step S301 the stabilization processing unit 46 initializes the block size bsize_pre subjected to stabilizing processing with the immediately previous image to 8, the block border position bpos_pre subjected to stabilizing processing with the immediately previous image to 0, the block size bsize_fd1 of the measurement results before stabilization processing is performed with the immediately previous image to 8, the block border position bpos_fd1 of the measurement results before stabilization processing is performed with the immediately previous image to 0, and the determination value bchange showing whether there are any changes to the determination results to 0. Note that the processing in step S301 is skipped for the second image and thereafter.

In step S302, the obtaining unit 201 obtains the block size bsize_cur, block border position bpos_cur, reliability information brank_cur, and border occurrence total btotal as the determination results with the current image supplied from the determining unit 45, and supplies the block border position bpos_cur to the step calculating unit 202, and the block size bsize, block border position bpos_cur, reliability information brank_cur, and border occurrence total btotal to the immediately previous image information comparing unit 203, immediately previous image information storage unit 207, and selecting unit 211.

At this time, the step calculating unit 202 calculates the control coefficient "step" from the reliability information brank_cur. More specifically, for example the step calculating unit 202 performs calculations such that the control coefficient step=−1 when the reliability information brank_cur is smaller that the predetermined minimum value, such that the control coefficient step=0 when greater than the predetermined minimum value and smaller that the predetermined maximum value, and such that the control coefficient step=1 when greater than the predetermined maximum value.

In step S303, the immediately previous image information comparing unit 203 reads the block size bsize_pre and block border position bpos_pre following stabilizing processing stored in the immediately previous image information storage unit 207, and determines whether or not the block size bsize_cur and block size bsize_pre before the current stabilizing processing are the same and the block border position bpos_cur and block border position bpos_pre are the same. That is to say, with the comparison with the immediately previous image, determination is made as to whether or not the block size and block border position are the same.

In the case that in step S303 the block size bsize_cur and block size bsize_pre are the same and the block border position bpos_cur and block border position bpos_pre are the same, in step S304 the immediately previous image information comparing unit 203 supplies the determination results to the determination value managing unit 205 and change likelihood flag managing unit 209. The determination value managing unit 205 sets the determination value bchange to 0 and stores this in the determination value memory 206. Also, the change likelihood flag managing unit 209 sets the change likelihood flag bflag which indicates whether there is any likelihood of change to 0 which indicates no likelihood, and stores this in the change likelihood flag memory 210.

On the other hand, for example in the case that in step S303 the block size bsize_cur and block size bsize_pre are not the same, or that the block border position bpos_cur and block border position bpos_pre are not the same, the processing is advanced to step S305.

In step S305, the immediately previous image stabilization information comparing unit 204 reads the block size bsize_fd1 and block border position bpos_fd1 before stabilizing processing which is stored in the immediately previous image stabilization information storage unit 208, and determines whether or not the current block size bsize_cur before the stabilizing processing and the block size bsize_fd1 before stabilizing processing of the immediately previous image are the same and the block border position bpos_cur and block border position bpos_fd1 are the same. That is to say, with the comparison with the immediately previous image after stabilizing processing, determination is made as to whether or not the block size and block border position are the same.

In step S305, in the case determination is made that the current block size bsize_cur before the stabilizing processing and the block size bsize_fd1 of the immediately previous image before stabilizing processing are the same and the block border position bpos_cur and block border position bpos_fd1 are the same, in step S306, the immediately previous image stabilization information comparing unit 204 supplies the determination results to the determination value managing unit 205 and the change likelihood flag managing unit 209. The determination value managing unit 205 sets the determination value bchange to the control coefficient "step", and stores this in the determination value memory 206. The change likelihood flag managing unit 209 sets the change likelihood flag bflag that indicates the likelihood of any change to 1 which indicates there is a likelihood of change, and stores this in the change likelihood flag memory 210.

On the other hand, in the case determination is made that the current block size bsize_cur before the stabilizing processing and the block size bsize_fd1 of the immediately previous image before stabilizing processing are not the same or the block border position bpos_cur and block border position bpos_fd1 are not the same, in step S307, the immediately previous image stabilization information comparing unit 204 supplies the determination results to the determination value managing unit 205 and the change likelihood flag managing unit 209. The determination value managing unit 205 sets the determination value bchange to the control coefficient −1, and stores this in the determination value memory 206. The change likelihood flag managing unit 209 sets the change likelihood flag bflag that indicates the likelihood of any change to 1 which indicates there is a likelihood of change, and stores this in the change likelihood flag memory 210.

In step S308, the determination value managing unit 205 controls the waveform shaping unit 205a to perform waveform shaping of the determination value bchange of the determination value memory 206, and stores this in the determination value memory 206. Specifically, in the case that the determination value bchange is smaller than 0, the determination value managing unit 205 sets the determination value bchange to 0, and in the case that the determination value bchange is greater than the maximum value bchange_th, the determination value managing unit 205 sets the determination value bchange to the maximum value bchange_th, and in other cases, sets the value as it is, thereby subjecting the determination value to waveform shaping.

In step S309, the selecting unit 211 reads the determination value bchange of the determination value memory 206 and the change likelihood flag bflag from the change likelihood flag memory 210, and determines whether or not the determination value bchange is the same as the maximum value bchange_th and the change likelihood flag bflag is 1 which indicates there is a change.

In the case that in step S309 the determination value bchange is the same as the maximum value bchange_th and the change likelihood flag bflag is 1 which indicates there is a change, in step S310 the selecting unit 211 changes the block size bsize subjected to stabilizing processing to the block size bsize_cur before stabilizing processing of the current image, and further, the block border position bpos subjected to stabilizing processing is changed to the block border position bpos_cur before stabilizing processing of the current image, and output. Note that at this time, the selecting unit 211 outputs the reliability information brank_cur along with the reliability information brank.

On the other hand, in the case that in step S309 the determination value bchange is not the same as the maximum value bchange_th or the change likelihood flag bflag is not 1 which indicates there is a change, in step S311 the selecting unit 211 leaves the block size bsize subjected to stabilizing processing as the block size bsize_pre after stabilizing processing of the immediately previous image, and further outputs the block border position bpos subjected to stabilizing processing as is as the block border position bpos_pre of the current image after stabilizing processing. Note that at this time, the selecting unit 211 also outputs the reliability information brank_pre as the reliability information brank.

In step S312, the immediately previous image information storage unit 207 updates the block size bsize_fd1 before stabilizing processing with the stored immediately previous image to the current block size bsize_cur before stabilizing processing, and updates the block border position bpos_fd1 before stabilizing processing to the current block border position bpos_cur before stabilizing processing, respectively. Also, the immediately previous image stabilization information storage unit 208 updates the block size bsize_pre after stabilizing processing with the stored immediately previous image to the current block size bsize after stabilizing processing, and updates the block border position bpos_pre after stabilizing processing to the current block border position bpos after stabilizing processing, respectively. Note that the reliability information brank output at this time is also stored in unshown memory as reliability information brank_pre.

With a comparison between the block size and block border position information in the immediately previous image with the above-described processing, the block size and block border position information can be stabilized and output, and for example, fluttering, wherein the block size is changed for every image, can be reduced.

Let us now return to the flowchart in FIG. 17. Upon the stabilizing processing in step S14 ending, the horizontal detecting processing is ended. That is to say, the block size and block border position in the horizontal direction is obtained with the horizontal detecting processing.

Figure 16:
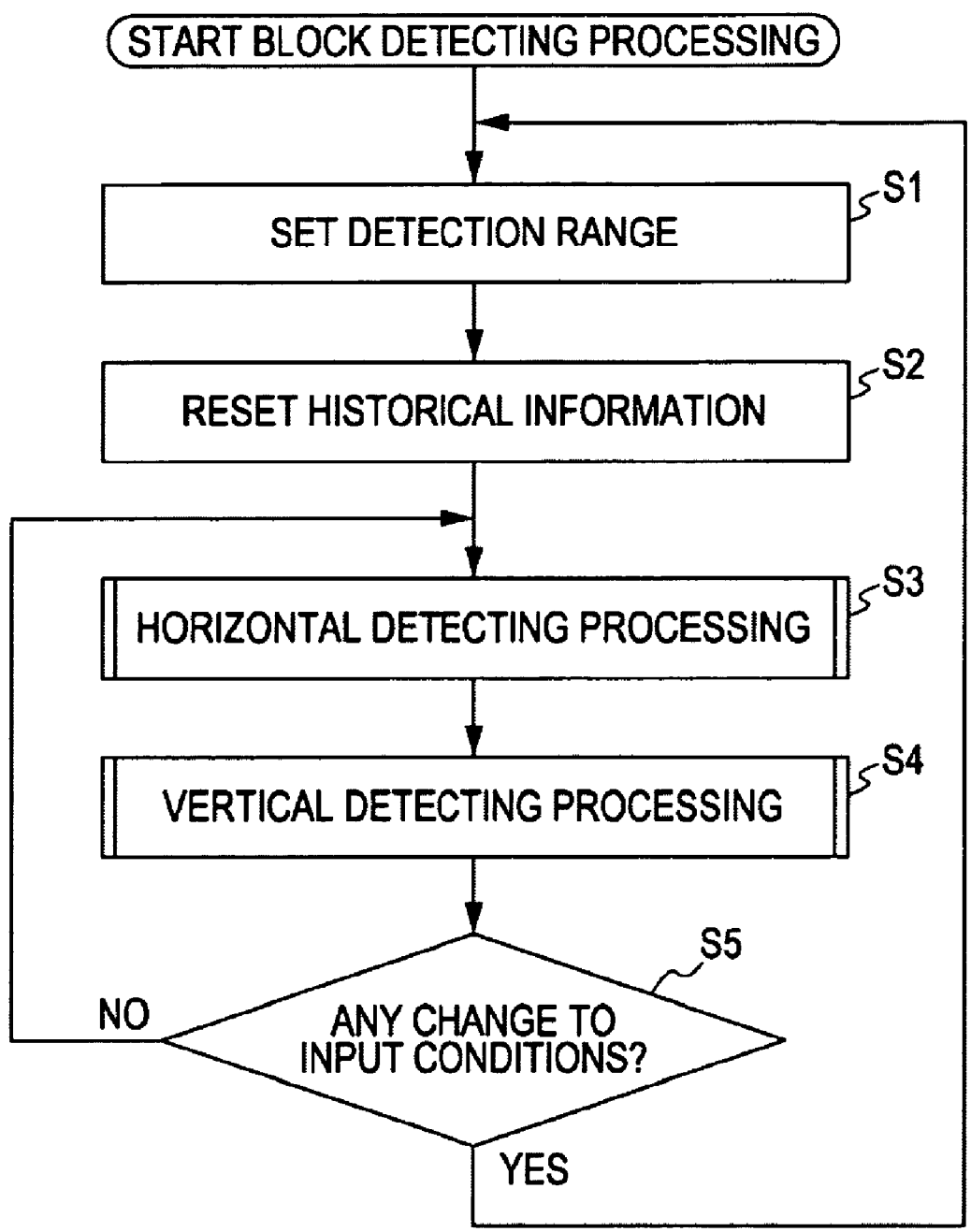
FIG. 16 is a flowchart describing block detecting processing.

Let us now return to the flowchart in FIG. 16. Upon the horizontal detecting processing in step S3 ending, in step S4 vertical detecting processing is executed with the vertical detecting unit 22 and the block size and block border position in the vertical direction are detected.

The vertical detecting processing will be described with reference to the flowchart in FIG. 32.

In step S501, the vertical detection mode determining unit 501 executes the vertical detection mode determining processing, and determines the vertical detection mode.

Figure 33:
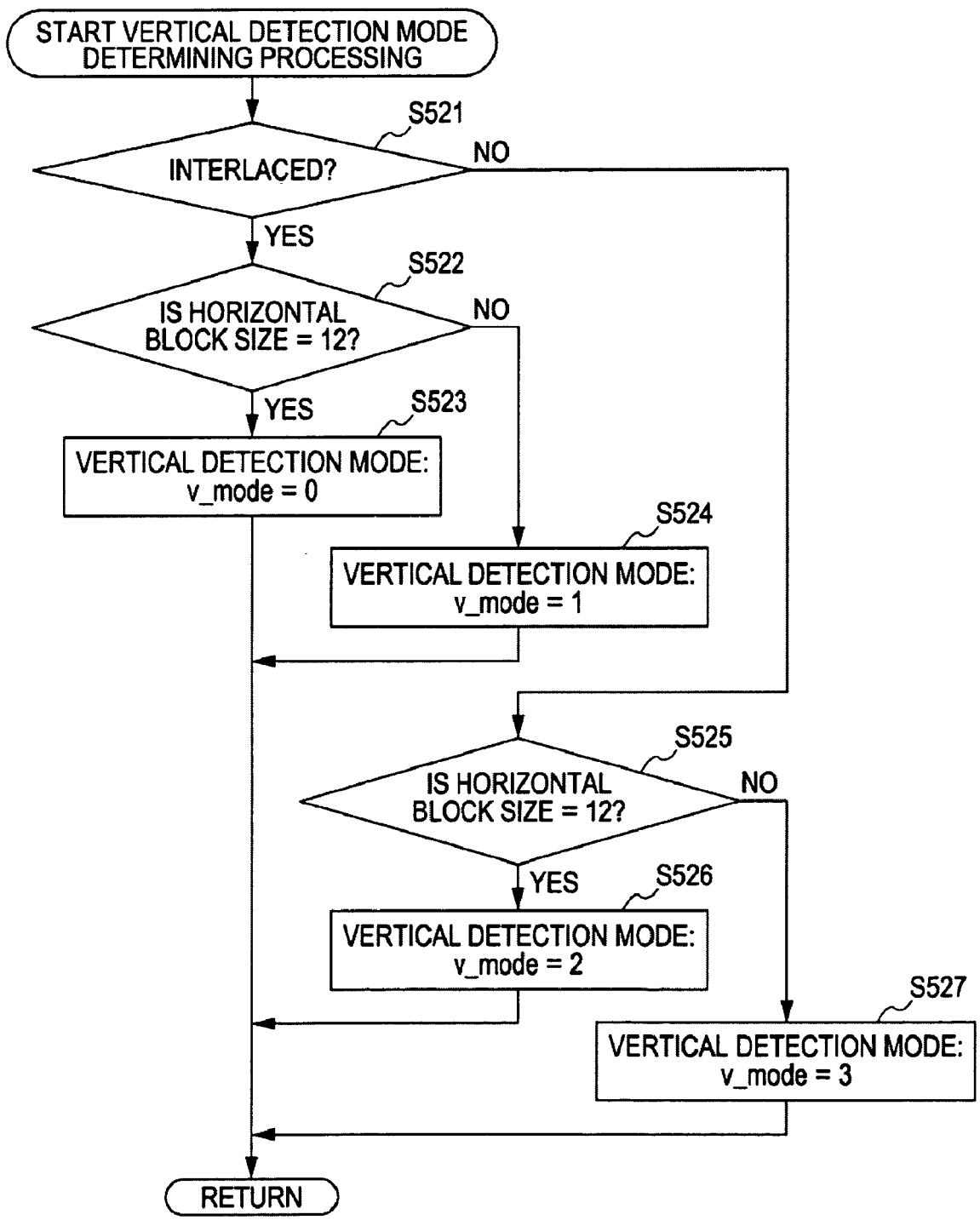
FIG. 33 is a flowchart describing the vertical detection mode determining processing in FIG. 32.

The vertical detection mode determining processing will be described with reference to the flowchart in FIG. 33. Note that hereafter, an example wherein detection is made for a block size of only 4 pixels, 6 pixels, 8 pixels, 12 pixels, and 16 pixels as to the vertical direction will be described, but other block sizes can also be detected with a similar method.

In step S521, the interlace/progressive determining unit 521 determines whether or not the input image is an interlaced image. In the case determination is made in step S521, for example, that the image is an interlaced image, the processing is advanced to step S522.

In step S522, the block size determining unit 522 determines whether or not the supplied horizontal block size bsize is 12. In the case that the block size bsize is 12 in step S522, the processing is advanced to step S523.

In step S523, based on the determination results that the image is an interlaced image and the horizontal block size bsize is 12, the mode determining unit 523 determines that the vertical detection mode v_mode is 0, and supplies the determination results to the block level information obtaining unit 502, cycle measuring unit 504, determining unit 506, and stabilization processing unit 507. The vertical detection mode v_mode=0 is a mode equating to the vertical block size of 6 pixels.

On the other hand, in the case determination is made in step S522 that the horizontal block size bsize is not 12, i.e. in this case, in the case that the horizontal block size is 8 or 10.67, in step S524 the mode determining unit 523 determines that the vertical detection mode v_mode is 1 based on the determination results, and supplies the determination results to the block level information obtaining unit 502, cycle measuring unit 504, determining unit 506, and stabilization processing unit 507. The vertical detection mode v_mode=1 is a mode equating to the vertical block size of 8 pixels or 4 pixels.

Further, in the case determination is made in step S521 that the image is not an interlace image, i.e. in the case the image is determined to be a progressive image, in step S525 the block size determining unit 522 determines whether or not the block size bsize is 12.

In the case that determination is made in step S525 that the horizontal block size bsize is 12, for example, in step S526 the mode determining unit 523 determines the vertical detection mode v_mode to be 2, based on the determination results, and supplies the determination results to the block level information obtaining unit 502, cycle measuring unit 504, determining unit 506, and stabilization processing unit 507. The vertical detection mode v_mode=2 is a mode equating to the vertical block size of 12 pixels.

Also, in the case that determination is made in step S525 that the horizontal block size bsize is 12, for example, in step S527 the mode determining unit 523 determines the vertical detection mode v_mode to be 3, based on the determination results, and supplies the determination results to the block level information obtaining unit 502, cycle measuring unit 504, determining unit 506, and stabilization processing unit 507. The vertical detection mode v_mode=3 is a mode equating to the vertical block size of 8 pixels or 16 pixels.

With the above processing the vertical detection mode v_mode can be categorized into the four types of 0, 1, 2, 3, based on the type of interlaced image or progressive image and the horizontal block size bsize.

Figure 32:
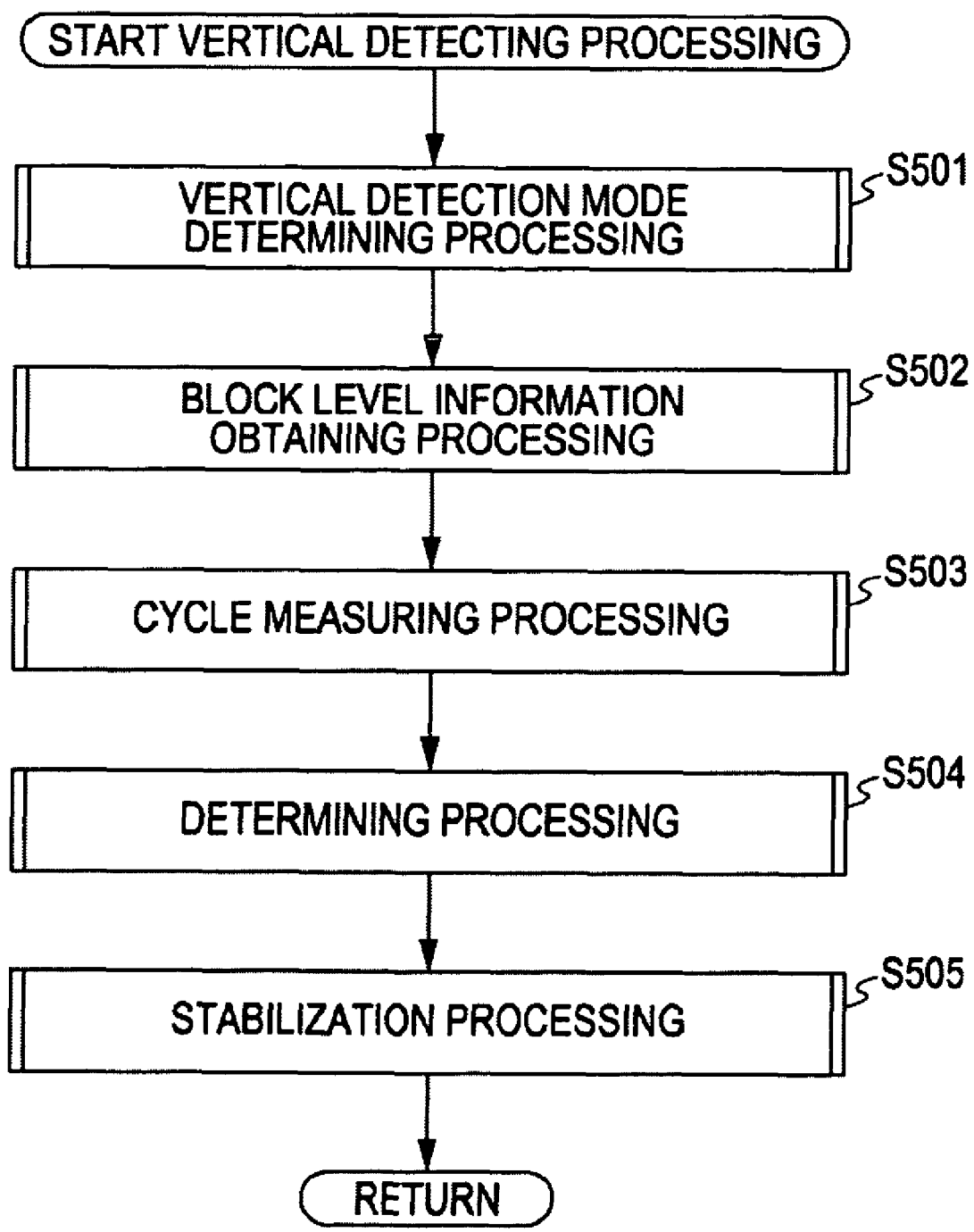
FIG. 32 is a flowchart describing the vertical detecting processing in FIG. 16.

Let us now return to the flowchart in FIG. 32. In step S501, upon the vertical detection mode v_mode being determined with the vertical detection mode determining processing, in step 3502 the block level information obtaining processing 502 executes block level information obtaining processing, and obtains the block level information and accumulates this in the distribution information buffer 503.

Figure 34:
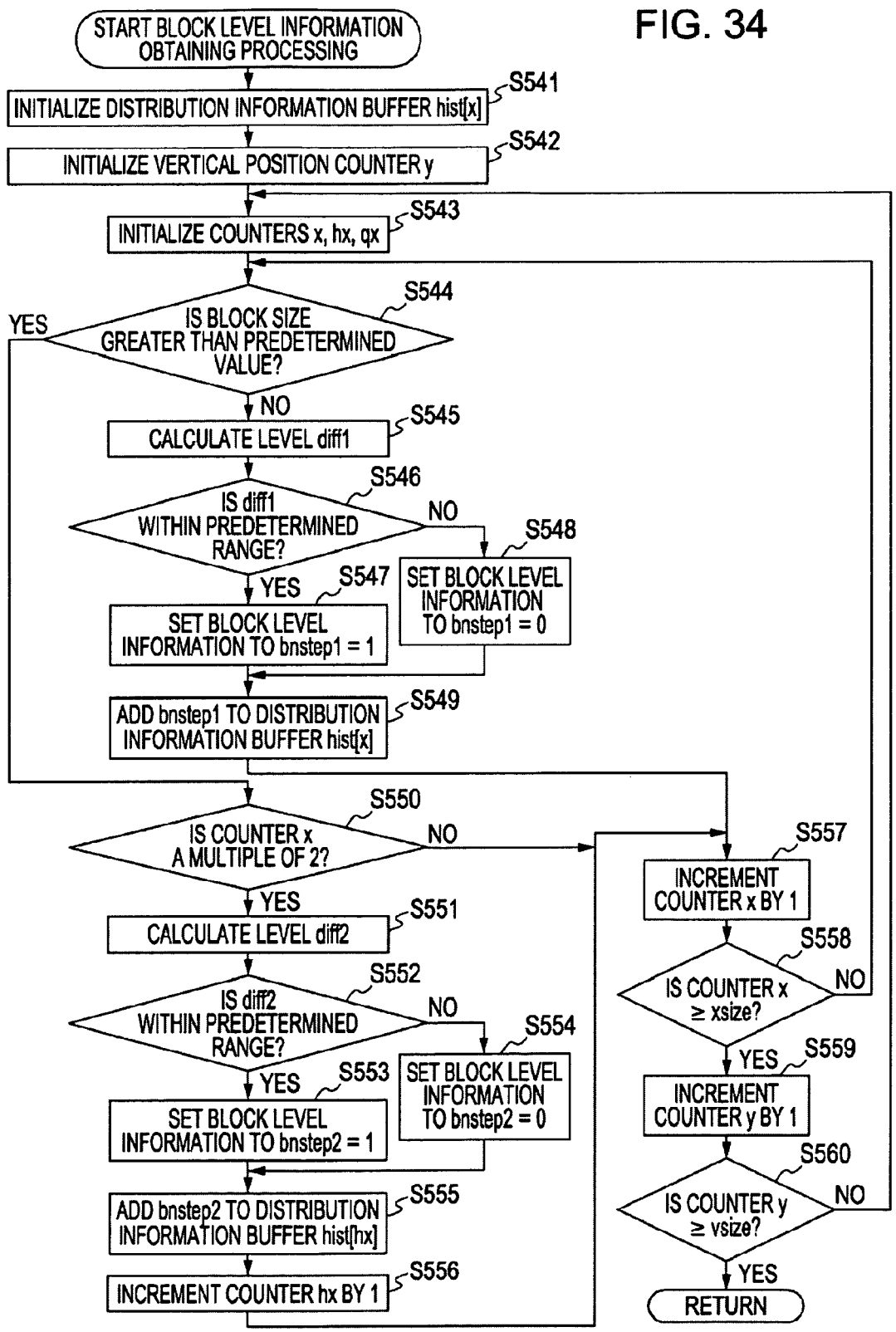
FIG. 34 is a flowchart describing the block level information obtaining processing in FIG. 32.

The block level information obtaining processing will be described now with reference to the flowchart in FIG. 34. Note that with the exception of the processing in step S544, the flowchart in FIG. 34 is similar to the processing in steps S21 through S35 and step S43 through 46 in the flowchart in FIG. 18, so the description thereof will be omitted.

That is to say, in step S544, the mode determining unit 541 determines whether or not the block size is greater than a predetermined value, based on the vertical detection mode v_mode. In the case determination is made in step S544 that the block size is not greater than the predetermined value, the processing in steps S545 through S549 is repeated with the position determining unit 542, level calculating unit 543, level storage unit 544, block level feature detecting unit 545, and buffer hist[x]546, whereby the distribution information hist[x] which is the same as the narrow area distribution information buffer hist1 is obtained.

On the other hand, in the case determination is made in step S544 that the block size is greater than the predetermined value, the processing in steps 3550 through S558 is executed, whereby the distribution information hist[x] which is the same as the mid-area distribution information buffer hist2 is obtained.

That is to say, the block size in the vertical direction is limited beforehand by the vertical detection mode v_mode, whereby only the distribution information corresponding to the block size has to be obtained, and therefore only one of the narrow area distribution information or mid-area distribution information has to be obtained. Note that with the above description, an example wherein narrow area distribution information or mid-area distribution information is obtained according to block size is described, but an in the case wherein an image taking a large block size is handled, an arrangement may be made wherein wide area distribution information is also obtained. Also, an arrangement may be made wherein any two of the narrow area distribution information, mid-are distribution information, and wide area distribution information are selected to obtain according to block size.

Let us now return to the flowchart in FIG. 32. Upon the block level information obtaining processing in step S502 ending, in step S503 the cycle measuring unit 504 executes cycle measuring processing to obtain the short cycle buffer.

Figure 35:
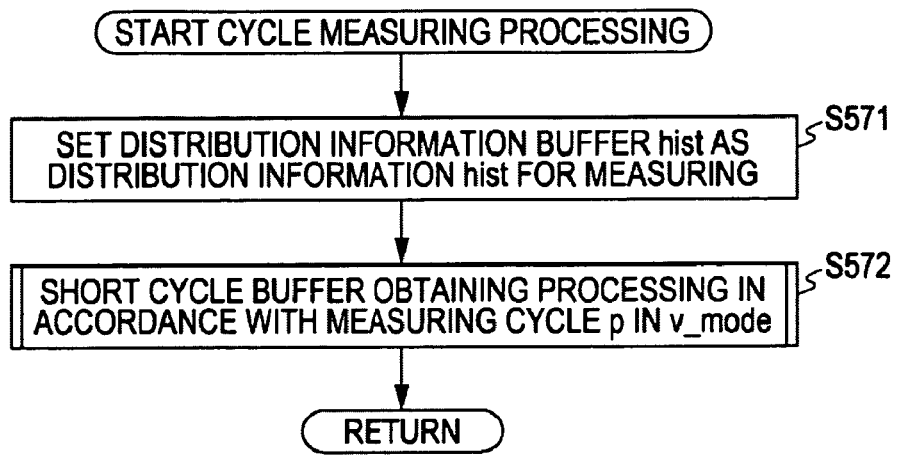
FIG. 35 is a flowchart describing the cycle measuring processing in FIG. 32.

The cycle measuring processing with the cycle measuring unit 504 will be described now with reference to the flowchart in FIG. 35.

In step S571, the cycle measuring unit 504 sets the distribution information buffer to be processed to the distribution information buffer hist[x] stored in the distribution information buffer 503.

In step S572, the short cycle buffer obtaining unit 562 controls the peak determining unit 591, short cycle buffer updating unit 592, and border condition occurrence total updating unit 592, based on the vertical detection mode v_mode supplied from the mode obtaining unit 561, and executes the short cycle buffer obtaining processing corresponding to the number of pixels of the block size corresponding to the vertical detection mode v_mode. Note that the short cycle buffer obtaining processing is similar to the processing described with reference to the flowchart in FIG. 24, so the description thereof will be omitted.

That is to say, with the vertical processing, the block size is limited beforehand with the vertical detection mode v_mode, whereby the short cycle buffer obtaining processing only has to be performed for the limited block number.

Let us now return to the flowchart in FIG. 32. Upon the cycle measuring processing being performed and the short cycle buffer being obtained in step S503, the determining unit 506 executes determining processing and determines the vertical direction block size and block border position in step S504.

Figure 36:
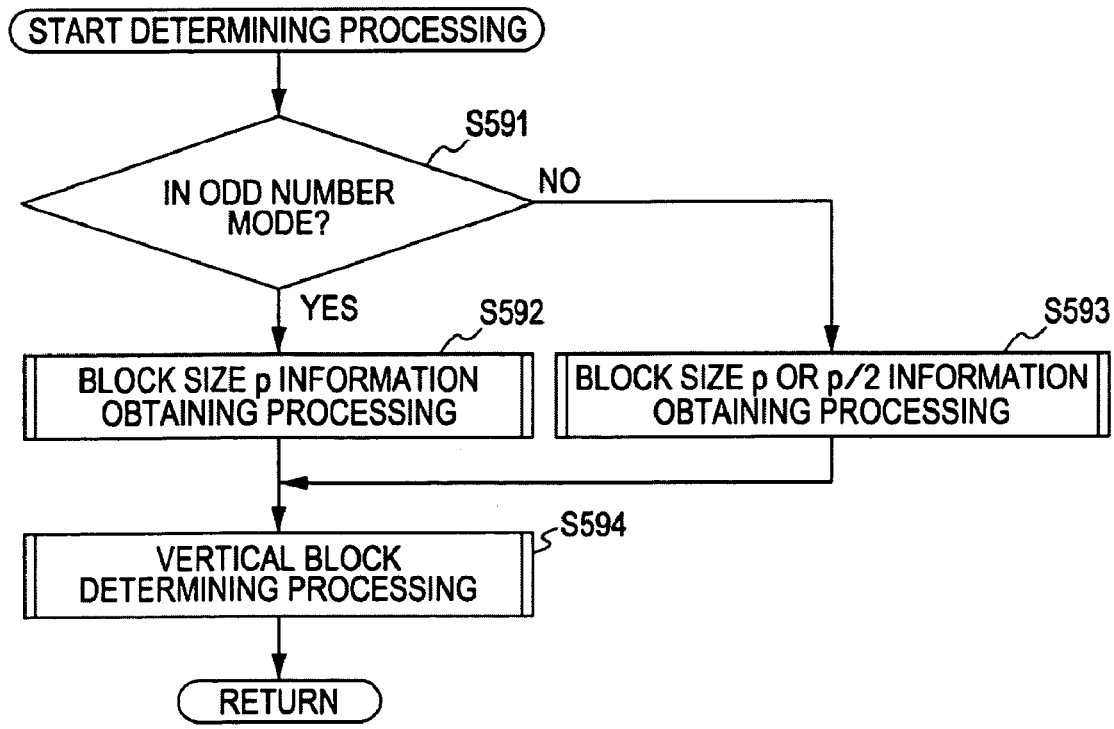
FIG. 36 is a flowchart describing the determining processing in FIG. 32.

The determining processing by the determining unit 506 will be described with reference to the flowchart in FIG. 36.

In step S591 the mode determining unit 611 determines whether or not the vertical detection mode v_mode supplied from the vertical detection mode determining unit 501 is an even number mode including 0. That is to say, with this example, the v_mode of 0 or 2 determines whether or not the block size p is an interlaced image or a progressive image.

In the case of an even number mode in step S591, for example, in step S592 the even number mode block size determining unit 612 controls the short cycle buffer readying unit 631, control counter 632, comparing unit 633, maximum value counter 634, maximum value counter updating unit 635, maximum value phase counter 636, maximum value phase counter updating unit 637, and determining result output unit 638, and executes the block size p information obtaining processing. Note that this processing is similar to the block size 8 information obtaining processing described with reference to FIG. 26, so the description thereof will be omitted.

Upon the block size p information obtaining processing being executed and the block size p information being obtained in step S592, in step 3593 the determining result output unit 638 outputs this as the block size bsize_cur, block border position bpos_cur, and border condition occurrence total btotal, based on the determination results of the block size p information obtaining processing.

On the other hand, in step S591, in the case that an odd number is determined instead of an even number, i.e. with the current example, in the case that the block size is 4 pixels or 8 pixels, or 8 pixels or 16 pixels, in step S593 the odd number mode block size determining unit 613 executes block size "p or p/2" information obtaining processing, and obtains block size "p or p/2" information in the odd number mode.

Figure 37B:
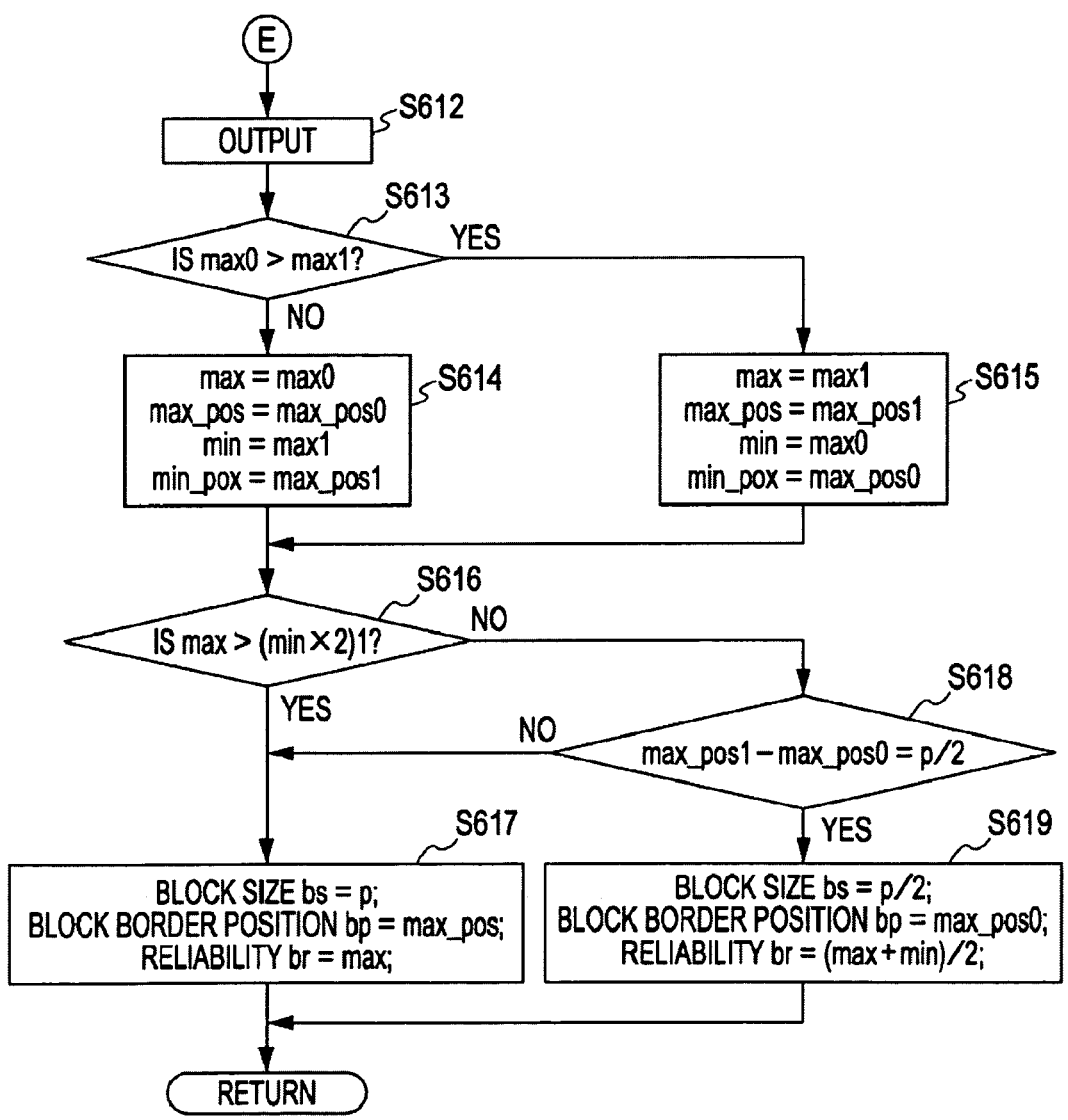
FIG. 37 is a flowchart describing the block size p or p/2 information obtaining processing in FIG. 36.

The block size "p or p/2" information obtaining processing will now be described with reference to the flowchart in FIG. 37.

The block size "p or p/2" information obtaining processing will now be described with reference to the flowchart in FIG. 37. Note that the integer block size determining unit 651-1 and 651-2 are both similar to the configuration of the even number mode block size determining unit 612, but the initialization conditions and so forth differ. Thus, hereafter, with the configuration of the integer block size determining unit 651-1 and 651-2 will be described by appending "-1", "-2" as to each configuration of the integer block size determining unit 161.

In step S601, the integer block size determining unit 651-1 of the odd number mode block size determining unit 613 initializes the maximum value phase counter max_pos0 stored in the maximum value phase counter 636-1 to 0 and the maximum value counter max0 stored in the maximum value counter 634-1 to short cycle buffer buf[max_pos0] respectively, and also initializes the control counter i controlled with the control counter 632-1 to 1.

In step S602, the short cycle buffer reading unit 631-1 reads the short cycle buffer buf[i] specified with the control counter i from the short cycle buffer 505, and supplies this to the comparing unit 633-1. The comparing unit 633-1 determines whether or not the short cycle buffer buf[i] is greater than the maximum value counter max0.

In the case that the short cycle buffer buf[i] is greater than the maximum counter max0 in step S602 for example, in step S603 the comparing unit 633-1 supplies the comparison results to the maximum value counter updating unit 635-1 and maximum value phase counter updating unit 637-1. The maximum value counter updating unit 635-1 updates the maximum value counter max of the maximum value counter 634-1 with the short cycle buffer buf[i], based on the comparison results. Also, the maximum value phase counter updating unit 637-1 updates the maximum value phase counter max_pos0 of the maximum value phase counter 636-1 with the control counter i.

In step S604, the control counter 632-1 increments the control counter i by 1.

In step S605, the short cycle buffer reading unit 631-1 determines whether or not the control counter i is smaller than the block size p/2, and if smaller than p/2, the processing is returned to step S602, and the processing in steps 3602 through S605 is repeated.

In the case that the control counter i is not smaller than p/2 in step S605, in step S606 the determination result output unit 638-1 reads the maximum value counter max0 stored in the maximum value counter 634-1 and the maximum value phase counter max_pos0 stored in the maximum value phase counter 636, and supplies these to the comparison determining unit 652.

In step S607, the integer block size determining unit 651-2 of the odd number mode block size determining unit 613 initializes the maximum value phase counter max_pos1 stored in the maximum value phase counter 636-2 to p/2, and the maximum value counter max1 stored in the maximum value counter 174-2 to the short cycle buffer buf[max_pos1], and also initializes the control counter i controlled by the control counter 172-2 to "max_pos1+1".

In step S608, the short cycle buffer reading unit 631-2 reads the short cycle buffer buf[i] specified with the control counter i from the short cycle buffer 505, and supplies this to the comparing unit 633-2. The comparing unit 633-2 determines whether or not the short cycle buffer buf[i] is greater than the maximum value counter max1.

In the case that the short cycle buffer buf[i] is greater than the maximum value counter max1 in step S608, for example, in step S609 the comparing unit 633-2 supplies the comparison results to the maximum value counter updating unit 635-2 and maximum value phase counter updating unit 637-2. The maximum value counter updating unit 635-2 updates the maximum value counter max1 of the maximum value counter 634-2 with the short cycle buffer buf[i], based on the comparison results. Also, the maximum value phase counter updating unit 637-2 updates the maximum value phase counter max_pos1 of the maximum value phase counter 636-2 with the control counter i.

In step S610, the control counter 632-2 increments the control counter i by 1.

In step S201, the short cycle buffer reading unit 171-2 determines whether or not the control counter i is smaller than the block size p, and if smaller than p, the processing is returned to step S608, and the processing in steps S608 through S611 is repeated.

In the case the control counter i is not smaller than p in step S611, in step S612 the determination result output unit 638-2 reads the maximum value counter max stored in the maximum value counter 634-2 and the maximum value phase counter max_pos1 stored in the maximum value phase counter 636-2, and supplies these to the comparison determining unit 652.

In step S613, the comparison determining unit 652 determines whether or not the maximum counter max0 is greater than the maximum value counter max1. In the case that the maximum value counter max0 is greater than the maximum value counter max1 in step S613, for example, the processing is advanced to step S614.

In step S614, the comparison determining unit 652 sets the maximum value counter max to be maximum value counter max0, the maximum value phase counter max_pos to be maximum value phase counter max_pos0, the minimum value counter min to be maximum value counter max1, and the minimum value phase counter min_pos to be maximum value phase counter max_pos1.

On the other hand, in step S613, for example, in the case that the maximum value counter max0 is not greater than the maximum value counter max1, the processing is advanced to step S615.

In step S615, the comparison determining unit 652 sets the maximum value counter max to be maximum value counter max1, the maximum value phase counter max_pos to be maximum value phase counter max_pos1, the minimum value counter min to be maximum value counter max0, and the minimum value phase counter min_pos to be maximum value phase counter max_pos0.

In step S616, the comparison determining unit 652 compares the maximum value counter max and the minimum value counter min×2, and determines whether or not the maximum value counter max is sufficiently large as to the minimum value counter min.

In step S616, the comparison determining unit 652 compares the maximum value counter max and the minimum value counter min×2, and in the case determination is made that the maximum value counter max is sufficiently large as to the minimum value counter min, in step S617 the comparison determining unit 652 supplies information that the block size bs in the vertical direction is p pixels, the block border position bp is the maximum value phase counter max_pos, and the reliability information br is the maximum value counter max, to the stabilization processing unit 46.

In the case determination is made in step S616 that the maximum value counter max is sufficiently large as to the minimum value counter min, in step S618 the comparison determining unit 652 determines whether or not the value subtracting the maximum value phase counter max_pos0 from the maximum value phase counter max_pos1 is p/2.

In the case that in step S618 the value subtracting the maximum value phase counter max_pos0 from the maximum value phase counter max_pos1 is p/2, in step 3619 the comparison determining unit 652 supplies information that the vertical direction block size bs is p/2 pixels, the block border position bp is the maximum value phase counter min_pos, and the reliability information br is an average of the maximum value counter max and minimum value counter min, to the stabilization processing unit 46.

Also, in the case that in step S618, for example, the value subtracting the maximum value phase counter max_pos0 from the maximum value phase counter max_pos1 is not p/2, the processing is advanced to step S617.

With a block size of p or p/2 pixels with the above processing, the maximum block size from the comparison between the values serving as the maximum value in each short cycle buffer is selected as the block size to be measured.

Let us now return to the flowchart in FIG. 32. Upon the block size and block border position being determined with the determining processing in step S504, in step S505 the stabilizing processing is performed with the stabilization processing unit 507, and the block size and block border position information determined with the determining processing is stabilized and output. Note that the stabilizing processing is similar to the processing described with reference to the flowchart in FIG. 31, so the description thereof will be omitted.

Let us now return to the flowchart in FIG. 16. Upon the vertical detection processing being executed in step S4, in step S5 the block border information detecting unit 11 determines whether or not there are any changes to input conditions, in the case determination is made that there are no changes, the processing returns to step S3. That is to say, as long as there are no changes to input conditions, the processing in steps S3 through S5 is repeated.

In the case determination is made in step S5 that there are changes to input conditions, the processing is returned to step S1, and the processing thereafter is repeated.

Note that with the above description, by obtaining the block size in the vertical direction after obtaining the block size in the horizontal direction, the work to obtain the block size in the vertical direction can be omitted, based on information of the horizontal direction block size, and processing can be realized at a higher speed.

Also, the block size can be obtained even at a value below the decimal, whereby hereafter, even if various image formats occur, or even if scaling is performed from the original image, the block size and block border can be obtained with high accuracy.

Note that with the above description, an example for obtaining the block size in the vertical direction after obtaining the block size in the horizontal direction has been described, but it goes without saying that an arrangement may be made wherein the block size in the horizontal direction is obtained after the block size in the vertical direction is obtained. Further, an arrangement may be made wherein only one of the horizontal detection processing or vertical detection processing is used.

With the above-described processing, the block size and block border position can be obtained with high accuracy.

The above-described series of processing may be executed with hardware or may be executed with software. In the case of executing the series of processing with software, a program configuring such software is installed from a storage medium onto a computer wherein dedicated hardware is built in, or onto a general-use personal computer, for example, wherein various functions can be executed by installing various types of programs.

FIG. 38 shows a configuration example of a general-use personal computer. This personal computer has a built-in CPU (Central Processing Unit) 1001. An input/output interface 1005 is connected to the CPU 1001 via a bus 1004. The bus 1004 is connected to ROM (Read Only Memory) 1002 and RAM (Random Access Memory) 1003.

The input/output interface 1005 is connected to an input unit 1006 made up of an input device such as a keyboard, mouse, and so forth for a user to input operation commands, an output unit 1007 to output processing operation screens and processing result images on a display device, a storage unit 1008 made up of a hard disk drive or the like to store programs and various types of data, and a communication unit 1009 to execute communication processing via a network represented by the Internet, made up of a LAN (Local Area Network) adapter or the like. Also, a drive 1010 to read and write data as to a removable media 1011 such as a magnetic disk (including flexible disk), optical disk (including CD-ROM (Compact Disc-Read Only Memory) and DVD (Digital Versatile Disc)), magneto-optical disk (including MD (Mini Disc)), or a semiconductor memory is also connected thereto.

The CPU 1001 executes various types of processing according to the program stored in the ROM 1002, or the program that is read from a removable media 1011 such as a magnetic disk, optical disc, magneto-optical disk, or semiconductor memory, and installed on a storage unit 1008, and loaded from the storage unit 1008 to the RAM 1003. Data for the CPU 1001 to execute various types of processing is also stored as appropriate in the RAM 1003.

With the present Specification, a steps describing the program recorded in the recording medium include processing performed in a time-series manner in the order described as a matter of course, but is not restricted to processing in a time-series manner, and processing executed in parallel or individually is also encompassed thereby.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
   block level information obtaining means:
      to detect block levels, each of the block levels being detected based on differences in pixel values between a predetermined pixel of an image and nearby pixels near to the predetermined pixel, and
      to obtain distribution information by accumulating said block levels in a predetermined direction;
   short cycle measuring means to:
      measure, from said distribution information, short cycle information, which includes the distribution information for each phase in a plurality of predetermined short cycles corresponding to a plurality of block sizes including an integer pixel count, and
      obtain a distribution for each interval between peak values from said distribution information, as occurrence frequency; and
   determining means:
      to determine one of the plurality of predetermined short cycles whose phase distribution takes a maximum value, and
      to set a block size corresponding to the short cycle information of the identified short cycle as an image block size of said image,
   wherein said determining means is configured to:
      divide the short cycle information corresponding to the block sizes of said integer pixel count into a plurality of segments,
      obtain the position for the maximum value to take for each segment,
      determine the block border position corresponding to the block size below the decimal, based on the positional relation of said plurality of maximum values,
      determine the block size wherein the distribution count is the maximum count of said short cycle information, and corresponds to a cycle having a high occurrence frequency, as said image block size, and determine the phase to take the maximum value in said short cycle information as the block border position,
wherein said determinations are performed based on the distribution count of said short cycle information, and occurrence frequency corresponding to the interval between peak values.

2. The image processing device according to claim 1, further comprising:
stabilizing processing means to stabilize the block size and block border position information for the current image determined by said determining means, in the case that said image is a moving image, with the block size and block border position of an image that is temporally nearby.

3. The image processing device according to claim 1, wherein said block level information obtaining means calculate the difference between difference absolute value information of the pixel values between a pixel of interest and pixels nearby said pixel of interest, and the average of the difference absolute value information of the pixel values between said nearby pixels, as said levels;
wherein, in the case that said level which is a calculation result is within a range of predetermined values, said level is detected as a block level.

4. The image processing device according to claim 1, wherein said cycle measuring means determine said phase wherein said phase distribution takes the maximum value of the short cycle information of the plurality of predetermined short cycles corresponding to said plurality of block sizes, as block border position.

5. The image processing device according to claim 1, wherein said short cycle includes at least 12 cycles, 8 cycles, and 32 cycles.

6. The image processing device according to claim 5, wherein said determining means
divide the maximum value and short cycle information of said 32 cycles into 3 segments,
obtain the position for the maximum value to take in each segment,
identify the position in increments of ⅓ cycle below the decimal, based on the relation of the maximum values of said 3 segments, and
determine the position to take the maximum value with the 32/3 cycles as the block border position.

7. The image processing device according to claim 1, wherein said distribution count is the reliability of said block size and said block border position.

8. The image processing device according to claim 1, wherein said determining means determine said block size subjected to scaling and block border position, based on said short cycle information distribution count and said occurrence frequency.

9. The image processing device according to claim 1, wherein said determining means determine the block size in the vertical direction and border position, based on the block size in the horizontal direction and block border position information of said image.

10. The image processing device according to claim 1, wherein said determining means determine the block size in the horizontal direction and border position, based on the block size in the vertical direction and block border position information of said image.

11. An information processing method comprising the steps of:
block level information obtaining:
to detect block levels, each of the block levels being detected based on differences in pixel values between a predetermined pixel of an image and nearby pixels near to the predetermined pixel, and
to obtain distribution information by accumulating said block levels in a predetermined direction;
short cycle measuring to:
measure, from said distribution information, short cycle information, which includes the distribution information for each phase in a plurality of predetermined short cycles corresponding to a plurality of block sizes including an integer pixel count, and
obtain a distribution for each interval between peak values from said distribution information, as occurrence frequency; and
determining:
to determine one of the plurality of predetermined short cycles whose phase distribution takes a maximum value, and
to set a block size corresponding to the short cycle information of the identified short cycle as an image block size of said image,
wherein said determining comprises:
dividing the short cycle information corresponding to the block sizes of said integer pixel count into a plurality of segments,
obtaining the position for the maximum value to take for each segment,
determining the block border position corresponding to the block size below the decimal, based on the positional relation of said plurality of maximum values,
determining the block size wherein the distribution count is the maximum count of said short cycle information, and corresponds to a cycle having a high occurrence frequency, as said image block size, and
determining the phase to take the maximum value in said short cycle information as the block border position,
wherein said determinations are performed based on the distribution count of said short cycle information, and occurrence frequency corresponding to the interval between peak values.

12. A non-transitory computer-readable medium storing a program, which, when executed, causes a computer to execute a processing including the steps of:
block level information obtaining:
to detect block levels, each of the block levels being detected based on differences in pixel values between a predetermined pixel of an image and nearby pixels near to the predetermined pixel, and
to obtain distribution information by accumulating said block levels in a predetermined direction;
short cycle measuring to:
measure, from said distribution information, short cycle information, which includes the distribution information for each phase in a plurality of predetermined short cycles corresponding to a plurality of block sizes including an integer pixel count, and
obtain a distribution for each interval between peak values from said distribution information, as occurrence frequency; and
determining:
to determine one of the plurality of predetermined short cycles whose phase distribution takes a maximum value, and
to set a block size corresponding to the short cycle information of the identified short cycle as an image block size of said image, wherein said determining comprises:
  dividing the short cycle information corresponding to the block sizes of said integer pixel count into a plurality of segments,
  obtaining the position for the maximum value to take for each segment,
  determining the block border position corresponding to the block size below the decimal, based on the positional relation of said plurality of maximum values,
  determining the block size wherein the distribution count is the maximum count of said short cycle information, and corresponds to a cycle having a high occurrence frequency, as said image block size, and
  determining the phase to take the maximum value in said short cycle information as the block border position,
  wherein said determinations are performed based on the distribution count of said short cycle information, and occurrence frequency corresponding to the interval between peak values.

13. An information processing device comprising:
a block level information obtaining unit:
  to detect block levels, each of the block levels being detected based on differences in pixel values between a predetermined pixel of an image and nearby pixels near to the predetermined pixel, and
  to obtain distribution information by accumulating said block levels in a predetermined direction;
a short cycle measuring unit to:
  measure, from said distribution information, short cycle information, which includes the distribution information for each phase in a plurality of predetermined short cycles corresponding to a plurality of block sizes including an integer pixel count, and
  obtain a distribution for each interval between peak values from said distribution information, as occurrence frequency; and
a determining unit:
  to determine identify one of the plurality of predetermined short cycles whose phase distribution takes a maximum value, and
  to set a block size corresponding to the short cycle information of the identified short cycle as an image block size of said image,
wherein said determining unit is configured to:
  divide the short cycle information corresponding to the block sizes of said integer pixel count into a plurality of segments,
  obtain the position for the maximum value to take for each segment,
  determine the block border position corresponding to the block size below the decimal, based on the positional relation of said plurality of maximum values,
  determine the block size wherein the distribution count is the maximum count of said short cycle information, and corresponds to a cycle having a high occurrence frequency, as said image block size, and
  determine the phase to take the maximum value in said short cycle information as the block border position,
  wherein said determinations are performed based on the distribution count of said short cycle information, and occurrence frequency corresponding to the interval between peak values.

* * * * *